(12) United States Patent
Inoue et al.

(10) Patent No.: US 8,867,005 B2
(45) Date of Patent: Oct. 21, 2014

(54) DISPLAY ELEMENT AND DISPLAY DEVICE

(75) Inventors: Iichiro Inoue, Tenri (JP); Koichi Miyachi, Soraku-gun (JP); Seiji Shibahara, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 1507 days.

(21) Appl. No.: 11/921,684

(22) PCT Filed: Jun. 9, 2006

(86) PCT No.: PCT/JP2006/311621
§ 371 (c)(1),
(2), (4) Date: Feb. 27, 2009

(87) PCT Pub. No.: WO2006/132361
PCT Pub. Date: Dec. 14, 2006

(65) Prior Publication Data
US 2009/0161042 A1    Jun. 25, 2009

(30) Foreign Application Priority Data
Jun. 10, 2005 (JP) ................................ 2005-171725

(51) Int. Cl.
| | | |
|---|---|---|
| *G02F 1/1343* | (2006.01) | |
| *C09K 19/02* | (2006.01) | |
| *G02F 1/137* | (2006.01) | |
| *G09G 3/36* | (2006.01) | |
| *G02F 1/1337* | (2006.01) | |

(52) U.S. Cl.
CPC ...... *G02F 1/13718* (2013.01); *G02F 1/134363* (2013.01); *G09G 3/3648* (2013.01); *G02F 1/133707* (2013.01); *G09G 2310/06* (2013.01); *G09G 2320/0252* (2013.01)
USPC .......................................... 349/141; 349/175

(58) Field of Classification Search
CPC ................................ G02F 1/133636
USPC ............................................... 349/175
See application file for complete search history.

(56) References Cited

U.S. PATENT DOCUMENTS

| | | | |
|---|---|---|---|
| 4,636,786 A | 1/1987 | Haertling | |
| 4,967,268 A | 10/1990 | Lipton et al. | |

(Continued)

FOREIGN PATENT DOCUMENTS

| | | |
|---|---|---|
| JP | 4-304495 A | 10/1992 |
| JP | 7-56545 | 3/1995 |

(Continued)

OTHER PUBLICATIONS

Advisory Action mailed May 8, 2012 in U.S. Appl. No. 10/585,865 (3 pages).

(Continued)

*Primary Examiner* — Wen-Ying P Chen
(74) *Attorney, Agent, or Firm* — Nixon & Vanderhye, P.C.

(57) ABSTRACT

A display element having high response property, wide viewing angle property, and high contrast property, and exhibiting a wide driving temperature range and excellent durability and reliability. Between two facing substrates (1, 2), a cholesteric liquid crystal layer (3) made of a liquid crystal material exhibiting a cholesteric phase whose spontaneous twist pitch is shorter than a wavelength of visible light is provided. Facing planes of the substrates (1, 2) are provided with alignment films (8, 9) for aligning liquid crystal molecules near the interface of the substrate in a specific direction. Furthermore, the planes are provided with electrodes (4, 5) for applying an electric field on the cholesteric liquid crystal layer (3) in a direction substantially parallel to a plane of each substrate. The cholesteric liquid crystal layer (3) exhibits optical isotropy in the direction parallel to the plane of each substrate when no voltage is applied. Display is performed by applying an electric field on the cholesteric liquid crystal layer (3) so as to exhibit optical anisotropy in the direction parallel to the plane of each substrate.

17 Claims, 24 Drawing Sheets

(56) References Cited

U.S. PATENT DOCUMENTS

| | | | |
|---|---|---|---|
| 6,188,455 B1 | 2/2001 | Yamamoto | |
| 6,233,034 B1 | 5/2001 | Lee et al. | |
| 6,266,109 B1 | 7/2001 | Yamaguchi et al. | |
| 6,512,565 B1 | 1/2003 | Lee et al. | |
| 6,570,632 B2 | 5/2003 | Lavrentovich et al. | |
| 6,636,289 B2 | 10/2003 | Yoo et al. | |
| 6,700,560 B2 | 3/2004 | Sumiya | |
| 6,738,054 B1 | 5/2004 | Yamaguchi | |
| 6,879,174 B2 | 4/2005 | Uchida | |
| 7,034,788 B2 | 4/2006 | Someya et al. | |
| 7,091,937 B2 | 8/2006 | Nakamura | |
| 7,098,980 B2 * | 8/2006 | Hirota | 349/141 |
| 2001/0013920 A1 * | 8/2001 | Hashimoto et al. | 349/187 |
| 2001/0024178 A1 | 9/2001 | Takeuchi et al. | |
| 2002/0054251 A1 * | 5/2002 | Maruyama et al. | 349/88 |
| 2002/0067448 A1 | 6/2002 | Kim et al. | |
| 2003/0039770 A1 | 2/2003 | Sato et al. | |
| 2003/0075721 A1 * | 4/2003 | Li | 257/80 |
| 2004/0165125 A1 * | 8/2004 | Saida et al. | 349/96 |
| 2005/0041196 A1 | 2/2005 | Ishihara et al. | |
| 2005/0074564 A1 * | 4/2005 | Yamaoka et al. | 428/1.1 |
| 2005/0151912 A1 | 7/2005 | Miyachi et al. | |
| 2005/0162607 A1 | 7/2005 | Miyachi et al. | |
| 2005/0168663 A1 * | 8/2005 | Miyachi et al. | 349/24 |
| 2005/0179632 A1 | 8/2005 | Miyachi et al. | |
| 2005/0179847 A1 | 8/2005 | Miyachi et al. | |
| 2005/0185105 A1 | 8/2005 | Miyachi et al. | |
| 2005/0185125 A1 | 8/2005 | Miyachi et al. | |
| 2005/0185131 A1 | 8/2005 | Miyachi et al. | |
| 2005/0237472 A1 | 10/2005 | Shibahara et al. | |
| 2007/0070282 A1 | 3/2007 | Shibahara et al. | |
| 2007/0080370 A1 | 4/2007 | Miyachi et al. | |
| 2008/0106689 A1 | 5/2008 | Inoue et al. | |
| 2008/0129929 A1 | 6/2008 | Miyachi et al. | |
| 2009/0161042 A1 | 6/2009 | Inoue et al. | |

FOREIGN PATENT DOCUMENTS

| | | |
|---|---|---|
| JP | 7-209662 | 8/1995 |
| JP | 7-209662 A | 8/1995 |
| JP | 9-243984 | 9/1997 |
| JP | 11-142823 | 5/1999 |
| JP | 11-142823 A | 5/1999 |
| JP | 11-183937 | 7/1999 |
| JP | 11-183937 A | 7/1999 |
| JP | 2001-42833 A | 2/2001 |
| JP | 2001-100256 | 4/2001 |
| JP | 2001-100256 A | 4/2001 |
| JP | 2001-133752 | 5/2001 |
| JP | 2001-133752 A | 5/2001 |
| JP | 2001-249363 | 9/2001 |
| JP | 2001-249363 A | 9/2001 |
| JP | 2002-189222 A | 7/2002 |
| JP | 2003-167273 | 6/2003 |
| JP | 2003-167273 A | 6/2003 |
| JP | 2003-172939 | 6/2003 |
| JP | 2003-172939 A | 6/2003 |
| JP | 2003-186032 | 7/2003 |
| JP | 2003-186032 A | 7/2003 |
| JP | 2003-215613 | 7/2003 |
| JP | 2003-215613 A | 7/2003 |
| JP | 2003-215641 | 7/2003 |
| JP | 2003-215641 A | 7/2003 |
| JP | 2003-280619 A | 10/2003 |
| JP | 2003-308057 A | 10/2003 |
| JP | 2003-327966 A | 11/2003 |
| JP | 2005-122105 | 5/2005 |
| JP | 2005-202383 | 7/2005 |
| JP | 2005-202390 | 7/2005 |
| JP | 2005-215339 A | 8/2005 |
| JP | 2005-300779 A | 10/2005 |
| JP | 2005-300780 A | 10/2005 |
| JP | 2005-308825 A | 11/2005 |
| JP | 2005-316011 A | 11/2005 |
| JP | 2005-316013 A | 11/2005 |
| JP | 2005-336477 | 12/2005 |
| JP | 2005-336477 A | 12/2005 |
| JP | 2005-338800 | 12/2005 |
| JP | 2006-3840 | 1/2006 |
| JP | 2006-3840 A | 1/2006 |
| JP | 2006-343697 A | 12/2006 |

OTHER PUBLICATIONS

International Search Report for PCT/JP2005/000944 dated May 17, 2005.
"Thermodynamics of a unique thermo-tropic liquid crystal having optical isotropy" (Kazuya Saito et al, Ekisho vol. 5, No. 1, pp. 20-27, 2001).
"Liquid crystal micro emulsion" (Jun Yamamoto, Ekisho vol. 4, No. 3, pp. 248-254, 2000).
"Handbook of Liquid Crystal, Low Molecular Weight Liquid Crystal" (S. Diele et al., Wiley-VCH, vol. 2B, pp. 887-900, 1998).
"First lecture of liquid crystal science experiment: Identification of liquid crystal phase: Lyotropic Liquid Crystal" (Jun Yamamoto, Ekisho vol. 6, No. 1 pp. 72-82, 2002).
"Structural Investigations on Smectic Blue Phases" (Eric Grelet et al., Physical Review Letters, The American Physical Society, vol. 86, No. 17, pp. 3791-3794, Apr. 23, 2001).
"Examining nano-structured liquid crystal phase by molecule simulator" (Makoto Yoneya, Ekisho vol. 7, No. 3, pp. 238-245, 2003).
"Fine droplets of liquid crystals in a transparent polymer and their response to an electric field" (Shiro Matsumoto et al., Appl. Phys. Le#., 69, pp. 1044-1046) (1996).
Office Action dated May 6, 2010 for U.S. Appl. No. 10/585,865, filed Jul. 11, 2006; Miyachi.
International Search Report for PCT/JP2006/311960 mailed Sep. 19, 2006.
Shiraishi et al, "Palladium Nanoparticles Covered with Liquid-Crystalline Molecules-Preparation and Electro-Optic Properties of Liquid-Crystal Displays Doped with Palladium Nanoparticles", Kobunshi Ronbunshu vol. 59, No. 12, Dec. 2002, pp. 753-759 (partial English translation).
Kikuchi et al, "Polymer-Stabilized Liquid Crystal Blue Phases", Nature Materials, vol. 1, 2002, pp. 64-68 (on line URL http://www.nature.com/maturematerials).
Office Action dated May 6, 2010 for U.S. Appl. No. 11/991,791, filed Mar. 11, 2008; Shibahara.
Office Action Mailed Jun. 23, 2011 in co-pending U.S. Appl. No. 11/991,791 (8 pages).
Office Action Mailed Feb. 2, 2011 in co-pending related U.S. Appl. No. 11/991,791 (9 pages).
Advisory Action Mailed Apr. 21, 2011 in co-pending related U.S. Appl. No. 11/991,791 (3 pages).
Advisory Action Mailed Mar. 9, 2011 in co-pending related U.S. Appl. No. 10/585,865 (3 pages).
Office Action mailed Sep. 13, 2011 in co-pending related U.S. Appl. No. 10/585,865.
International Search Report for PCT/JP2006/311621 mailed Jul. 18, 2006 w/ translation.
Miyachi et al., Office Action Mailed on Nov. 19, 2010, in U.S. Appl. No. 10/585,865, filed Jul. 11, 2006.
Notice of Allowance mailed Oct. 4, 2011 in co-pending U.S. Appl. No. 11/991,791.
Office Action issued on Feb. 27, 2012 in U.S. Appl. No. 10/585,865 (28 pages).
Yang et al, "Liquid Crystals in Complex Geometries Formed by Polymer and Porous Networks", edited by Crawford et al, Taylor & Francis, pp. 103-142.
Mizoshita et al, "Fast and High-Contrast Electro-optical Switching of Liquid-Crystalline Physical Gels: Formation of Oriented Microphase-Separated Structures", Advanced Functional Materials, vol. 13, No. 4, Apr. 2003, pp. 313-317.
"Cutting Edge of Liquid Crystal Display", edited by the Japanese Association of Liquid Crystal Scientists, Sigma Publishing, first edition, first printing, Oct. 10, 1996, p. 204 15.2.3 and p. 209 15.3.2 with partial English translation.

* cited by examiner

AT THE TIME OF DISPLAYING BLACK GRADATION

AT THE TIME OF DISPLAYING WHITE GRADATION

F I G. 5
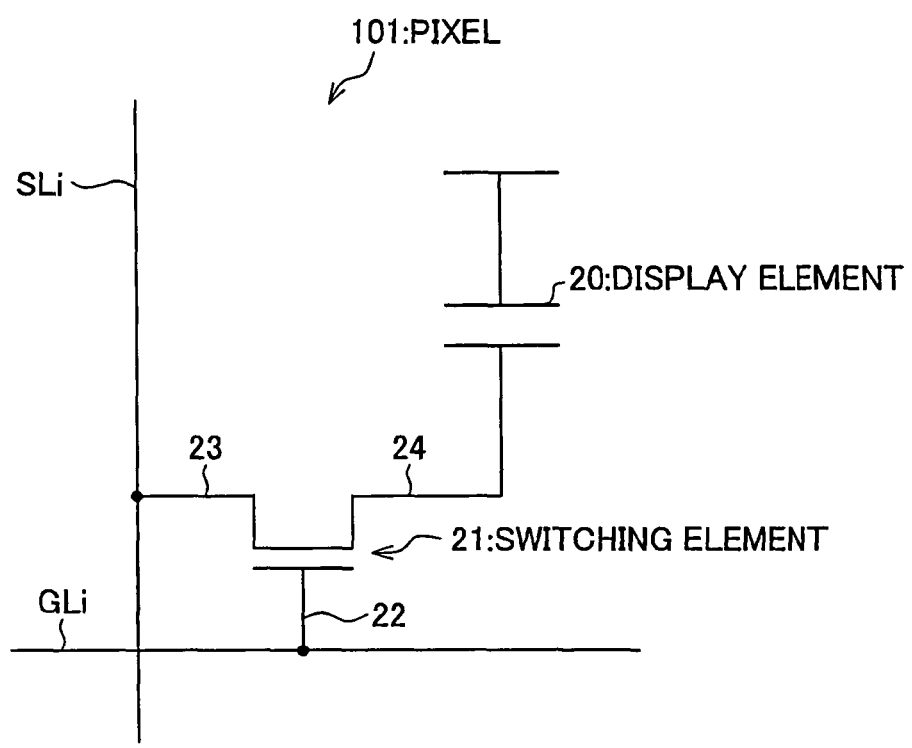

F I G. 6
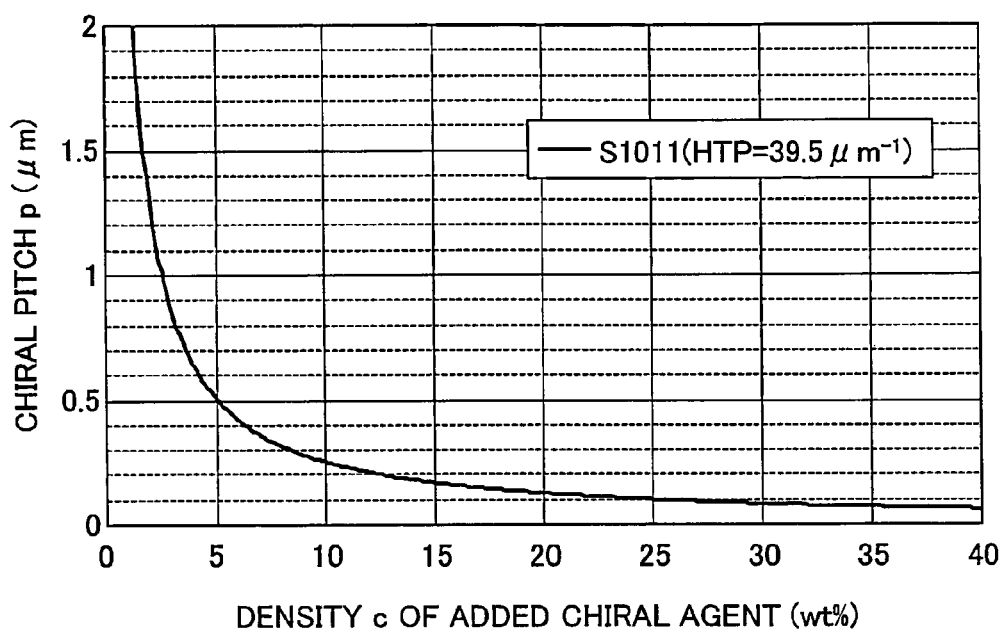

F I G. 7
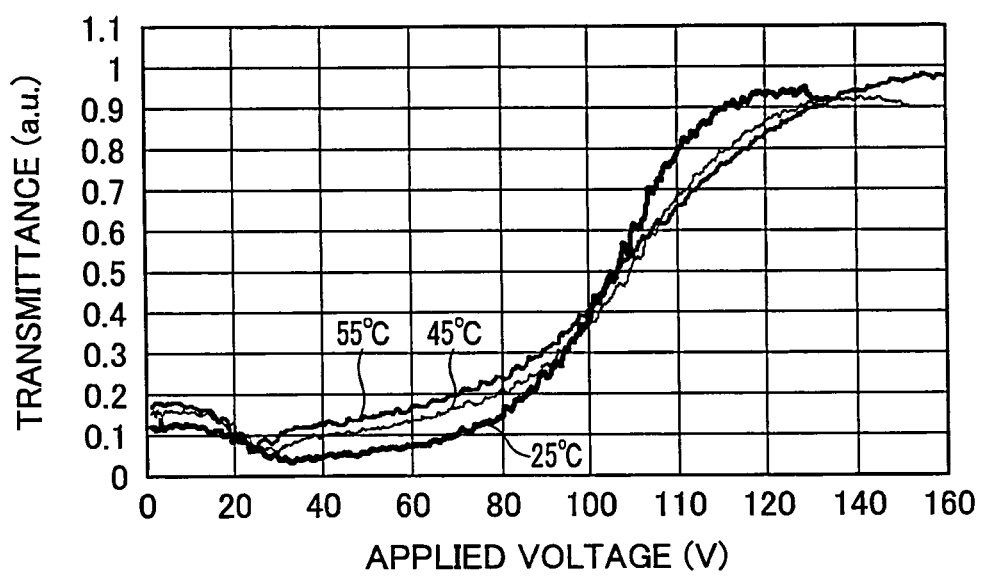

F I G. 8
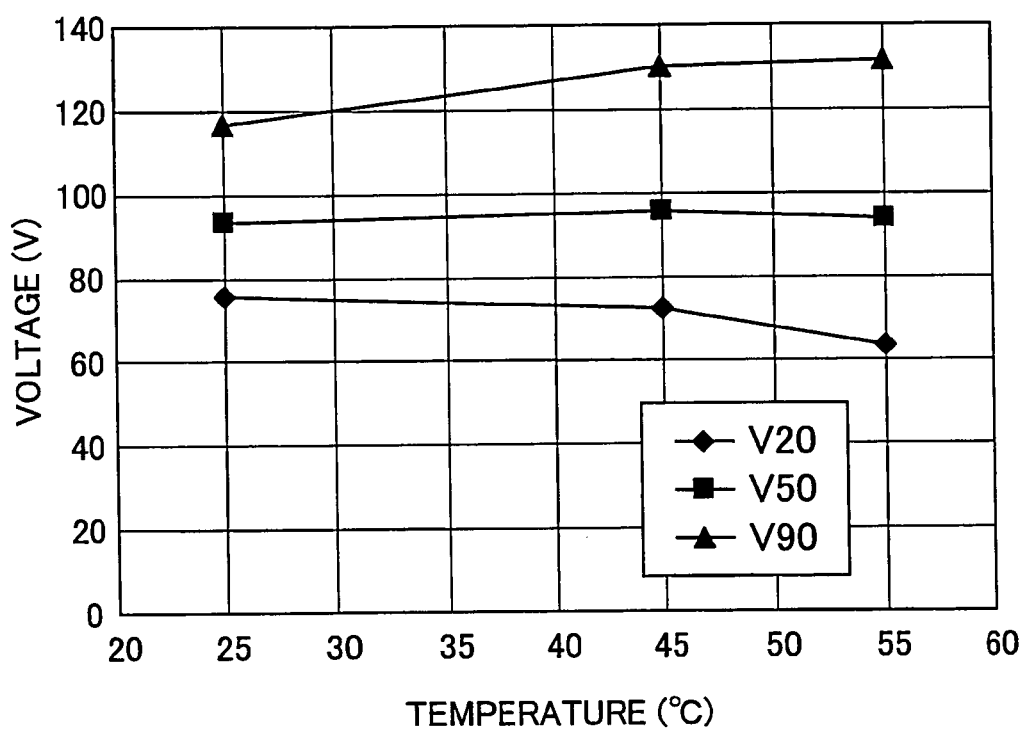

FIG. 10(a)
AT THE TIME OF APPLYING 150V
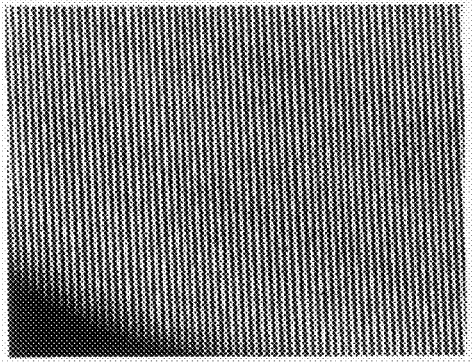
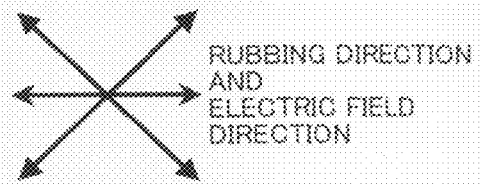
FIG. 10(b)
RIGHT AFTER APPLICATION OF 150V IS STOPPED
(BEFORE IRRADIATION OF UV)
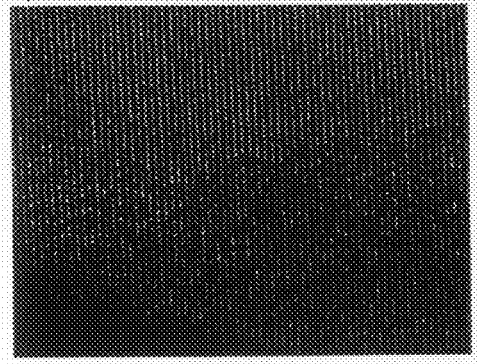
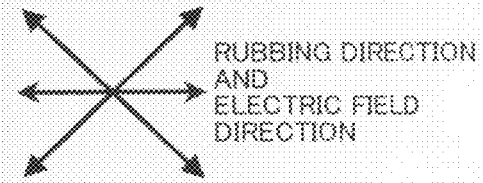
FIG. 10(c)
RIGHT AFTER APPLICATION OF 150V IS STOPPED
(AFTER IRRADIATION OF UV)
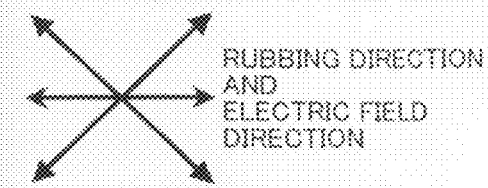

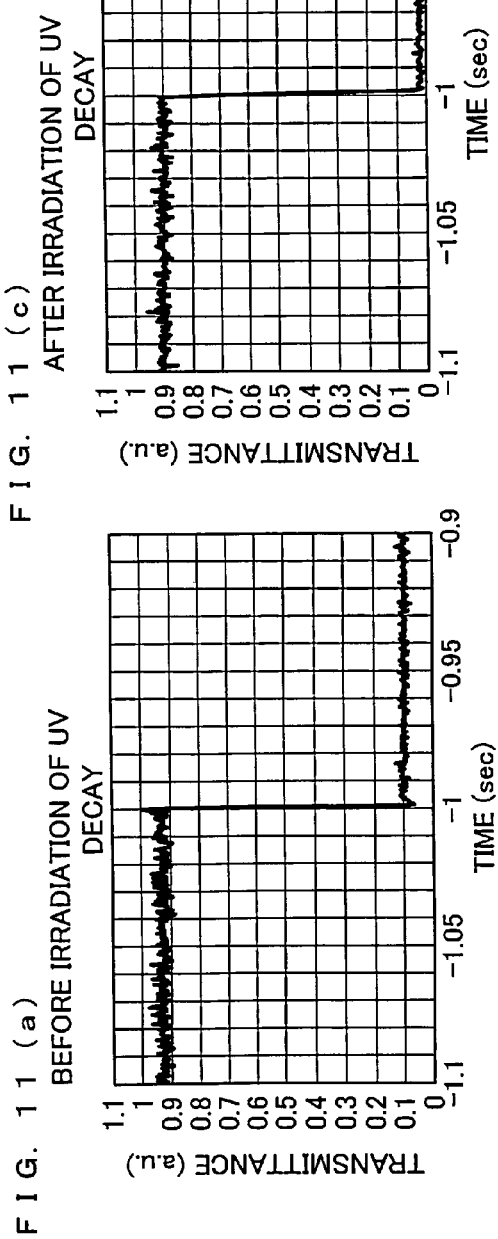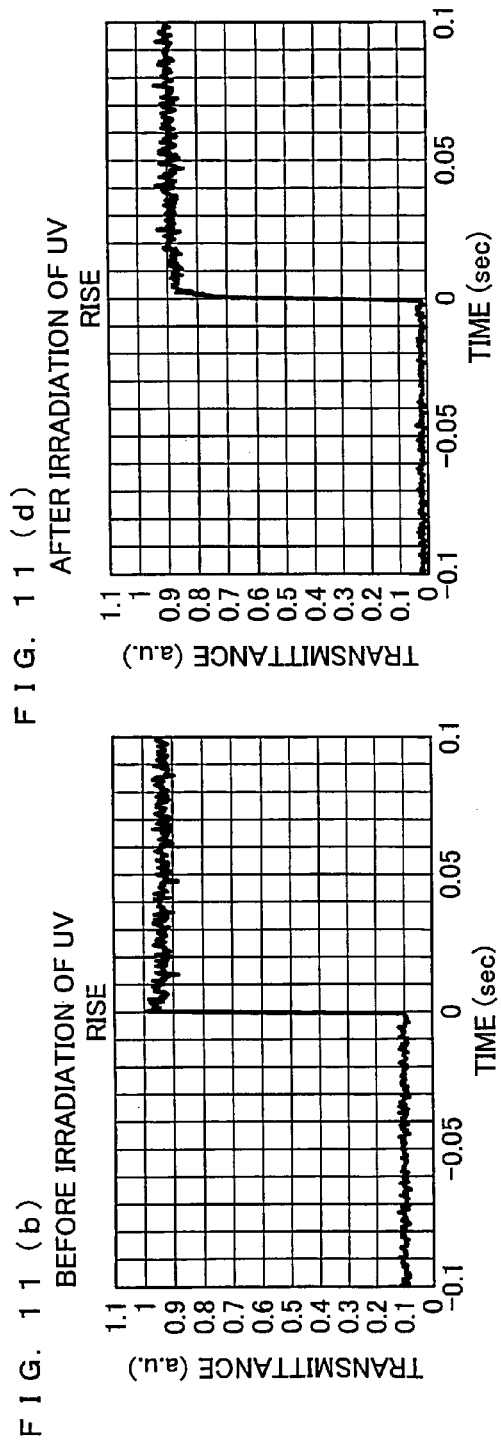

F I G. 1 3
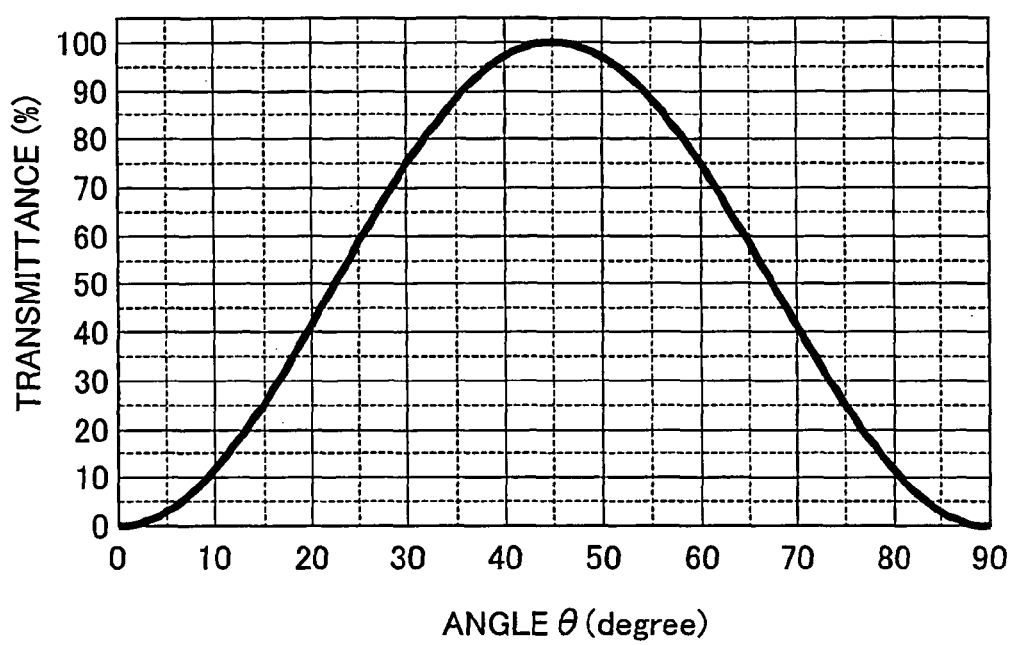

FIG. 16
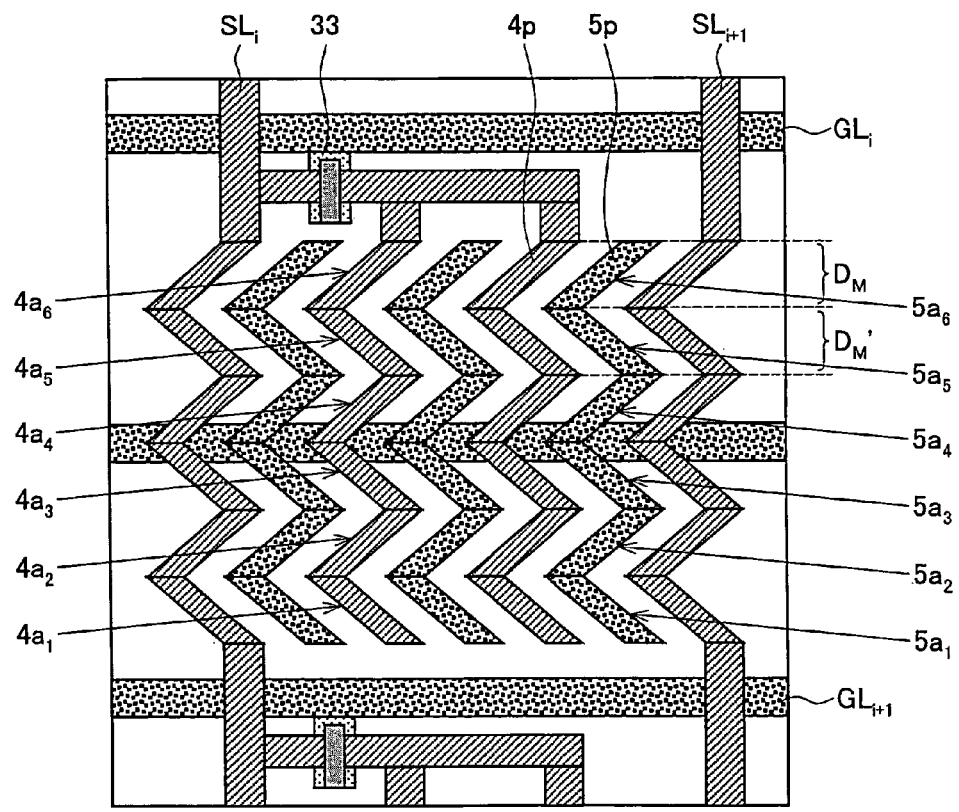
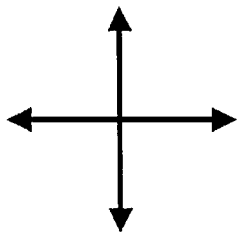
ABSORPTION AXIS DIRECTIONS
OF POLARIZERS PROVIDED
ON SURFACES OF SUBSTRATES
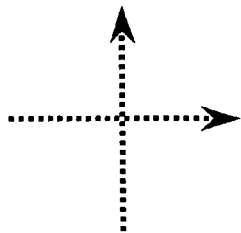
RUBBING DIRECTION
OF ALIGNMENT FILM 8
RUBBING DIRECTION
OF ALIGNMENT FILM 9

F I G. 2 5 (a)
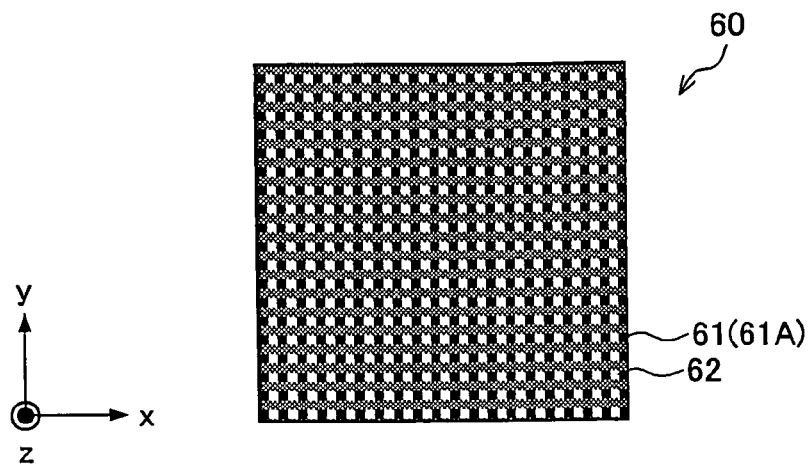
F I G. 2 5 (b)
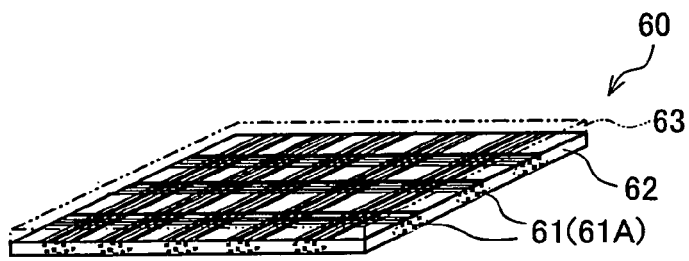
F I G. 2 5 (c)
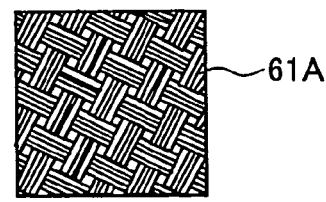

DISPLAY ELEMENT AND DISPLAY DEVICE

This application is the U.S. national phase of International Application No. PCT/JP2006/311621 filed 9 Jun. 2006 which designated the U.S. and claims priority to Japanese Application No. 2005-171725 filed 10 Jun. 2005, the entire contents of each of which are hereby incorporated by reference.

TECHNICAL FIELD

The technology presented herein relates to a display element and a display device, having high-speed response property, wide viewing angle property, and high contrast property, and exhibiting a wide temperature range for driving and are excellent in durability and reliability.

BACKGROUND AND SUMMARY

Liquid crystal display elements are advantageous in terms of their thin thickness, lightweight, and consumption of less power compared with other display elements. For that reason, liquid crystal display elements are widely used for image display devices such as TVs and monitors, OA (Office Automation) apparatuses such as word processors and personal computers, and image display devices mounted to video cameras, digital cameras, and information terminals such as mobile phones.

Conventional examples of liquid crystal display methods of liquid crystal display elements include: a twisted nematic (TN) mode using nematic liquid crystals; a display mode using ferroelectric liquid crystals (FLC) or anti-ferroelectric liquid crystals (AFLC); and a polymer dispersed liquid crystal display mode.

Among them, for example, a liquid crystal display element with a TN mode has come into practical use. However, the liquid crystal display element with a TN mode has disadvantages such as a slow response and a narrow viewing angle. These disadvantages prevent the liquid crystal display element to be superior to a CRT (cathode ray tube).

Although a display mode using FLC or AFLC has advantages such as a high-speed response and a wide viewing angle, the display mode using FLC or AFLC is greatly poor in terms of its anti-shock property and temperature property etc. Therefore, the display mode using FLC or AFLC has not come into practical use.

Further, the polymer dispersed liquid crystal display mode using light scattering does not require a polarizer and is capable of providing very bright display. However, the polymer dispersed liquid crystal display mode is unable to control a viewing angle by use of a phase plate, and has a problem in terms of response property. Accordingly, the polymer dispersed liquid crystal display mode has little superiority over the TN mode.

In all the foregoing display methods, liquid crystal molecules are aligned in a certain direction, and thus a displayed image looks differently depending on an angle between a line of vision and the liquid crystal molecules. On this account, all these display methods have viewing angle limits. Moreover, all the display methods utilize rotation of the liquid crystal molecules, the rotation caused by application of an electric field on the liquid crystal molecules. Because the liquid crystal molecules are rotated in alignment all together, responses take time in all the display methods. Liquid crystal display elements using the FLC or the AFLC are advantageous in terms of a response speed and a viewing angle, but have a problem in that their alignment can be irreversibly destroyed by an external force.

In contrast to those display methods in which rotation of liquid crystal molecules by the application of the electric field is utilized, there is proposed a display method in which the secondary electro-optical effect is utilized.

The electro-optical effect is a phenomenon in which a refractive index of a material is changed in response to an external electric field. There are two types of electro-optical effect: one is an effect proportional to the electric field and the other is proportional to square of the electric field. The former is called the Pockels effect: the latter is called the Kerr effect. The Kerr effect that is the secondary electro-optical effect was adopted early on in high-speed optical shutters, and has been practically used in special measurement instruments.

The Kerr effect was discovered by J. Kerr in 1875. So far, organic liquid such as nitrobenzene, carbon disulfide, and the like, are known as material showing the Kerr effect. These materials are used, for example, in the aforementioned optical shutters, optical modulation elements, and optical polarization elements. Further, these materials are used, e.g. for measuring strength of high electric fields for power cables and the like.

Later on, it was found that liquid crystal materials have a large Kerr constant at isotropic phase near nematic phase-isotropic phase change temperature ($T_{ni}$). Researches have been conducted to utilize the large Kerr constant of the liquid crystal materials for use in light modulation elements, light polarization elements, and further optical integrated circuits. It has been reported that some liquid crystal compounds have a Kerr constant more than 200 times higher than that of nitrobenzene.

Under such circumstances, studies for using the Kerr effect in display devices have begun. As compared with the Pockels effect proportional to an electric field, the Kerr effect is expected to work for a relatively low voltage driving since the Kerr effect is proportional to a square of the electric field. Further, the Kerr effect is expected to be applied to high-speed response display devices since the Kerr effect inherently exhibits responding property of several microseconds to several milliseconds.

A significant practical problem to be overcome for the utilization of the Kerr effect in display elements is that utilization of the Kerr effect requires a higher driving voltage compared with conventional liquid crystal display elements. Another problem is that conventionally known materials that show the Kerr effect has a very narrow temperature range in which the Kerr effect is shown.

In order to solve the former problem, Patent Document 1 for example mainly proposes a technique where the surface of a substrate is subjected to an aligning treatment beforehand in a display element that drives molecules having liquid crystallinity at an isotropic phase state, so as to attain a state in which the Kerr effect is easily shown.

In the display element disclosed in Patent Document 1, molecules having liquid crystallinity are provided between a pair of substrates. Further, pectinate electrodes are formed on the inner side of one substrate (the side facing the other substrate), and alignment films having been subjected to a rubbing treatment are formed on surfaces of the substrates. Further, polarizers are provided on the outer sides of the substrates so that absorption axes of the substrates cross each other at right angles. Further, alignment films formed on the surfaces of the electrodes are provided (subjected to a rubbing treatment) so that rubbing directions of the alignment films are reverse-parallel or parallel with each other, and cross the absorption axes of the polarizers at an angle of 45 degrees.

In the display element of Patent Document 1 having the above structure, when a voltage is applied across the pectinate electrodes and an electric field is generated in a direction parallel to the surface of the substrate, molecules having crystallinity are aligned so that polarization of the molecules is in a direction of an electric field and a long axis direction of the molecules is parallel to the rubbing direction. This allows the display element of Patent Document 1 to lower a driving voltage required for showing the Kerr effect.

However, although Patent Document 1 discloses lowering the driving voltage, Patent Document 1 does not disclose any method for enlarging the temperature range within which the Kerr effect is shown. Consequently, it is difficult to put Patent Document 1 into practical use.

On the other hand, Patent Document 2 discloses a technique where a liquid crystal material to which a chiral agent is added is mainly used as a liquid crystal material for an optical modulation element in order to enlarge the temperature range within which the Kerr effect is shown, and a blue phase shown between the temperature range of a cholesteric phase (chiral nematic phase) and the temperature range of an isotropic phase is stabilized using a polymer network.

As with the isotropic phase, the blue phase is optically transparent, and exhibits optical isotropy. Further, a material showing the blue phase has a wider temperature range than a substance showing the Kerr effect only in a pure isotropic phase by a temperature range of the blue phase. However, even when the temperature range within which the Kerr effect is shown is enlarged, it is merely several ° C. (several K, several Kelvin). This is inadequate for putting Patent Document 2 into practical use.

For that reason, in Patent Document 2, the blue phase is stabilized using the polymer network, so that the temperature range within which the Kerr effect is shown is enlarged to approximately 60K for example.

Conventional examples of a display mode using a cholesteric phase (chiral nematic phase) include an NCPT (Nematic-Cholesteric Phase Transition) mode disclosed in Non-patent Document 1 and a PSCT (Polymer Stabilized Cholesteric Texture) mode disclosed in Non-patent Document 2. These display modes are mainly applied to a reflective display such as an electronic paper and a dispersion-transmission display that does not require a polarizer. In these display modes, a phase change and bistability among a planar state, a focal conic (fingerprint) state, and a homeotropic alignment state are applied to display, and desired alignment states are switched by optimization of a driving voltage pulse so as to utilize memory property of the state.

Further, Patent Document 3 discloses a technique where an electric field in a direction parallel to a plane of a substrate is applied on a cholesteric liquid crystal layer and the pitch of the cholesteric phase is changed, so that a wavelength of selective reflection changes from a UV range to a visible light range and attains color display. That is, in the technique disclosed in Patent Document 3, pitch $P_0$ (natural chiral pitch $P_0$) that is a spontaneous twist at a time of applying no electric field is set to the UV range and the electric field in a direction parallel to a plane of a substrate is applied so as to obtain pitch $P_1$ or $P_2$ that is larger than $P_0$. Pitch of a twist at a time of applying an electric field or the wavelength of selective reflection is set to R (red), G (green), and B (blue) for example so as to attain color display. Further, Patent Document 3 discloses that three such cells are laminated and voltages to be applied on individual cells are adjusted so as to attain full color display. Further, Patent Document 3 discloses a technique where a polymer network is formed with the wavelength of selective reflection being in the UV range at a time of applying no electric field, so that elastic energy at the time of applying an electric filed is made effectively large, thereby speeding up restitution to the initial state (response speed of a relaxing process) at a time when application of the electric field is made off.

Further, Patent Document 4 discloses a technique where, in the display element for applying an electric field in a direction parallel to a plane of a substrate on a cholesteric liquid crystal layer, rubbing directions of alignment films formed on surfaces of upper and lower substrates are matched with axis directions of polarizers. Further, Patent Document 4 discloses that, in addition to the cholesteric liquid crystal layer to be driven, there is provided a cholesteric liquid crystal cell for optical compensation, that has a twist direction reversal to that of the cholesteric liquid crystal layer.

Patent Document 1: Japanese Unexamined Patent Publication No. 249363/2001 (Tokukai 2001-249363, published on Sep. 14, 2001)

Patent Document 2: Japanese Unexamined Patent Publication No. 327966/2003 (Tokukai 2003-327966, published on Nov. 19, 2003)

Patent Document 3: Japanese Unexamined Patent Publication No. 142823/1999 (Tokukaihei 11-142823, published on May 28, 1999)

Patent Document 4: Japanese Unexamined Patent Publication No. 189222/2002 (Tokukai 2002-189222, published on Jul. 5, 2002)

Non-patent Document 1: edited by The Japanese Association of Liquid Crystal Scientists, "Cutting edge of liquid crystal display", p. 200-219, Sigma publishing, first edition, first printing, Oct. 10, 1996.

Non-patent Document 2: edited by Gregory Philip Crawford and Slobodan Zumer, "Liquid Crystals in Complex Geometries Formed by polymer and porous networks", p. 103-142, Taylor & Francis, 1996

Non-patent Document 3: Takashi Kato and two others, "Fast and High-Contrast Electro-optical Switching of Liquid-Crystalline Physical Gels: Formation of Oriented Microphase-Separated Structures", Adv. Funct. Mater., April, 2003, vol. 13. No. 4, p 313-317

However, as the display element disclosed in Patent Document 1 uses a pure isotropic phase of a liquid crystal material, it is impossible in principle to enlarge the temperature range for driving.

Further, as the technique disclosed in Patent Document 2 uses a blue phase that has not been put into practical use in a display device, the technique is unknown in terms of specific factors such as quality and reliability, and accordingly the technique is still suspicious in terms of durability against application of an electric field and reliability. That is, as the blue phase is an unstable phase in essence, even when the blue phase is stabilized using a polymer network, the blue phase is weaker than, for example, a nematic phase used in a conventional liquid crystal display device in terms of repeated switching on/off of an electric field and application of a high electric field. Therefore, it is expected that the blue phase be destroyed at an area near an electrode where the electric field is relatively strong.

Further, each of Patent Documents 3 and 4 discloses a display element that is driven by applying an electric field in a direction parallel to a plane of a substrate on a chiral nematic liquid crystal phase (cholesteric liquid crystal phase) having been put into practical use in a conventional liquid crystal display device. However, the display elements of Patent Documents 3 and 4 have, in essence, a slower response speed, a narrower viewing angle, and lower contrast than the display elements of Patent Documents 1 and 2 that utilize the Kerr effect to perform display. That is, the techniques disclosed in Patent Documents 3 and 4 cannot attain high-speed response property, wide viewing angle property, and high contrast property that are essential properties of the display device utilizing the Kerr effect.

The example embodiments presented herein were made in view of the foregoing problems. A feature of the present embodiments is to provide a display element and a display device that has high-speed response property, wide viewing angle property, and high contrast property, that has a wide temperature range for driving, and that is excellent in durability and reliability.

In order to solve the foregoing problems, the display element of an example embodiment is a display element, comprising: a pair of substrates, at least one of which is transparent; and a liquid crystal layer provided between the substrates, the liquid crystal layer being made of a medium having spontaneous twist pitch that is less than a wavelength of visible light, and the liquid crystal layer exhibiting optical anisotropy in a direction substantially parallel to a plane of each substrate (specifically, the direction forms an angle within a range of ±10 degrees (inclination) with respect to a plane of each substrate, and the direction is preferably parallel to a plane of each substrate) in response to application of an external field on the liquid crystal layer. The external field may be anything as long as it can change optical anisotropy of the medium. Examples of the external field include an electric field, a magnetic field, and light.

With the arrangement, the liquid crystal layer has spontaneous twist pitch less than a wavelength of visible light, and therefore exhibits optical isotropy in a direction substantially parallel to a plane of each substrate. When an external field is applied on the liquid crystal layer, alignment of liquid crystal molecules that constitute a medium changes and the liquid crystal layer exhibits optical anisotropy in a direction substantially parallel to a plane of each substrate. Here, a change in the degree of optical anisotropy means a change in the shape of refractive index ellipsoid. That is, the display element of the present embodiment realizes different display states by using a change in the shape of refractive index ellipsoid seen from a direction normal to a plane of each substrate at a time of applying no external field and at a time of applying an external field.

In contrast, a conventional liquid crystal display element applies an electric field on a medium so as to perform display. Refractive index ellipsoid maintains substantially the same elliptic shape at a time of applying an electric field and at a time of applying no electric field, and a long axis direction of the refractive index ellipsoid changes. That is, in the conventional liquid crystal display element, liquid crystal molecules are aligned in a uniform direction, and application of an electric field changes an alignment direction of the liquid crystal molecules (typically, rotates the liquid crystal molecules by 90 degrees) so as to realize different display states at a time of applying no electric field and at a time of applying an electric field. Therefore, the display element of the present embodiment has a principle for display that is greatly different from the conventional liquid crystal display element.

As described above, in the conventional liquid crystal display element, the amount of a change in an alignment direction of liquid crystal molecules is large, and as a result viscosity specific to a liquid crystal greatly affects response speed. In contrast, with the aforementioned arrangement, display is performed using a change in the degree of optical anisotropy of the liquid crystal layer. Therefore, with the aforementioned arrangement, viscosity specific to a liquid crystal does not greatly affect response speed unlike in the conventional liquid crystal display element. Accordingly, it is possible to realize higher response speed than the conventional liquid crystal display element. That is, the display element of the present embodiment switches between optical isotropy and optical anisotropy in a direction substantially parallel to a plane of each substrate in response to switching between application of an external field and application of no external field. Consequently, the display element of the present embodiment realizes response speed that is substantially as high as response speed of a conventional display element that performs display using the Kerr effect (response speed that is substantially a sub micro second).

Further, with the aforementioned arrangement, the display element of the present embodiment exhibits optical isotropy in a direction substantially parallel to a plane of each substrate at a time of applying no external field, and the display element of the present embodiment exhibits optical anisotropy in a direction substantially parallel to a plane of each substrate in response to application of an external field. Consequently, the display element of the present embodiment has wider viewing angle property than a conventional liquid crystal display element in which liquid crystal molecules are aligned in a uniform direction and alignment of the liquid crystal molecules is changed in response to application of an electric field so as to perform display.

Further, with the aforementioned arrangement, spontaneous twist pitch is less than a wavelength of visible light and as a result transmittance at a time of applying no external field is very high, which realizes high contrast.

Further, in a conventional display element that performs display using the Kerr effect, a temperature range at which the display element can be driven in response to a practical driving voltage is several K or so. Patent Document 2 discloses that stabilization of a blue phase by using a polymer network allows enlargement of a temperature range at which the Kerr effect is exhibited to approximately 60K for example. However, as the blue phase is an unstable phase in essence, even when the blue phase is stabilized using a polymer, the blue phase is weak in terms of repeated switching on/off of an electric field and application of a high electric field. Therefore, it is expected that the blue phase be destroyed at an area near an electrode where the electric field is comparatively strong.

In contrast, with the aforementioned arrangement, a medium for the liquid crystal layer is only required to include spontaneous twist pitch that is less than a wavelength of visible light. An example of the medium is a liquid crystal material that exhibits a cholesteric phase. The liquid crystal material that exhibits a cholesteric phase has been put in practical use in a conventional liquid crystal display element, and it is known that the liquid crystal material that exhibits a cholesteric phase maintains a stable phase structure within a wide temperature range (however, the technique for performing display by using spontaneous twist pitch less than a wavelength of visible light has not been disclosed). Accordingly, with the aforementioned arrangement, it is possible to realize a display element that has a wide temperature range for driving and that has excellent durability and reliability.

Further, in order to solve the foregoing problems, the display device of the present embodiment includes the display element of the present embodiment.

Accordingly, with the aforementioned arrangement, it is possible to realize a display device that has high-speed response property, wide viewing angle property, and high contrast property, that has a wide temperature range for driving, and that is excellent in durability and reliability. The display element of the present embodiment has high-speed response property as described above. Accordingly, by use of this property, the display element is applicable to a display device of a field sequential color mode of performing time sharing driving in which colors of a light source such as a backlight are switched at high speed in one unit field so as to perform display.

BRIEF DESCRIPTION OF DRAWINGS

FIG. 5 is an equivalent circuit diagram illustrating an outline structure of a periphery of the display element included in the display device illustrated in FIG. 4.

FIG. 6 is a graph illustrating a correlation between density of an added chiral agent and chiral pitch in a liquid crystal material used in the display element of the embodiment.

FIG. 7 is a graph illustrating a voltage-transmittance property of the display element of the embodiment.

FIG. 8 is a graph illustrating temperature dependency of a voltage required for predetermined transmittance in the display element of the embodiment.

FIG. 10(a) is an explanatory drawing illustrating how the display element of the embodiment displays at a time of applying a high voltage.

FIG. 10(b) is an explanatory drawing illustrating how the display element without an alignment assisting material displays right after application of a high voltage is made off after the voltage is applied.

FIG. 10(c) is an explanatory drawing illustrating how the display element of the embodiment displays right after application of a high voltage is made off after the voltage is applied.

FIG. 11(a) is a graph illustrating a response property of the display element of the embodiment before a polymer network is formed.

FIG. 11(b) is a graph illustrating a response property of the display element of the embodiment before a polymer network is formed.

FIG. 11(c) is a graph illustrating a response property of the display element of the embodiment after a polymer network is formed.

FIG. 11(d) is a graph illustrating a response property of the display element of the embodiment after a polymer network is formed.

FIG. 13 is a graph illustrating transmittance of the display element of the embodiment in a case where a direction in which optical anisotropy is shown crosses an absorption axis direction of one polarizer at an angle of $\theta$.

FIG. 16 is a plan schematic illustrating the display element of the embodiment seen from a direction normal to a plane of a substrate in a case where the display element includes a zigzag-shaped pectinate electrode.

FIG. 25(a) is a plan drawing schematically illustrating a structure of a plastic substrate preferably used in the display element of the embodiment.

FIG. 25(b) is an oblique drawing schematically illustrating the structure of the plastic substrate preferably used in the display element of the embodiment.

FIG. 25(c) is a plan drawing schematically illustrating a structure of a plain-woven cloth used in a plastic substrate preferably used in the display element of the embodiment.

REFERENCE NUMERALS

Figure 1:
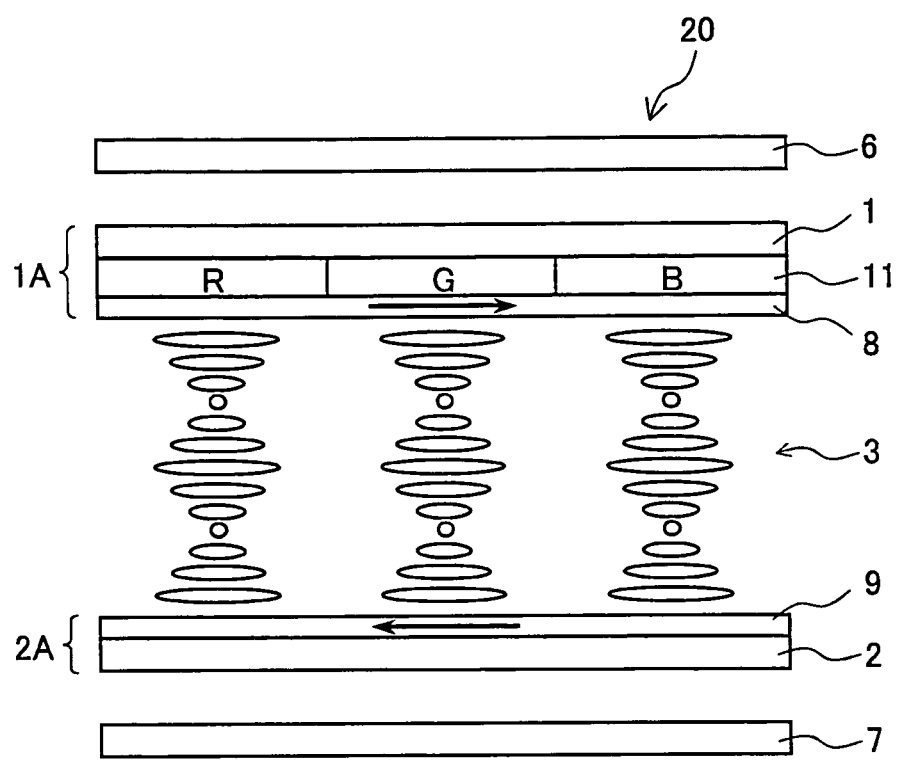
FIG. 1 is a cross sectional drawing schematically illustrating an outline structure of a display element of an embodiment.

1: substrate
1A: counter substrate (substrate)
2: substrate
2A: pixel substrate (substrate)
3: cholesteric liquid crystal layer (liquid crystal layer)
4, 4a: pectinate electrode
4aa, 4ab, 4p: pectinate part
$4a_1, 4a_2, \ldots, 4a_r$: linear part
5, 5a: pectinate electrode
5aa, 5ab, 5p: pectinate part
$5a_1, 5a_2, \ldots, 5a_r$: linear part
6, 7: polarizer (first polarizer, second polarizer)
6a, 7a: absorption axis direction
8, 9: alignment film (aligning means)
10: electrode couple
11: color filter layer
20, 20a: display element
21: switching element
22: gate electrode
23: source electrode
24: drain electrode
31: data signal line
32: scanning signal line
40: sealing material
41: resin layer
42: resin layer
43: spacer
43a: plastic bead
43b: rib-shaped spacer
60: complex substrate
61: fiber bundle
61A: fiber
62: resin matrix
100: display device
101: pixel
102: display panel
103: source driver
104: gate driver
106: power supply circuit

BEST MODE FOR CARRYING OUT THE INVENTION

[Embodiment 1]
(Structure of Display Element 20)

Figure 4:
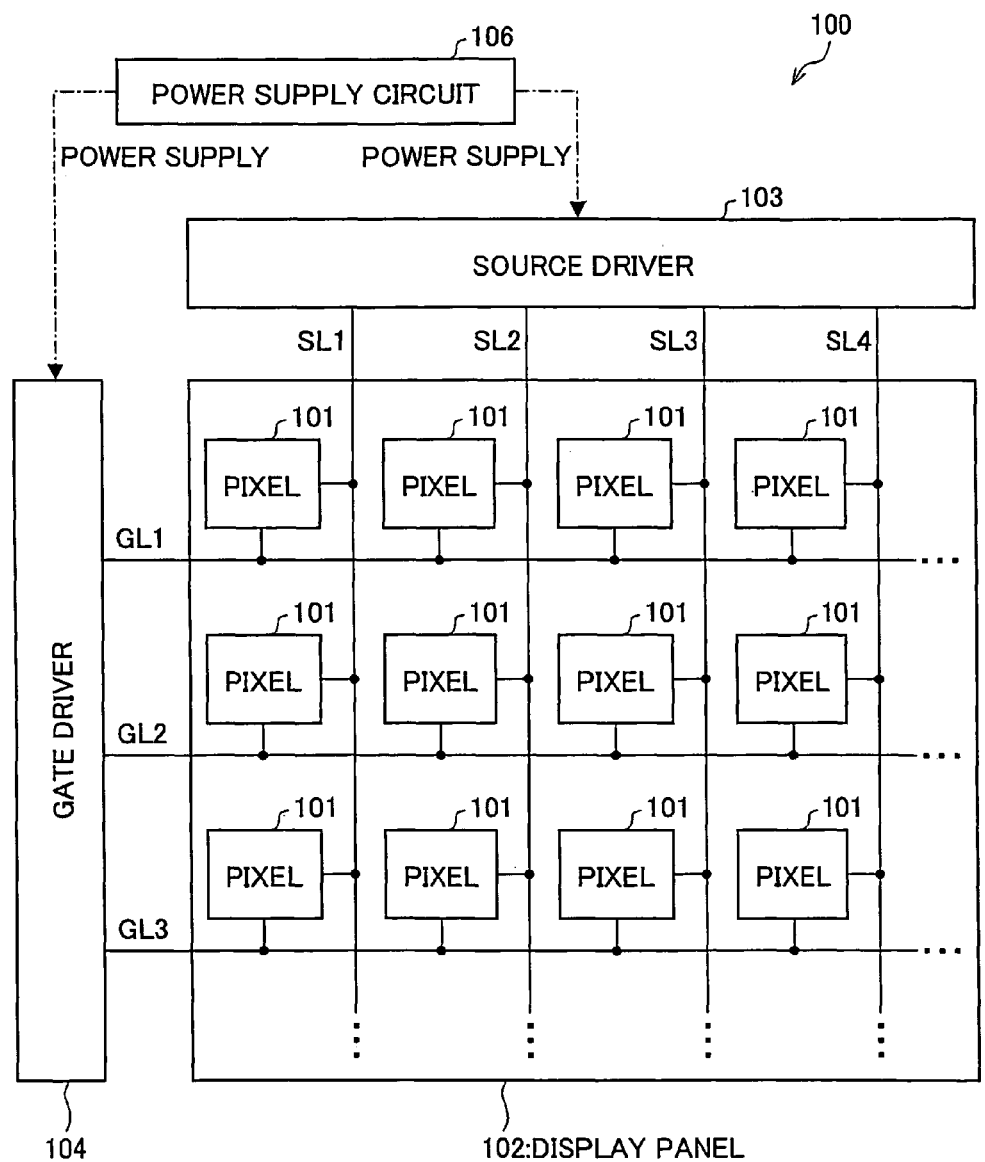
FIG. 4 is a block diagram illustrating an outline structure of a main part of a display device including the display element of the embodiment.

The following explains an embodiment with reference to drawings. FIG. 1 is a cross-sectional drawing schematically illustrating an outline structure of a display element 20 of the present embodiment. FIG. 4 is a block diagram schematically illustrating an outline structure of a main part of a display device 100 including the display element 20. FIG. 5 is an equivalent circuit diagram schematically illustrating an outline structure of a periphery of the display element 20.

The display element 20 of the present embodiment uses as an optical modulation layer a cholesteric liquid crystal layer that exhibits optical isotropy in a direction parallel to a plane of a substrate at a time when no electric field is applied, and the display element 20 performs display by applying an electric field on the cholesteric liquid crystal layer so as to exhibit optical anisotropy in the direction parallel to the plane of the substrate. That is, the display element 20 adopts a cholesteric liquid crystal layer having a spontaneous twist whose pitch (natural chiral pitch) is less than the wavelength of visible light, so that the liquid crystal layer is substantially transparent when no electric field is applied. When the electric field is applied, the display element 2 changes transmittance of the cholesteric liquid crystal layer so as to perform display.

As illustrated in FIG. 4, the display device 100 includes: a display panel 102 having pixels 101 arranged in a matrix manner; a source driver 103 and a gate driver 104 as driving circuits; a power supply circuit 106; and others.

As illustrated in FIG. 5, each of the pixels 101 is provided with the display element 20 and a switching element 21.

The display panel 102 further includes a plurality of data signal lines SL1 to SLn (n is any integer of 2 or more) and a plurality of scanning signal lines GL1 to GLm (m is any integer of 2 or more) that intersect the data signal lines SL1 to SLn, respectively. The pixel 101 is provided for each of the combinations of the data signal lines SL1 to SLn and the scanning signal lines GL1 to GLm.

The power supply circuit 106 supplies voltages, to the source driver 103 and the gate driver 104, for allowing the display panel 102 to provide displays. This causes the source driver 103 to drive the data signal lines SL1 to SLn of the display panel 102, and causes the gate driver 104 to drive the scanning signal lines GL1 to GLm of the display panel 102.

As the switching element 21, FET (field effect transistor) or TFT (thin film transistor) is used for example. Further, as illustrated in FIG. 5, the switching element 21 has (i) a gate electrode 22 connected to a scanning signal line GLi, (ii) a source electrode 23 connected to a data signal line SLi, and (iii) a drain electrode 24 connected to one end of the display element 20. The other end of the display element 20 is connected to a common electrode line (not shown) for common use in all of the pixels 101. With this arrangement, in the pixel 101, when the scanning signal line GLi (i is any integer of 1 or more) is selected, the switching element 21 is brought into conduction, and a signal voltage determined by a display data signal supplied from a controller (not shown) is applied from the source driver 103 to the display element 20 via the data signal line SLi (i is any integer of 1 or more). While the switching element 21 is interrupted after the select period of the scanning signal line GLi is ended, the display element 20 ideally keeps holding a voltage at the time of the interruption.

As illustrated in FIG. 1, the display element 20 includes (i) two substrates (counter substrate 1A and pixel substrate 2A) that face each other, serving as medium holding means (optical modulation layer holding means) and (ii) a cholesteric liquid crystal layer 3 provided between the two substrates, serving as a display layer (liquid crystal layer) for performing display.

The counter substrate 1A and the pixel substrate 2A include, as base substrates, transparent substrates (substrates 1 and 2), respectively. That is, the display element 20 includes (i) two transparent substrates (substrates 1 and 2) that face each other and (ii) the cholesteric liquid crystal layer 3 provided between the two transparent substrates. In the following embodiment, the substrates which face each other and between which the liquid crystal layer is provided are the counter substrate 1A and the pixel substrate 2A. Explanations will be made mainly as to a case where the counter substrate 1A is regarded as a substrate at the observer's side. However, the present invention is not limited to this case.

In the present embodiment, each of the two substrates 1 and 2 that face each other is a transparent substrate. However, the present invention is not limited to this case. For example, the display element 20 may be a reflective display element that performs display by causing light from the substrate at the observer's side to be reflected by the other substrate. In that case, the substrate at the observer's side is transparent. That is, one of the two substrates that face each other is transparent.

Further, the inner plane of the substrate 1 (the plane facing the substrate 2) is provided with a color filter layer 11 having three primary color layers such as R (red), G (green), and B (blue) layers that are provided in parallel.

Further, the inner plane of the substrate 2 is provided with pectinate electrodes 4 and 5 (electric field applying means. See FIGS. 2(a) and 2(b)) that serve as electrodes for applying on the cholesteric liquid crystal layer 3 an electric field in a direction parallel to a plane of the substrate, that is, an electric field parallel (substantially parallel) to the substrate 1 (horizontal electric field).

Further, the inner planes of the substrates 1 and 2 are provided with alignment films 8 and 9, respectively, which face the cholesteric liquid crystal layer 3. The surfaces of the alignment films 8 and 9 have been subjected to a rubbing treatment in a reverse-parallel manner (in parallel and in a reverse direction).

Further, individual planes (outer planes) of the substrates 1 and 2 that are opposite to the facing planes of the substrates 1 and 2 are provided with polarizers 6 and 7 (first polarizer and second polarizer), respectively. An optical retardation film may be provided between the polarizer 6 and the substrate 1 and between the polarizer 7 and the substrate 2 in order to further improve viewing angle property. When the display element 20 displays a black gradation, the display element 20 substantially has optical isotropy seen from a direction normal to the substrate. Accordingly, it is easier for the display element 20 to perform optical compensation by use of an optical retardation film compared with a conventional liquid crystal display element. Therefore, it is easy to design the display element 20 so that the display element 20 has super wide viewing angle property.

FIGS. 2(a) and 2(b) are cross sectional drawings that more specifically explain the structure of the display element 20. FIGS. 2(a) and 2(b) show a pixel (picture element, one pixel corresponding to any one of R, G, and B for example) of the display element 20. For convenience of explanation, FIGS. 2(a) and 2(b) do not show the polarizers 6 and 7 and the color filter layer 11. Further, FIG. 2(a) shows a case where a voltage applied across the pectinate electrodes 4 and 5 is not more than a threshold voltage (alternatively, 0), that is, a state where a black gradation is displayed. Further, FIG. 2(b) shows a state where a voltage for displaying a white gradation is applied across the pectinate electrodes 4 and 5.

The substrates 1 and 2 are made of glass substrates. Further, a distance between the two substrates of the display element 20, that is, a thickness of the cholesteric liquid crystal layer 3 (cell thickness d) is set to 4.5 μm.

Further, as illustrated in FIGS. 2(a) and 2(b), the inner plane of the substrate 2 is provided with the pectinate electrodes 4 and 5 for example that serve as electric field applying means for applying an electric field in a direction perpendicular to a plane of the substrate. In the display element 20, the pectinate electrodes 4 and 5 are made of Cr (chrome).

Figure 3:
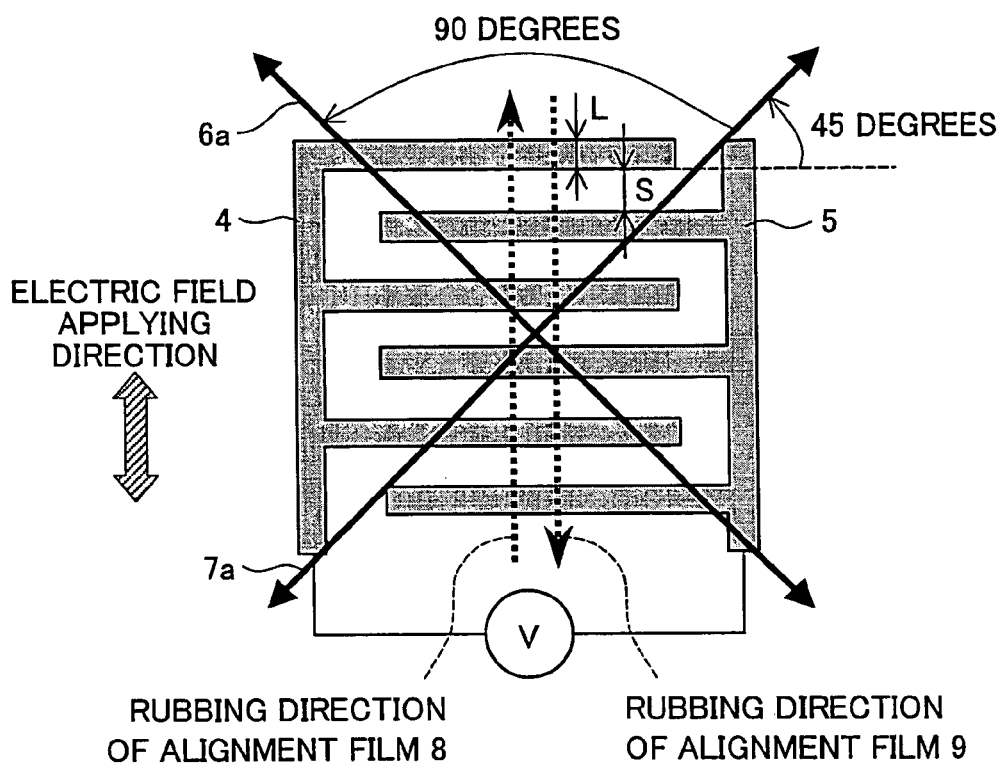
FIG. 3 is a plan schematic illustrating the display element of the embodiment that is seen from a direction normal to a plane of a substrate, explaining an electric field applying direction, an alignment direction, and an absorption axis direction of a polarizer in the display element.

FIG. 3 is a plane schematic illustrating the display element 20 seen from a direction normal to the substrate, explaining an electric field applying direction, an aligning direction, and an absorption axis direction of the polarizer (hereinafter referred to as "absorption axis direction") of a liquid crystal cell (display element 20) of the present embodiment. FIG. 3 also shows rubbing directions of the alignment films 8 and 9 and absorption axis directions 6a and 7a of the polarizers 6 and 7.

In the display element 20, an electrode width L that is a width of the pectinate electrodes 4 and 5 in an electric field applying direction is set to 7 μm, and an electrode distance S that is a distance between the pectinate electrodes 4 and 5 in the electric field applying direction is set to 7 μm. As the present embodiment uses Cr (chrome) electrodes as the pectinate electrodes 4 and 5, electrode sections are light-shielding areas. However, the electrode sections are not necessarily light-shielding electrodes. For example, an electrode (transparent pectinate electrode) made of transparent metal such as ITO (indium tin oxide) may be used. In that case, an optical effect at areas that superimpose the electrodes seen from an observing direction can be used in display, which increases transmittance.

Further, as illustrated in FIG. 3, in the display element 20, the alignment films 8 and 9 are subjected to rubbing treatments so that rubbing directions of the alignment films 8 and 9 are reverse-parallel to each other. Further, as shown by the absorption axis directions 6a and 7a in FIG. 3, the absorption axis directions of the polarizers 6 and 7 are orthogonal to each other. Further, the rubbing directions of the alignment films 8 and 9 and the absorption axis directions 6a and 7a of the polarizers 6 and 7 are provided so that the rubbing directions cross the absorption axis directions 6a and 7a at an angle of 45 degrees. Further, in the display element 20, the rubbing directions of the alignment films 8 and 9 are parallel to directions in which the pectinate electrodes 4 and 5 apply electric fields in an in-substrate direction (direction parallel to a plane of the substrate).

The alignment films 8 and 9 are commercially available polyimide "AL3046" (product name, manufactured by JSR (Japan Synthetic Rubber) Corporation). The rubbing treatment is performed using a commercially available rayon cloth "YA-19R" (product name, manufactured by YOSHIKAWA CHEMICAL) under rubbing conditions such that pressing amount is 0.4 mm, speed of a moving stage is 100 mm/sec, and the number of rotation of roller is 300 rpm.

The following details the cholesteric liquid crystal layer 3. A liquid crystal material to be included in the cholesteric liquid crystal layer 3 is commercially available positive nematic liquid crystal material "E8" (model number, manufactured by BDH (British Drug House). The liquid crystal material "E8" exhibits a nematic phase at room temperature, has relatively high nematic-isotropic phase change temperature ($T_{ni}$), and has large refractive index anisotropy Δn and large permittivity anisotropy Δε. Consequently, "E8" exhibits optical isotropy within a wide temperature range including a room temperature at a time of applying no electric field, and can switch to a state of exhibiting optical anisotropy in response to a low driving voltage. Therefore, "E8" is suitable for the liquid crystal material used in the display element 20.

The liquid crystal material "E8" consists of compound (1) (45 weight %), compound (2) (16 weight %), compound (3) (11 weight %), compound (4) (16 weight %), and compound (5) (12 weight %) as presented below.

[Compound 1]

(1)

[Compound 2]

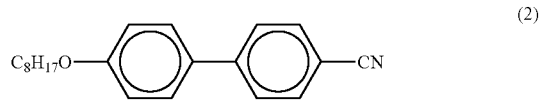

(2)

[Compound 3]

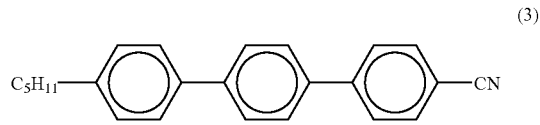

(3)

[Compound 4]

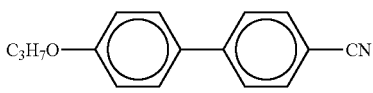
(4)

[Compound 5]

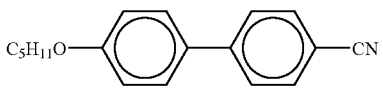
(5)

Further, refractive index anisotropy Δn (measurement wavelength was 589 nm and measurement temperature was 20° C.) of the liquid crystal material "E8" in the nematic phase was 0.2460 and permittivity anisotropy Δε (measurement frequency was 1 kHz and measurement temperature was 20° C.) of the "E8" in the nematic phase was 15.6. Refractive index anisotropy Δn (Δn=ne−no, ne: refractive index in a molecule long axis direction (refractive index of extraordinary light), no: refractive index in a molecule short axis direction (refractive index of ordinary light) was obtained by measuring ne and no using Abbe refractometer ("4T" (product name), manufactured by ATAGO CO., LTD.). Further, permittivity anisotropy Δε (Δε=ε∥−ε⊥, ε∥: permittivity in a long axis direction of molecules, ε⊥: permittivity in a short axis direction of molecules) was obtained by measuring ε∥ and ε⊥ using an impedance analyzer ("SI1260" (product name) manufactured by TOYO Corporation).

In the present embodiment, commercially available chiral agent "S1011" (model number, manufactured by E. Merck) was added to the liquid crystal material "E8" so that the density of the chiral agent "S1011" was 15 weight % in a mixture of the liquid crystal material "E8" and the chiral agent "S1011". The chiral agent "S1011" has a structure represented by the following structural formula (6). In the structural formula (6), *C represents asymmetric carbon atom (chiral center).

[Compound 6]

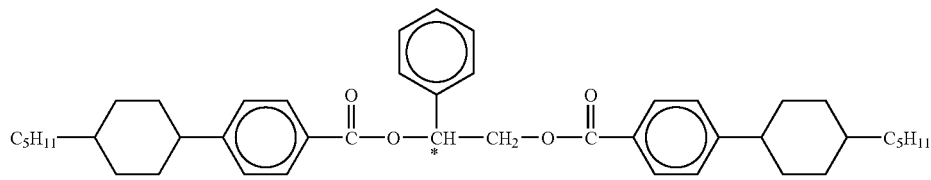
(6)

(Relation Between Density of Added Chiral Agent and Phase Change Temperature)

The following explains the reason why the mixture density of the chiral agent "S1011" was 15 weight %.

As described above, the display element 20 includes as an optical modulation layer a cholesteric liquid crystal layer that exhibits optical isotropy in a direction parallel to a plane of a substrate at a time of applying no electric field, and the display element 20 performs display by applying an electric field on the cholesteric liquid crystal layer so that the cholesteric liquid crystal layer exhibits optical anisotropy in the direction parallel to the plane of the substrate.

In order to analyze a relation between optical isotropy in the direction parallel to the plane of the substrate at a time of applying no electric field and density of the added chiral agent, chiral-added liquid crystal materials (1), (2), (3), (4), and (5) were provided. The chiral-added liquid crystal materials (1), (2), (3), (4), and (5) were obtained by adding the chiral agent "S1011" to the liquid crystal material "E8" as a host liquid crystal material so that the density of the chiral agent "S1011" with respect to the amount of a mixture of the "E8" and the "S1011" was 2 weight %, 5 weight %, 10 weight %, 15 weight %, and 20 weight %, respectively.

Nematic-isotropic phase change temperatures $T_{ni}$ of the chiral-added liquid crystal materials (1) to (5) were measured. The result of the measurement showed that the material (1) was 70.5° C., the material (2) was 69.7° C., the material (3) was 68.0° C., the material (4) was 61.6° C., and the material (5) was 54.6° C. $T_{ni}$ of the liquid crystal material "E8" to which the chiral agent "S1011" was not added at all was 71° C. Further, the lower limit of the temperature range at which the nematic phase is exhibited, that is, a phase change temperature at which the nematic phase changes to a phase (higher-order phase) that is shown at a lower temperature range than the nematic phase was not so affected by the amount of the added chiral agent, and was approximately 0° C. in each of the above cases.

As described above, the nematic-isotropic phase change temperature $T_{ni}$ dropped as the density of the added chiral agent increased. This is perhaps because addition of the chiral agent caused the depression of freezing point.

In the measurement of the phase change temperature, the chiral-added liquid crystals (1) to (5) were sealed in cells each of which had a thickness of 4.5 μm and which had no alignment film. Temperature was adjusted using a hot stage "Mettler FP400" (model number, manufactured by Mettler). Texture was visually observed using a polarization microscope and under crossed Nicols.

As the cells did not have alignment films, the chiralnematic phase (cholesteric phase) to which the chiral agent was added did not have aligning force on a plane of a substrate in a particular direction even if the pitch of spontaneous twist (natural chiral pitch) was shorter than an optical wavelength. Accordingly, each helical was aligned randomly. Therefore, disclination (alignment defect) inevitably existed among helices and thus caused light scattering. Consequently, the cholesteric liquid crystal layer did not go into a transparent state (optical isotropy state). Therefore, it was possible to visually confirm nematic (strictly speaking, chiralnematic, cholesteric)-isotropic phase change with sureness.

(Relation Between Density of Added Chiral Agent and Optical Isotropy at a Time of Applying No Electric Field)

A relation between density of the added chiral agent and optical isotropy in a direction parallel to the plane of the substrate at a time of applying no voltage was analyzed. Here, there was used a liquid crystal cell having the same structure as the display element 20 except that the liquid crystal cell did not have the color filter layer 11. That is, the analysis was made using cells whose cell thickness was 4.5 μm, obtained by providing alignment films 8 and 9 on two substrates (substrates 1 and 2) so that rubbing directions of the alignment films 8 and 9 were anti-parallel to each other, providing pectinate electrodes 4 and 5 whose width L was 7 μm and whose distance S was 7 μm on one substrate, and pouring the chiral-added liquid crystal materials (1) to (5), respectively. In the following explanation, the liquid crystal cells are referred to as liquid crystal cells (1) to (5) (for example, the chiral-added liquid crystal material (1) was poured into the liquid crystal cell (1) and the chiral-added liquid crystal material (2) was poured into the liquid crystal cell (2)).

It is known that a relation represented by the following relational expression (1) exists between chiral pitch p and density c of an added chiral agent.

$$p=1/kc \quad (1)$$

where k is a proportionality constant and indicates HTP (Helical Twisting Power) of the chiral agent.

That is, the relational expression (1) shows that the chiral pitch p gets shorter as the density c of the added chiral agent increases. k differs with respect to each chiral agent and specific to each chiral-added liquid crystal. Further, k differs with respect to the liquid crystal material (host liquid crystal material) to which the chiral agent is mixed.

FIG. 6 is a graph showing an example of plotting a relation between density c of the added chiral agent and chiral pitch p in a chiral-added liquid crystal material obtained by adding a chiral agent "S1011" to a liquid crystal material "E8". FIG. 6 shows a curve obtained from the relational expression (1) with HTP of the chiral agent "S1011" being 39.5 μm$^{-1}$. As described above, the correlation differs with respect to the host liquid crystal material (liquid crystal material to which a chiral agent has been added), and therefore different host liquid crystal material does not necessarily show the curve of FIG. 6. FIG. 6 is one standard.

The liquid crystal cells to which the chiral-added liquid crystal materials (1) to (5) had been added were subjected to a re-aligning treatment in which the temperature of each of the liquid crystal cells was increased up to a temperature that was higher than nematic-isotropic phase change temperature $T_{ni}$, that is, 90° C., and then decreased to a room temperature (25° C.).

After the re-aligning treatment, alignment of each liquid crystal cell in an equilibrium state after much time had passed was visually observed on a light table.

Specifically, two polarizers were provided on a light table in a crossed Nicols manner (provided so that absorption axis directions of the two polarizers crossed each other at a right angle), and the liquid crystal cells (1) to (5) were provided between the two polarizers. Further, the liquid crystal cells (1) to (5) were provided so that rubbing directions of the alignment films 8 and 9 of the liquid crystal cells (1) to (5) crossed the absorption axis directions of the polarizers at an angle of 45° C.

The result of the visual observation is shown in Table 1 as presented below.

TABLE 1

| Name of cell | Density of added S1011 (wt %) | Alignment at a time of applying no electric field |
|---|---|---|
| Liquid crystal cell (1) | 2 | Light leaks |
| Liquid crystal cell (2) | 5 | Light leaks |
| Liquid crystal cell (3) | 10 | Light leaks |
| Liquid crystal cell (4) | 15 | Light does not leak (transparent state) |
| Liquid crystal cell (5) | 20 | Light does not leak (transparent state) |
| Liquid crystal cell (6) | 11 | Light does not leak (transparent state) |

As shown in Table 1, in the liquid crystal cells (1) to (3), light transmits. In contrast, in the liquid crystal cells (4) and (5), light does not transmit and liquid crystals remain black.

This indicates as follows: the interfaces of the substrates 1 and 2 with the cholesteric liquid crystal layer 3 (hereinafter referred to as "substrate interface") were provided with alignment films having been subjected to an aligning treatment in one direction. Consequently, liquid crystal molecules that contact the upper and lower substrate interfaces were fixed in terms of their aligning directions so that the liquid crystal molecules were provided in a direction in which the aligning treatment had been made. Liquid crystal molecules between the two substrates (substrates 1 and 2) were aligned in such a manner that the liquid crystal molecules were twisted in an internal direction of the cells by an angle corresponding to a twist force of the chiral agent. Finally, the liquid crystal molecules were aligned so as to be continuously connected with liquid crystal molecules fixed to the other substrate interface. As described above, liquid crystal molecules at the substrate interfaces were fixed in one direction, and therefore a helical between the substrates 1 and 2 was equable (homogeneous, uniform), unlike the case of a cell without an alignment film in which helices were aligned in a random direction and alignment defect were seen between the helices.

At that time, total twist amount or twist pitch (chiral pitch p) in a cell depends on the density of the chiral agent. As shown in FIG. 6, as the density of the added chiral agent increases, the pitch gets shorter and the total twist amount gets larger.

In an equable alignment of helices (hereinafter referred to as "equable twist alignment"), when the chiral pitch p is relatively longer than a visible light wavelength, linearly polarized light incident to a cell via one polarizer can follow the twist. Consequently, the polarization state of the linearly polarized light changes (direction of linearly polarized light changes together with occurrence of elliptic polarized light). This generates a component other than the component absorbed by an absorption axis of the other polarizer under crossed Nicols. As a result, light transmits.

In contrast, in the equable twist alignment, when the chiral pitch p is relatively shorter than visible light, the linearly polarized light incident to the cell via one polarizer does not follow the twist, and maintains its polarization direction without being affected by the twist. As a result, light is completely absorbed by the absorption axis of the other polarizer and does not transmit.

Referring to FIG. 6, when the density c of the added chiral agent is 15 weight %, the chiral pitch p is approximately 0.2 μm or less, which is sufficiently shorter than the lower limit (approximately 0.38 μm, approximately 380 nm) of visible light. Consequently, under crossed Nicols, the visible light incident to the cell via one polarizer is absorbed by the other polarizer without being affected by the twist, resulting in a black state. It goes without saying that when the density c of the added chiral agent is 20 weight %, the chiral pitch p gets further shorter, and accordingly the visible light is not affected by the twist. In contrast, as shown in FIG. 6, when the density c of the added chiral agent is 10 weight % or less, the chiral pitch p ranges approximately from 0.2 µm to 0.3 µm. In this case, too, the chiral pitch p is shorter than the visible light wavelength. However, as described above, FIG. 6 is a standard curve obtained from the relational expression (1). In fact, it is deemed that the chiral pitch p was within the visible light wavelength as shown by the result of observation of the liquid crystal cell (3).

There was provided a liquid crystal cell (6) that was made in the same manner as the liquid crystal cells (1) to (5) except that the density of the added chiral agent was 11 weight %. The liquid crystal cell (6) was visually observed on a light table in the same manner as the liquid crystal cells (1) to (5). As a result, leakage of light was not observed as shown in Table 1.

Further, in the liquid crystal cells (1) to (6), selective reflection due to twist pitch of the chiral agent was not observed. The selective reflection is a phenomenon such that in one of right-handed circularly polarized light and left-handed circularly polarized light, only a component corresponding to a twist direction of a cholesteric phase is totally reflected. The selective reflection corresponds to so-called Bragg reflection due to a periodic structure of a lattice of a crystal. In the display element 20 of the present embodiment, it is not preferable to cause the Bragg reflection because the Bragg reflection leads to coloring etc. in display. Therefore, it is preferable that the selective reflection wavelength is shorter than the visible light wavelength. That is, unlike Patent Document 3 in which color display is performed by using selective reflection due to twist pitch of a cholesteric layer, it is preferable that selective reflection does not occur in the visible light wavelength in the display element 20 of the present embodiment.

The result of the above experiment showed that, in the liquid crystal cell including the alignment films 8 and 9 having been subjected to an aligning treatment, by using a chiral-added liquid crystal material whose chiral pitch p was relatively shorter than the visible light wavelength and providing polarizers in a crossed Nicols manner, it is possible to attain an optical isotropy state (transparent state) at a time of applying no voltage or at a time of applying low voltage that is not more than a voltage (threshold voltage) at which a change of alignment of a liquid crystal molecule affects optical change.

A feature of the present embodiment is causing a chiralnematic phase (cholesteric phase) to be substantially an optical isotropy state and driving the state. The present embodiment has in essence a wider temperature range for driving than the case of using so-called Kerr effect, that is, the case of driving an optical isotropy phase such as an isotropic phase and a blue phase (BP). That is, in the present embodiment, it is possible to attain an optical isotropy state at a temperature range at which a chiralnematic phase (cholesteric phase) is exhibited (a temperature range approximately from −30° C. to 90° C. for example in a case of TN (Twisted Nematic) liquid crystal material in practical use). In contrast, the temperature range at which it is possible to use the Kerr effect in the isotropic phase is approximately 1 K at the most, and the temperature range at which it is possible to use the Kerr effect in the blue phase is approximately several K. In the case of the blue phase disclosed in Patent Document 2 that is stabilized by a polymer network, the temperature range at which it is possible to use the Kerr effect is approximately 60K. However, as the blue phase is an unstable phase in essence, even when the blue phase is stabilized using a polymer network, the blue phase is weak in terms of repeated switching on/off of an electric field and application of a high electric field. Therefore, it is expected that the blue phase be destroyed at an area near an electrode where the electric field is comparatively strong.

Based on the result of the experiment, the density c of the added chiral agent of the display element of the present embodiment was set to 15 weight %. The density c of 15 weight % is higher than the lower limit (11 weight % as a result of the experiment) of the density c at which or over which it is possible to attain optical isotropy at a time of displaying black.

When the density c of the added chiral agent is too high, $T_{ni}$ drops and an effective temperature range for driving gets narrower and twist force due to the chiral agent gets too large, which increases a driving voltage. Further, when the density c of the added chiral agent increases and the ratio of a liquid crystal material to a mixture material drops too much, liquid crystallinity of the cholesteric liquid crystal layer 3 as a total medium (as a whole mixture material) drops. This makes it difficult to detect an electro-optical effect. In order to avoid the aforementioned inconveniences, it is preferable that the density c of the added chiral agent is set to 80 weight % or less.

(Result of Measurement of Voltage-Transmittance Property)

The measurement of electro-optical effect (measurement of voltage-transmittance property (V-T property)) was performed using the liquid crystal cell (4), i.e., the liquid crystal cell obtained by adding 15 weight % of the chiral agent "S1011" to the liquid crystal material "E8". Light to be observed was monochromatic light whose wavelength was 550 nm.

To be specific, a display element (4) was made by attaching a polarizer to outer plane of each of a pair of transparent substrates of the liquid crystal cell (4) that face each other. Further, the two polarizers were provided in a crossed Nicols manner (in such a manner that absorption axis directions of the two polarizers crossed each other at an angle of 90 degrees). Further, the polarizers were provided in such a manner that rubbing directions of the upper and lower substrates of the liquid crystal cell (4) crossed the absorption axis directions of the polarizers at an angle of 45 degrees. Further, in the display element (4), an electric field direction and the rubbing directions were parallel to each other (angles between the electric field direction and the rubbing directions were 0 degree).

Further, an electric field applying step was repeatedly performed in which a voltage applied across two electrodes was scanned and changed from 0V to approximately 160V, and thus the V-T property was measured. To be specific, the electric field applying step was repeatedly performed in which the voltage applied across the two electrodes gradually changed from 0V to approximately 160V, and thus the V-T property was measured.

The V-T property of the display element (4) having the above structure was measured while adjusting the temperature by using an outer temperature adjusting device (not shown). FIG. 7 is a graph showing the results of measurements of the V-T property (V-T curve) at a room temperature (25° C.), 45° C., and 55° C., respectively. Transmittance shown at the vertical axis of FIG. 7 was a value normalized based on reference transmittance that was transmittance at a time where the polarizers were provided in a parallel Nicols manner.

FIG. 8 is a graph showing temperature dependencies of voltage V20 at a time of 20% of reference transmittance, voltage V50 at a time of 50% of reference transmittance, and voltage V90 at a time of 90% of reference transmittance, respectively, each obtained from actual values of the V-T property.

As described above, $T_{ni}$ of the chiral-added liquid crystal material (4) is 61.6° C. and therefore the chiral-added liquid crystal material (4) exhibits a chiralnematic phase within a temperature range from 0° C. to 61.6° C. Further, as shown in FIG. 8, the display element (4) has a substantially constant driving voltage within a temperature range of approximately 30K ranging from a room temperature (25° C.) to 55° C. That is, the display element (4) has in essence a wider temperature range for driving than the electro-optical effect caused by the Kerr effect at an isotropic phase or a blue phase. Although detailed measurement was not performed at a temperature range lower than a room temperature (25° C.), little change in a driving voltage at 5° C. was seen by visual observation. For that reason, it is expected that the display element (4) can be driven within a wide temperature range of at least 50K or more.

Further, the V-T curve at 25° C. of FIG. 7 shows that the transmittance reaches its maximum value (upper limit value) approximately at 120V to 130V, and drops thereafter. This means that retardation (phase difference) of the liquid crystal cell reaches a half-wavelength condition (λ/2 condition). Transmittance (T) of the liquid crystal cell with a crossed Nicols configuration is represented by the following expression (2).

$$T=\sin^2(\pi\Delta n(E)\cdot d/\lambda) \qquad (2)$$

where $\Delta n(E)$ is effective refractive index anisotropy at a time when an electric field is applied, d is a thickness of the cell, and λ is an observed wavelength. When the transmittance has the maximum value, $\Delta n(E)\cdot d$ is just $\lambda/2$ and T=1. In actual values of the V-T curve shown in FIG. 7, the maximum value of the transmittance is a little lower than 1 because the expression (2) is based on an ideal premise that polarization degree of the polarizer is 100%.

Based on the results of measuring the V-T property, the display element 20 is arranged so that black gradation is displayed when no voltage is applied or when a low voltage that is not more than a threshold at which the V-T curve increases, and white gradation is displayed when a high voltage at which retardation is approximately λ/2 condition is applied. Consequently, by changing a voltage applied on the display element 20, it is possible to change luminance of gray scales from black gradation (maximum gradation used in display) to white gradation (minimum gradation used in display), thereby displaying all monochrome gradations.

(Result of Measurement of Response Speed)

Figure 9:
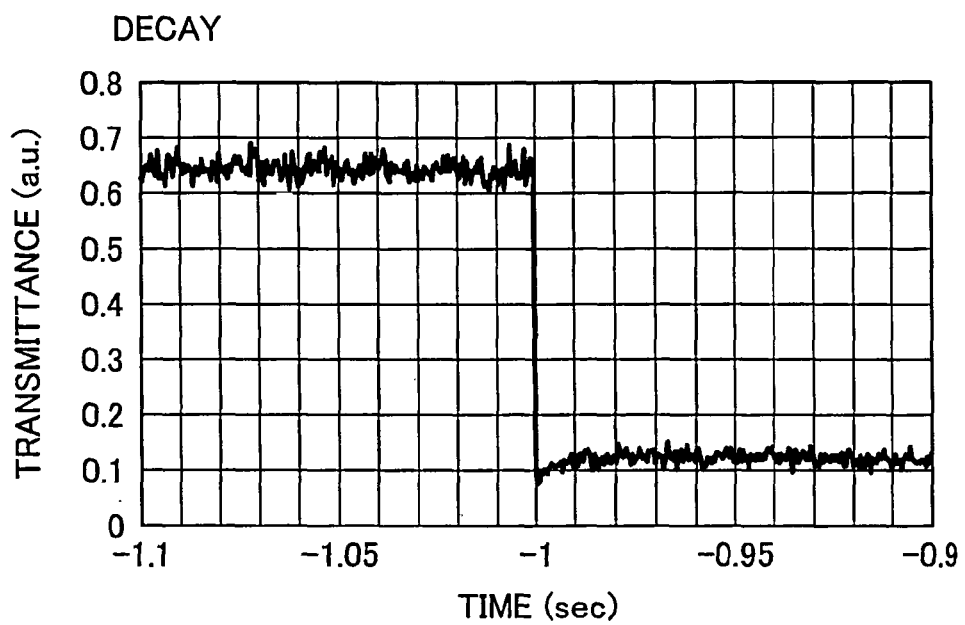
FIG. 9(a) is a graph illustrating a response speed of Decay in the display element of the embodiment.
FIG. 9(b) is a graph illustrating a response speed of Rise in the display element of the embodiment.
Figure 9:
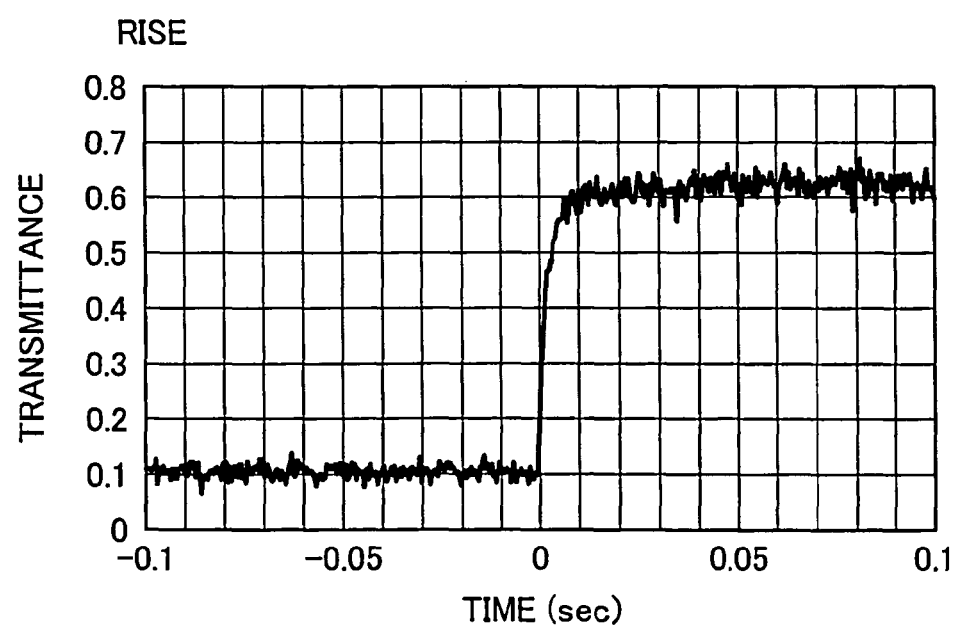

A response speed property of the display element 20 was measured. FIG. 9(a) shows the result of measuring response speed at a time when a voltage to be applied was switched from 100V to 0V in the display element 20 (Decay). FIG. 9(b) shows the result of measuring response speed at a time when a voltage to be applied was switched from 0V to 100V (Rise). The measurement temperature is a room temperature. Further, FIGS. 9(a) and 9(b) show the results of measuring response speed while continuously repeating a voltage applying step of applying 0V for 1 second and 100V for 4 seconds with a frequency being 1 kHz.

In the display element 20, the voltage 100V is a voltage approximately at V70, that is, a voltage at which transmittance reaches 70% of the reference transmittance.

As is evident from FIGS. 9(a) and 9(b), the display element 20 of the present embodiment has a very high-speed response speed. In particular, the response speed of Decay is 1 msec or less, which is a response property of μ second order. A response speed of Rise is a little slower than the response speed of Decay, and it takes approximately 10 msec before complete Rise (before the transmittance reaches a certain value). However, an initial process of Rise (a process in which liquid crystal molecules respond to an applied voltage and, a change in optical property appears for the first time) is not more than several m second, which is very fast.

The reason why the response of Decay is particularly fast is considered as follows: When a high voltage is applied, liquid crystal molecules are aligned in the liquid crystal cell in such a manner that the liquid crystal molecules are almost untwisted, that is, almost all liquid crystal molecules are provided singularly in an electric field direction (see FIG. 2(b)). At that time, when application of a voltage is stopped, a twist force of the chiral agent, that is, an elastic restitution force (a restituting force to a twisted state) caused by the chiral agent instantly affects the liquid crystal molecules so that the liquid crystal molecules are in an initial twisted alignment.

That is, the alignment at a time of applying an electric field shown in FIG. 2(b) is a state in which the liquid crystal molecules are compulsory untwisted by the effect of the electric field. This is a state having a very high elastic energy, which is similar to a state in which a bow is fully bent, or a state in which a rubber is fully extended. When application of the electric field is stopped (bending of the bow is stopped or extending the rubber is stopped), the liquid crystal molecules instantly restitute to the original state. It is easily understood that the speed of the restitution is very high.

In contrast, it is understood that the response speed of Rise is a little lower than the response speed of Decay because Rise requires a force derived from application of the electric field in order to untwist the fully twisted liquid crystal molecules at the initial state.

(Overdrive Driving)

Accordingly, in the initial state of Rise, a response speed was measured in a case of performing so-called overdrive driving in which a voltage higher than a voltage to be finally applied (target voltage) was applied. That is, a response speed was measured in a case of performing a driving method in which a voltage higher than a voltage to be finally applied was applied during a short period at the beginning of Rise.

Figure 17:
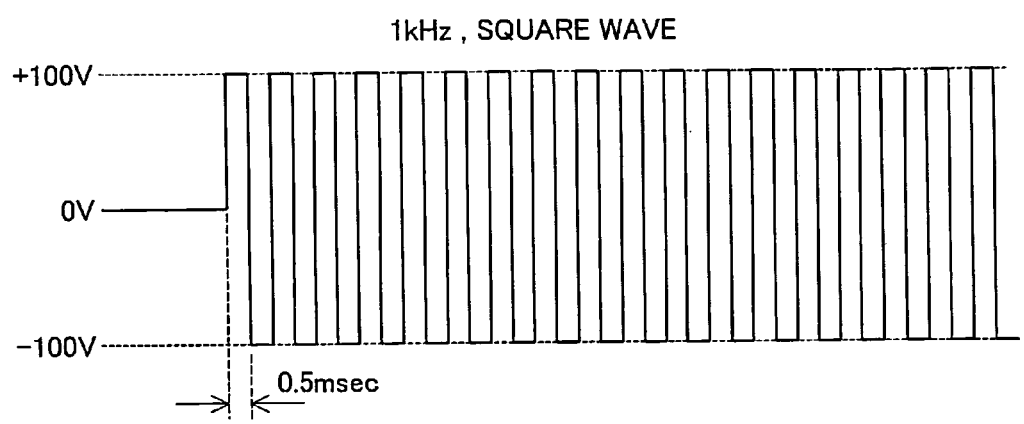
FIG. 17 is a waveform chart illustrating an example of a waveform of a voltage applied across electrodes of the display element of the embodiment in a case where the display element does not perform overdrive driving.
Figure 18:
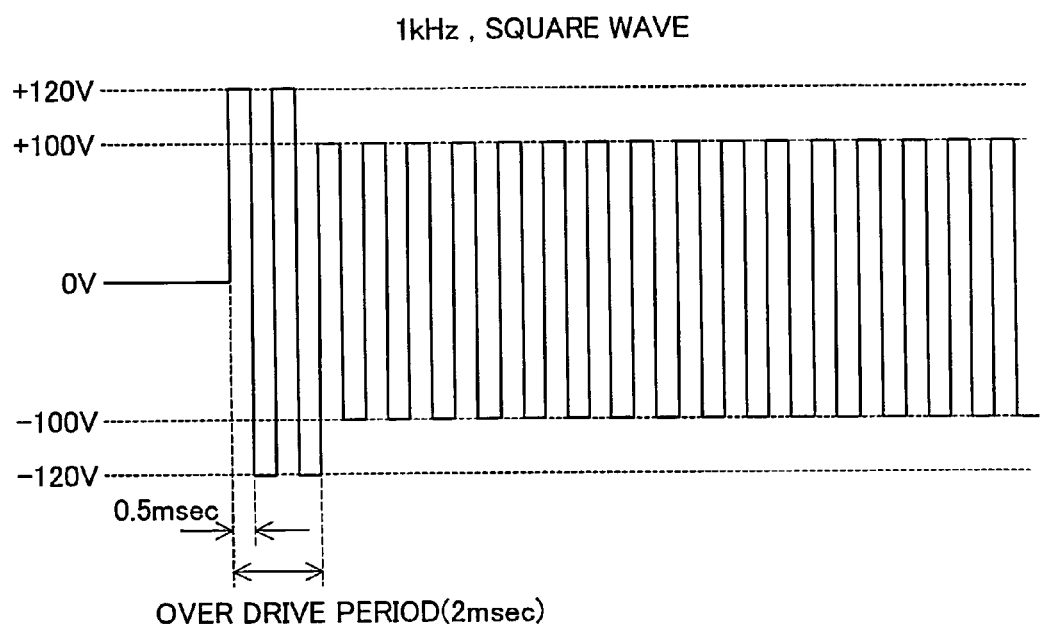
FIG. 18 is a waveform chart illustrating an example of a waveform of a voltage applied across electrodes of the display element of the embodiment in a case where the display element performs overdrive driving.

FIG. 17 is a waveform chart showing a waveform of a voltage to be applied across electrodes in a case where overdrive driving is not performed. FIG. 18 is a waveform chart showing a waveform of a voltage to be applied across electrodes in a case where overdrive driving is performed.

As shown in FIG. 17, in the case where overdrive driving is not performed, a voltage 100V to be finally applied is applied at the beginning of Rise. Here, the voltage to be applied across electrodes is a square wave whose frequency is 1 kHz and whose polarity inverts with respect to each 0.5 msec.

Further, as shown in FIG. 18, in the case where overdrive driving is performed, a voltage 120V (overshoot voltage) that is higher than a voltage 100V (target voltage) to be finally applied is applied across electrodes at 2 msec that is the beginning of Rise, and a voltage 100V is applied across the electrodes after 2 msec. In this case, too, the voltage to be applied across electrodes is a square wave whose frequency is 1 kHz and whose polarity inverts with respect to each 0.5 msec.

Figure 19:
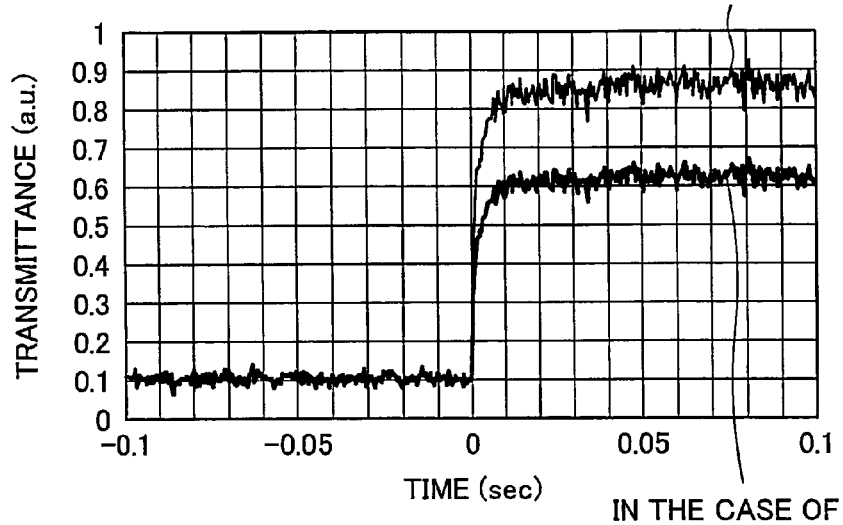
FIG. 19 is a graph illustrating a result of measurement of a response speed of the display element of the embodiment in a case of applying the voltage illustrated in FIG. 17.

FIG. 19 is a graph showing the results of measurements of response speeds in the case where overdrive driving is not performed. FIG. 19 shows a response speed in a case where a target voltage is 100V as shown in FIG. 17 and a response speed in a case where a target voltage is 120V. As shown in FIG. 19, both in the cases of the target voltage 120V and the target voltage 100V, it takes approximately 10 msec for liquid crystal molecules to have certain transmittance.

Figure 20:
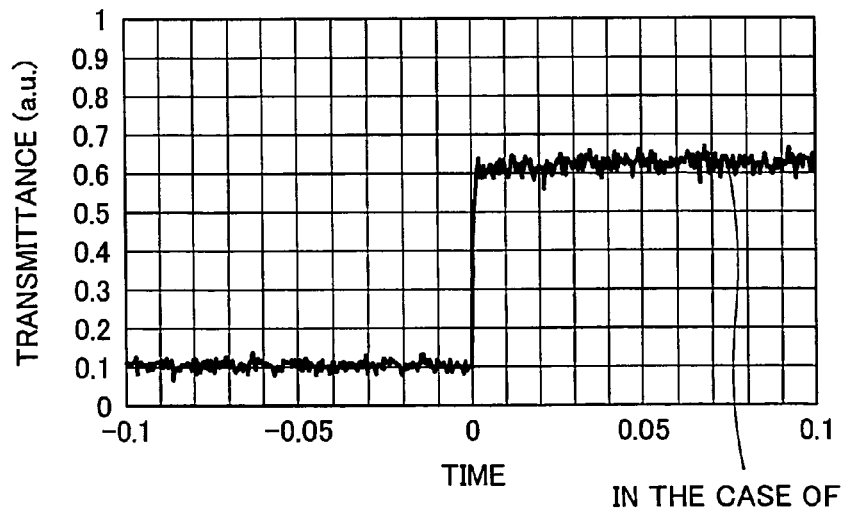
FIG. 20 is a graph illustrating a result of measurement of a response speed of the display element of the embodiment in a case of applying the voltage illustrated in FIG. 18.

On the other hand, FIG. 20 is a graph showing the result of measurement of a response speed in a case where overdrive driving is performed by applying an overshoot voltage as shown in FIG. 18. As shown in FIG. 20, application of the overshoot voltage (overdrive waveform) shown in FIG. 18 realizes certain transmittance in approximately 1 msec. That is, overdrive driving enables the response speed to be high, i.e. approximately 1 msec.

Conditions such as an overshoot voltage and a time for applying an overshoot voltage in the case of performing overdrive driving is not limited to the above example. The conditions may be set to the most suitable values in accordance with properties etc. of a display element and a driving circuit.

(Intermittent Driving)

A response speed was measured in a case where so-called intermittent driving was performed in order that transmittance of black gradation display was low even when a high voltage had been applied in a previous stage. That is, a response speed was measured in a case where a voltage applied across two electrodes was made off during a period after application of a previous target voltage and before application of a next target voltage.

Figure 21:
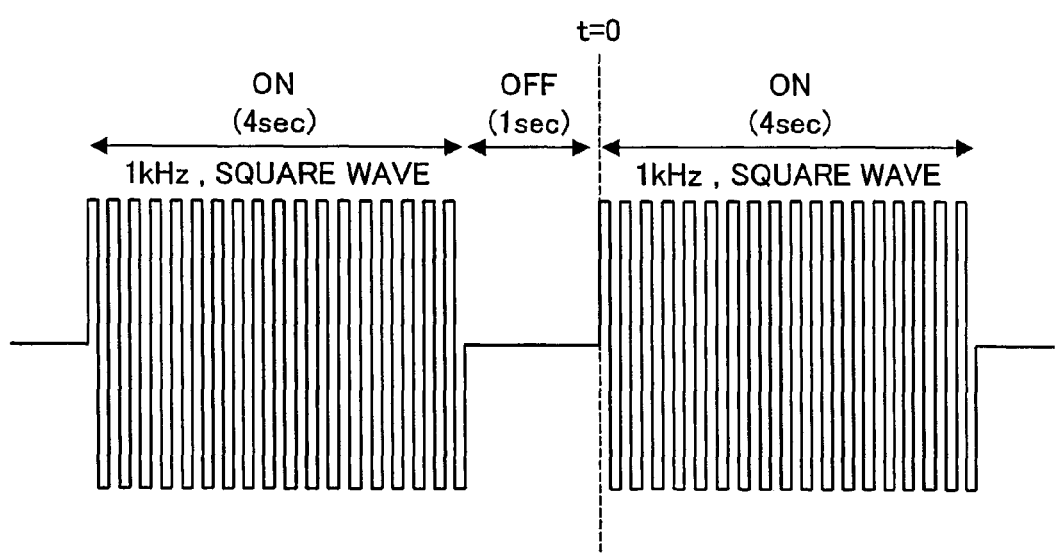
FIG. 21 is a waveform chart illustrating an example of a waveform of a voltage applied across electrodes of the display element of the embodiment in a case where intermittent driving is not performed.

FIG. 21 is a graph showing a waveform of an applied voltage in a case where the intermittent driving is not performed. In this case, a step was repeated in which a square wave whose frequency was 1 kHz and whose voltage was 100V was applied for 4 sec, then application of the voltage was stopped for 1 sec, and then the square wave whose frequency was 1 kHz and whose voltage was 100V was applied again for 4 sec.

Figure 22:
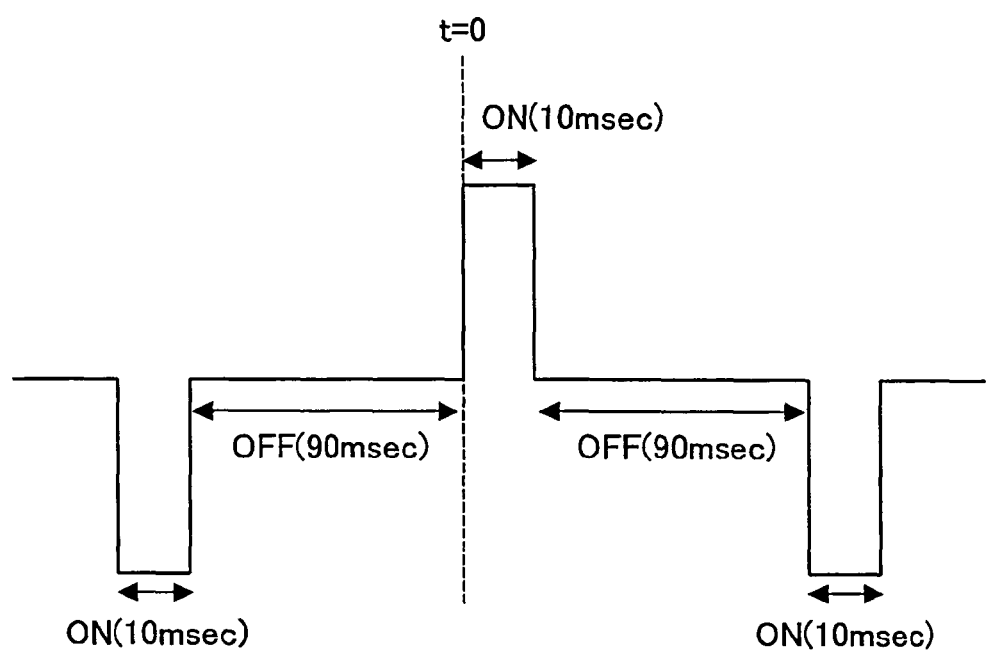
FIG. 22 is a waveform chart illustrating an example of a waveform of a voltage applied across electrodes of the display element of the embodiment in a case where intermittent driving is performed.

FIG. 22 is a graph showing a waveform of an applied voltage in a case of intermittent driving. As shown in FIG. 22, in the intermittent driving, a step was repeated in which a voltage of −100V was applied for 10 msec, then application of the voltage was stopped for 90 msec, then a voltage of 100V was applied for 10 msec, then application of the voltage was stopped for 90 msec, and then a voltage of −100V was applied for 10 msec.

Figure 23:
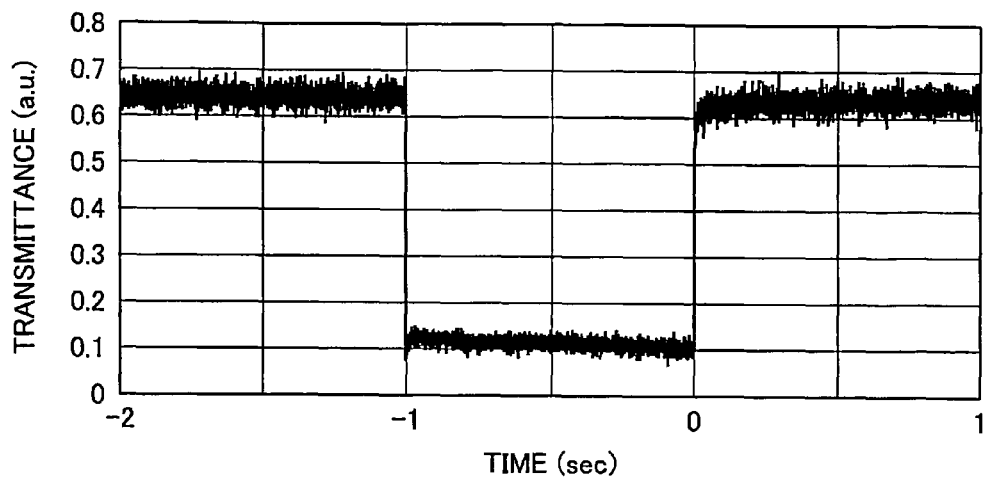
FIG. 23 is a graph illustrating a result of measurement of a response speed of the display element of the embodiment in a case of applying the voltage illustrated in FIG. 21.

FIG. 23 is a graph showing the result of measurement of response property in a case where the voltage shown in FIG. 21 was applied. As shown in FIG. 23, when a voltage of 100V was applied and then application of the voltage was stopped, transmittance did not go back to 0. Consequently, in this case, light leaked in displaying black gradation, which lowered contrasts.

Figure 24:
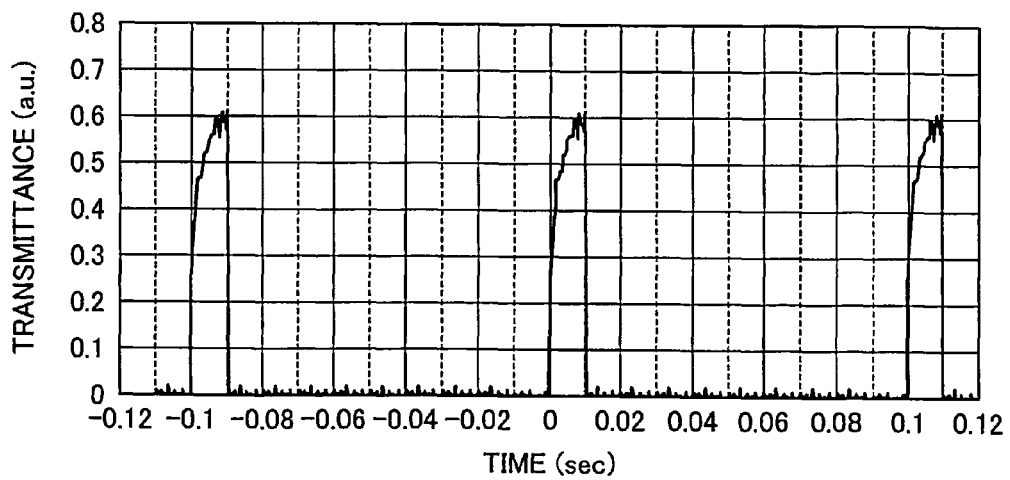
FIG. 24 is a graph illustrating a result of measurement of a response speed of the display element of the embodiment in a case of applying the voltage illustrated in FIG. 22.

FIG. 24 is a graph showing the result of measurement of response property in a case where the voltage shown in FIG. 22 was applied, i.e. in a case where intermittent driving was performed. FIG. 24 teaches that intermittent driving enables transmittance to promptly drop to approximately 0 in a case where a high voltage is applied and then application of the voltage is stopped. This enables light leakage to be reduced in displaying black gradation.

This is because a time for voltage-on (a time for applying a high voltage) is so short that application of the voltage is stopped before short pitch cholesteric alignment is broken.

The voltage waveform shown in FIG. 22 is an example of a voltage waveform in the intermittent driving. Conditions for intermittent driving are not limited to this example. The conditions may be set in accordance with properties etc. of a display element and a driving circuit.

However, continuous application of on-voltage breaks short pitch cholesteric alignment and as a result light leakage occurs in some areas. That is, in a driving method in which application of a voltage for previous gradation display is promptly followed by application of a voltage for next gradation display, application of the voltage for next gradation display starts before short pitch cholesteric alignment having been broken by the previous gradation display goes back to a former state. This causes light leakage. For that reason, it is preferable to perform intermittent driving in which a voltage-off period is provided after application of the voltage for previous gradation display and before application of the voltage for next gradation display. Further, it is preferable that a period for applying a voltage for gradation display is so short that short pitch cholesteric alignment is not broken.

As described above, the display element 20 of the present embodiment includes the cholesteric liquid crystal layer 3 made of a liquid crystal material that exhibits a cholesteric phase in which spontaneous twist pitch is less than a wavelength of visible light.

With the arrangement, the spontaneous twist pitch is less than a wavelength, and therefore the cholesteric liquid crystal layer 3 exhibits optical isotropy in a direction parallel to a plane of each substrate at a time of applying no electric field (or the degree of optical anisotropy exhibited by the cholesteric liquid crystal layer 3 is little). When an electric field is applied on the cholesteric liquid crystal layer 3, liquid crystal molecules are aligned in an electric field applying direction according to the strength of the electric field. That is, the liquid crystal molecules are aligned so that they are untwisted and are aligned in the electric field applying direction in response to application of an electric field. As a result, transmittance of the cholesteric liquid crystal layer 3 is changed in response to application of an electric field so as to perform display.

Further, facing planes of the substrates 1 and 2 are provided with the alignment films 8 and 9 for aligning liquid crystal molecules near interfaces of the substrates in specific directions, respectively (i.e. in aligning directions). Alignments of the alignment films 8 and 9 are performed independently of each other so as to exert aligning forces on liquid crystal molecules constituting the cholesteric liquid crystal layer 3, thereby aligning the liquid crystal molecules in directions parallel to planes of the substrates 1 and 2. The aligning directions may be any directions as long as they are parallel to planes of the substrates 1 and 2. The alignment films 8 and 9 may exert aligning forces on the liquid crystal molecules so that the liquid crystal molecules are aligned in different directions.

Consequently, the liquid crystal molecules near the interfaces of the substrates are aligned in aligning directions of the alignment films 8 and 9. As a result, the liquid crystal molecules of the cholesteric liquid crystal layer 3 exhibit a uniform helical alignment state (uniform twist alignment) at a time of applying no external field. Accordingly, helices do not point in a random direction and alignment defect does not occur between the helices. Therefore, by providing the alignment films 8 and 9, it is possible to prevent alignment defect between the helices and to more surely realize optical isotropy in a substrate-plane-parallel direction.

Further, the display element 20 includes the polarizers 6 and 7 that are provided so that absorption axis directions of the polarizers 6 and 7 cross the substrates 1 and 2, respectively, at a right angle. Consequently, at a time of applying no electric field, linearly polarized light that transmits one polarizer and is incident to the cholesteric liquid crystal layer 3 reaches the other polarizer without changing its polarization direction. Consequently, the linearly polarized light incident to the cholesteric liquid crystal layer 3 is completely absorbed by an absorption axis of the other polarizer and the light is not emitted to outside. Therefore, sufficient black gradation can be displayed at a time of applying no electric field.

Further, when an external field is applied on the cholesteric liquid crystal layer 3, the liquid crystal molecules are aligned in an electric field applying direction according to the strength of an electric field. That is, the liquid crystal molecules are aligned so that they are untwisted and are aligned in the electric field applying direction in response to application of an external field. Consequently, linearly polarized light that transmits one polarizer and is incident to the cholesteric liquid crystal layer 3 is affected by the liquid crystal molecules and changes its polarization state, and as a result has a component other than a component absorbed by an absorption axis of the other polarizer. As a result, the linearly polarized light transmits the other polarizer and is emitted. Further, transmittance at that time can be controlled in accordance with the strength of an electric field applied on the cholesteric liquid crystal layer 3. Therefore, in the display element 20, transmittance of the cholesteric liquid crystal layer 3 is changed by changing the strength of an electric field applied on the cholesteric liquid crystal layer 3, and thus luminance of gray scales is modulated from black gradation to white gradation, thereby displaying all monochrome gradations.

Further, in the display element 20, the substrate 1 is provided with the color filter 11. This allows color display (full color display). A method for realizing color display is not limited to this. Alternatively, instead of using the color filter layer, color display may be performed using a field sequential method that is so-called time sharing driving in which colors R, G, and B of a back light source are switched at high speed in one field to be in synchronization with switching of a liquid crystal cell.

In terms of high transmittance and display with high luminance, it is preferable that a voltage under a condition of $\lambda/2$ is applied to display white gradation. However, the present invention is not limited to this. That is, the present invention may be arranged so that the maximum value of a voltage to be applied is lowered to reduce a burden on a driver and a circuit, thereby reducing manufacture costs. Retardation (phase difference) at a time of displaying white gradation preferably ranges from $\lambda/4$ to $\lambda/2$, and more preferably ranges from $\lambda/8$ to $\lambda/2$.

Further, it is preferable that white gradation display is performed with a gradation range (approximately not less than 138 nm when converted into retardation value (phase difference value)) having the strength of transmitting light that is 50% or more with respect to reference strength of transmitting light, and black gradation display is performed with a gradation range (approximately not more than 81 nm when converted into retardation value (phase difference value)) having the strength of transmitting light that is 20% or less with respect to reference strength of transmitting light. At that time, contrast value (=transmittance at a time of displaying white gradation/transmittance at a time of displaying black gradation) is 2.5 or more, which is in a range at which human eyes can sense display. At that time, it is possible to realize brightness that is equal to or more than that of a liquid crystal display mode in practical use, such as VA mode, IPS mode, ECB mode, and OCB mode.

Further, it is more preferable that white gradation display is performed with a gradation range (approximately not less than 174 nm when converted into retardation value (phase difference value)) having the strength of transmitting light that is 70% or more with respect to reference strength of transmitting light, and black gradation display is performed with a gradation range (approximately not less than 56 nm) when converted into retardation value (phase difference value)) having the strength of transmitting light that is 10% or less with respect to reference strength of transmitting light. At that time, it is possible to realize brightness that is equal to or more than brightness of a TN mode that is most excellent in usage efficiency of light (that has most bright display) out of liquid crystal display modes in practical use.

In the display element 20, the alignment films 8 and 9 are made of polyimide that has been widely used for a conventional liquid crystal display element. However, the alignment films 8 and 9 are not limited to this. The alignment films 8 and 9 may be anything as long as they can align liquid crystal molecules in specific directions. For example, the alignment films 8 and 9 may be made by causing alignment films having optical functional groups (so-called optical alignment films) to be subjected to an aligning treatment in which polarized or non-polarized UV ray is irradiated.

In the display element 20, rubbing directions of the alignment films 8 and 9 are reverse-parallel to each other. However, the rubbing directions are not limited to this. Liquid crystal molecules near the substrates may be aligned in predetermined directions out of substrate-plane-parallel directions (any directions will do as long as they are substrate-plane-parallel directions).

In the display element 20, a direction of an electric field is parallel to the rubbing directions of the alignment films 8 and 9. However, the present invention is not limited to this. In consideration of usage efficiency of light, symmetry of a viewing angle etc., one angle out of 0 degree, 45 degrees, and 90 degrees is preferable to other angles. In a case where a direction of an electric field and rubbing directions of the alignment films 8 and 9 form an angle of 0 degree or 90 degrees, an angle formed by a direction of optical anisotropy generated in response to application of an electric field and absorption axis directions of the polarizers 6 and 7 is approximately 45 degrees. This realizes a display element having high transmittance and high usage efficiency of light. Further, in a case where a direction of an electric field and rubbing directions of the alignment films 8 and 9 form an angle of 45 degrees, an angle formed by directions in which liquid crystal molecules at interfaces of the substrates are aligned and the polarizers 6 and 7 is 0 degree or 90 degrees (orthogonal). Consequently, a phase difference due to liquid crystal molecules that touch the interfaces of the substrates (interfaces of alignment films) and a phase difference of the alignment films having been subjected to an aligning treatment cancel each other, which assures optical isotropy at a time of displaying black. Consequently, a contrast can be made higher.

Further, it is preferable that an angle formed by a direction of an electric field and an absorption axis direction is within a range of 45 degrees±10 degrees. This is because usage efficiency of light becomes the maximum when a direction of optical anisotropy generated in response to application of an electric field and absorption axis directions of polarizers provided in a crossed Nicols manner form an angle of 45 degrees. Further, when a direction of an electric field and the absorption axis directions of the polarizers form an angle of 35 degrees or 55 degrees, light transmittance is in theory lower than that at a time where the angle is 45 degrees. However, the degree of lowness is within an allowable range for visual observation. Therefore, an angle formed by the direction of the electric field and the absorption axis directions of the polarizers is preferably 45 degrees±10 degrees.

Further, the display device of the present embodiment may be a transmissive display element having a backlight for example, or may be a reflective display element in which light incident to one substrate is reflected by the other substrate and is emitted from the one substrate.

[Embodiment 2]

The following explains another embodiment. For convenience of explanation, members having the same functions as those explained in Embodiment 1 are given the same reference numerals and explanations thereof will be omitted here.

As shown in Table 1 in Embodiment 1, a liquid crystal cell to which liquid crystals have been poured and which has been subjected to a re-aligning treatment exhibits complete optical isotropy (transparent state) in a direction perpendicular to a plane of a substrate. On the other hand, the V-T property of FIG. 7 and the response property of FIG. 9(a) show that the complete optical isotropy (transparent state) equal to an original alignment state is not realized after application of a voltage is stopped, and some amount of light leaks. That is, in measuring electro-optical property, liquid crystals do not instantly go back to its initial optical isotropy state after application of a voltage is stopped.

This is because, as described above, in measuring the V-T property shown in FIG. 7, the voltage-transmittance property was measured by repeatedly performing the electric field applying step in which the voltage applied across the two electrodes gradually changed from 0V to approximately 160V. That is, at the time of an applied voltage being 0V as shown in FIG. 7, an applied voltage was 160V in one-previous step and then the applied voltage restarts from 0V. Consequently, at the time of 0V in FIG. 7, liquid crystals have not yet completely gone back to the original optical isotropy state after a voltage of 160V was applied and then application of the voltage was stopped in one-previous step. As a result, a voltage is applied again in a state where light leakage occurs.

In the results of measurements of the response property shown in FIGS. 9(a) and 9(b), even though no voltage is applied, light leakage of approximately 0.1 occurs in a graduation of a longitudinal axis (10% of transmittance with respect to the reference intensity of transmitting light) after application of 100V was stopped and a voltage becomes 0V (Decay) or before application of 100V restarts (Rise). This light leakage is caused for the same reason.

Further observation of such light leakage showed that light leakage disappears after enough time has passed after stopping application of a voltage (several minutes to several dozen minutes has passed). That is, the observation showed that the cholesteric liquid crystal layer 3 goes back to the original isotropy state (transparent state) after enough time has passed after stopping application of the voltage.

This is because aligning force caused by an aligning treatment of an interface of an alignment layer and twisting force of a chiral agent in a liquid crystal layer come to fully affect (are fully transmitted to) the liquid crystal layer in bulk after enough time has passed, which places the liquid crystal layer in an original energy equilibrium state. That is, it is inferred that liquid crystal molecules of the bulk are in a homogeneous and uniaxial alignment state in which the liquid crystal molecules mostly point in an electric field direction at a time of applying a high voltage, and the twisting force of the chiral agent is completely disconnected between molecules. Therefore, it is inferred that when application of the voltage is stopped in this state, elastic restituting force caused by twist force of the chiral agent does not affect all molecules, and as a result the bulk includes a domain where the uniaxial alignment state partially occurs. Such domain remains the same until the twist force is transmitted to the domain from surrounding areas affected by the twist force, and as a result it takes some time for the liquid crystal layer in the bulk to entirely go back to the initial optical isotropy state.

Such light leakage is not preferable because it causes problems such as sticking of display, lowering of contrasts, and unevenness in display. For that reason, the inventors of the present invention diligently studied a method for preventing light leakage after application of an electric field is stopped, and found a method for fixing and stabilizing, by use of a polymer network (alignment assisting member), an alignment state where a chiral pitch is so short that visible light is not affected by the chiral pitch (the state is hereinafter referred to as "short pitch cholesteric alignment state"), which is an initial optical isotropy state (transparent state). That is, the inventors found a method for fixing this alignment state (short pitch cholesteric alignment) beforehand by use of a polymer network, in order to prevent application of a high electric field from breaking the short pitch cholesteric alignment state. This method allows making use of electro-optical property while maintaining short pitch cholesteric alignment when a high electric field is applied, and this method allows all the liquid crystal molecules in the bulk to be affected by twist force of the chiral agent and to go back to the initial optical isotropy state (transparent state) when application of the electric field is stopped.

The following explains a display element of the present embodiment. The display element of the present embodiment has the same structure as the display element 20 of Embodiment 1 except that a polymer network is formed in the cholesteric liquid crystal layer 3 so as to fix a short pitch cholesteric alignment.

Here, an explanation is made as to a method for producing the display element of the present embodiment. In the display element, liquid crystal monomer "UCL001" (product name; manufactured by DIC (DAINIPPON INK AND CHEMICALS, INCORPORATED)

[Chemical Formula 7]

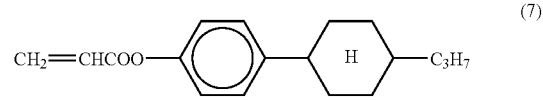

(7)

[Chemical Formula 8]

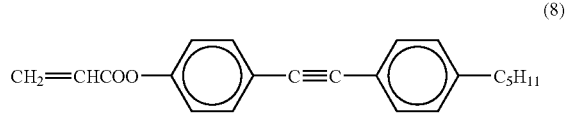

(8)

("UCL001" is an equivalent mixture of (7) and (8)), diacrylate monomer "RM257" (product name; manufactured by Merck Ltd.) serving as a cross-linker

[Chemical Formula 9]

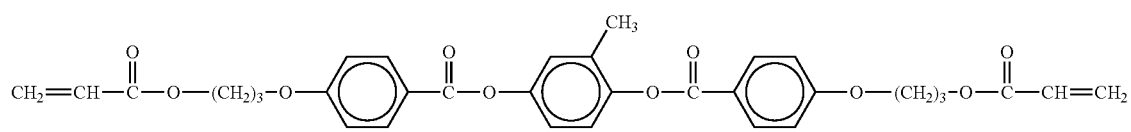

(9)

and "DMPAP" (2,2-dimethoxy-2-phenylacetophenone, manufactured by Aldrich) serving as a polymerization initiator (photo initiator)

[Chemical Formula 10]

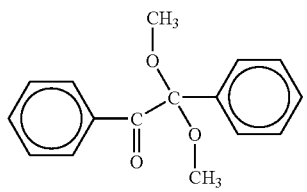

(10)

were added to and mixed with the chiral-added liquid crystal material (4) obtained by adding the chiral agent "S1011" to the liquid crystal material "E8" so that density of the chiral agent "S1011" is 15 weight %. The mixture ratio is as follows.

The chiral-added liquid crystal material (4) (obtained by adding the chiral agent "S1011" to the liquid crystal material "E8" so that density of the chiral agent "S1011" is 15 weight %): 95.8 wt %
UCL001: 3.0 wt %
RM257: 1.0 wt %
DMPAP: 0.2 wt %

This mixture ratio is one example, and the mixture ratio is not limited to this example. Optimal mixture ratio varies according to the kind of a liquid crystal material used as a host and the kind of a monomer to be added, etc. Further, it is preferable to set the mixture ratio (alternatively, the amount of added monomer) so that each material does not affect visible light at a time of displaying black gradation (at a time of applying no voltage, or at a time of applying a low voltage that is a threshold voltage or less).

Addition of the monomer and the polymerization initiator to the chiral-added liquid crystal material (4) hardly changed $T_{ni}$ (nematic-isotropic phase change temperature) of the mixture, and $T_{ni}$ remained to be 61.6° C. Further, it was confirmed that at a temperature lower than 61.6° C., the cholesteric liquid crystal layer 3 exhibits the chiralnematic phase (cholesteric phase) having a twist in a single direction due to spontaneous twist force of the chiral agent "S1011".

Then, the mixture was poured into a cell, and UV ray was irradiated to the cell while keeping the cholesteric liquid crystal layer 3 at a room temperature (25° C.) (i.e. while keeping short pitch cholesteric alignment). Illumination intensity of the UV ray was 11.0 mW/cm² with respect to 365 nm wavelength, and a time for irradiation was 20 minutes. Thus, the monomer was polymerized and a polymer network was formed in the cholesteric liquid crystal layer 3.

The following explains the result of confirming an alignment state by applying an electric field on the display element of the present embodiment having the above structure. FIG. 10(a) is an explanatory drawing showing a display state (alignment state) at a time of applying a 150V voltage across two electrodes. FIG. 10(b) is an explanatory drawing showing a display state (alignment state) of a display element having not been subjected to UV irradiation, at a time right after voltage-off after application of 150V voltage across two electrodes. Further, FIG. 10(c) is an explanatory drawing showing a display state (alignment state) of a display element having been subjected to UV irradiation to form a polymer network, at a time right after voltage-off after application of 150V voltage across two electrodes. As shown in right sides of FIGS. 10(a) to 10(c), a horizontal direction of the paper is a rubbing direction and an electric field direction, and absorption axis directions of the polarizers 6 and 7 cross each other at a right angle and the absorption axis directions cross the rubbing direction and the electric field direction at an angle of 45 degrees.

The light-shielding areas (black portions) in FIG. 10(a) are areas that overlap the pectinate electrodes 4 and 5. When 150V electric field is applied across the pectinate electrodes 4 and 5, liquid crystal molecules are aligned in an electric field direction in an area between two substrates. As a result, light is transmitted as shown in FIG. 10(a).

As shown in FIG. 10(b), in a case where a polymer network is not formed, areas where light leaks exist between the pectinate electrodes 4 and 5. Consequently, it takes some time for the liquid crystal molecules to entirely go back to the initial optical isotropic state.

In contrast, as shown in FIG. 10(c), in the liquid crystal cell having been subjected to UV irradiation (having formed a polymer network therein), the liquid crystal molecules instantly go back to the initial optical isotropy state right after application of a high voltage (150V) is stopped after application of the voltage, and as a result light leaks little. This means that the initial short pitch cholesteric alignment state is fixed and stabilized by the polymer network.

FIGS. 11(a) and 11(b) are graphs showing the results of measurements of response property of the display element before formation of the polymer network (before UV irradiation). FIGS. 11(c) and 11(d) are graphs showing the results of measurements of response property of the display element after formation of the polymer network (after UV irradiation). Measurement temperature was a room temperature. Frequency was 1 kHz. Measurement was performed while repeatedly continuing a voltage applying step of applying 0V for 1 sec and applying 150V for 4 sec.

It was confirmed from the results of the measurements that stabilization of polymers greatly reduce light leakage after voltage-off, not to say that the light leakage is completely zero. Optimization of a monomer etc. to be used, optimization of a UV ray irradiation process, and improvement of a driving method (such as adoption of an impulse drive) allows light leakage to be further reduced.

As described above, the display element of the present embodiment includes the cholesteric liquid crystal layer 3 made of a liquid crystal material that exhibits a cholesteric phase in which spontaneous twist pitch is less than a wavelength of visible light. The display element changes transmittance by applying an electric field on the cholesteric liquid crystal layer 3 so that the cholesteric liquid crystal layer 3 exhibits optical anisotropy in a direction parallel to a plane of each substrate. The display element includes the alignment assisting material for fixing or stabilizing the cholesteric liquid crystal layer 3 so that the cholesteric liquid crystal layer 3 maintains short pitch cholesteric alignment (alignment in which chiral pitch is so short that visible light is not affected by the chiral pitch).

This allows making use of electro-optical property while maintaining short pitch cholesteric alignment at a time of applying a high electric field, and as a result all the liquid crystal molecules in the bulk are allowed to be affected by twist force of the chiral agent and to promptly go back to the initial optical isotropy state (transparent state) and domains where light leaks do not appear when application of the electric field is stopped. Accordingly, it is possible to perform satisfactory black display right after application of a high voltage is stopped after application of the voltage. Therefore, it is possible to increase contrast.

The present embodiment uses a polymer network obtained by adding, to the cholesteric liquid crystal layer 3, the mixture of liquid crystal monomer "UCL001" serving as an alignment assisting material, diacrylate monomer "RM257" serving as a cross-linker, and "DMPAP" serving as a polymerization initiator, and irradiating UV ray (light) to it. However, the polymer network is not limited to this.

The polymer network may be anything as long as the polymer network fixes or stabilizes an alignment state so that the cholesteric liquid crystal layer 3 maintains short pitch cholesteric alignment when an electric field is applied: For example, a polymer network obtained by polymerizing a photo-polymerizable monomer (photoreactive monomer) other than the aforementioned monomer may be used. Further, the polymer network is not limited to a photo-polymerizable monomer, and may be a polymerizable monomer that is polymerized by a method other than light irradiation. For example, a thermal-polymerizable monomer that is polymerized by heating may be used. Alternatively, a polymer network including a functional group polymerized by light irradiation and a functional group polymerized by heating may be used. In that case, polymerization both by light irradiation and heating increases the possibility of polymerization (curing) because at least one of the functional group reacts. This further reduces unreactive portions. Consequently, satisfactory polymerization can be performed.

In the present embodiment, the polymerization initiator is "DMPAP". However, the polymerization initiator is not limited to this and may be anything as long as it accelerates polymerization of a polymerizable compound. Although a polymerization initiator is added in the present embodiment, it is not necessarily required to add the polymerization initiator. However, in a case where a polymerizable compound is polymerized by light or heat to be polymers, it is preferable to add the polymerization initiator because the polymerization initiator accelerates polymerization. It is preferable that the amount of the polymerization initiator to be added is not more than 10 wt %, that is, not less than 0 wt % and not more than 10 wt % with respect to a polymerizable compound. When the polymerization initiator is used, it is preferable that the amount of the polymerization initiator is in a range of more than 0 wt % and not more than 10 wt %. This is because: when more than 10 wt % of the polymerization initiator is added, the polymerization initiator serves as impurity, and as a result specific resistance of a display element drops.

Further, the alignment assisting material is not limited to a polymer network. For example, the alignment assisting material may be a porous structure such as a porous inorganic material. Further, the alignment assisting material may be a hydrogen-bonded network (hydrogen-bonded complex). The hydrogen-bonded network means a combination that is formed not by chemical combination but by hydrogen combination.

The hydrogen-bonded network can be obtained by, for example, mixing a gelatinizer (hydrogen-bonding material) with a medium to be added to the cholesteric liquid crystal layer 3. Preferable example of the gelatinizer is a gelatinizer including an amide group. Among them, further preferable examples include: a gelatinizer including at least two amide groups in one molecule; a gelatinizer of the urea family; and a gelatinizer of the lysine family.

Examples of the gelatinizer including at least two amide groups in one molecule include a gelatinizer (gelatinizer A) represented by the following structural formula (11)

[Chemical Formula 11]

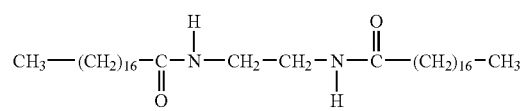

(11)

and a gelatinizer (gelatinizer B) represented by the following structural formula (12).

[Chemical Formula 12]

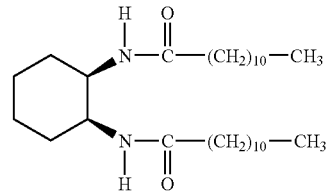

(12)

Further, the hydrogen-bonded network can be obtained by mixing a gelatinizer (hydrogen-bonded material) described in Non-patent Document 3 (p. 314, FIG. 2) with a medium to be included in the cholesteric liquid crystal layer 3 so that the ratio of the gelatinizer is 0.15 mol % with respect to the medium. An example of the gelatinizer is a gelatinizer ("Lys18") having a structure represented by the following structural formula (13).

[Chemical Formula 13]

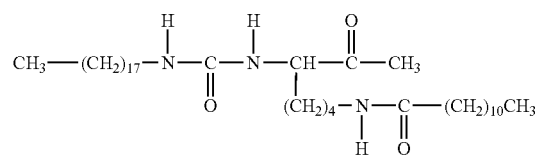

(13)

That is, with the present embodiment, a hydrogen-bonded network that is obtained by mixing "Lys18" for example with the medium so that the ratio of "Lys18" is 0.15 mol % with respect to the medium and that exhibits a gel state described in Non-patent Document 3 (p. 314, FIG. 1) can be used for stabilizing the alignment state (stabilizing the alignment order) of molecules of the medium.

As described above, with the present embodiment, by mixing a little amount of the gelatinizer with the medium to be included in the cholesteric liquid crystal layer 3, e.g. a dielectric material such as a liquid crystal material, it is possible to gelatinize the medium and obtain the hydrogen-bonded network.

As described above, in the case of using the hydrogen-bonded network as the alignment assisting material, it is possible to obtain the same effect as the case of fixing or stabilizing the alignment state obtained by polymerization of a polymerizable compound. Further, the case of using the hydrogen-bonded network as the alignment assisting material is advantageous in that the case does not require an additional process for irradiation of UV ray and the case does not suffer from deterioration of a material due to irradiation of UV ray or from decrease in reliability due to unreactive groups.

Further, the present invention may be arranged so that fine particles serving as alignment assisting materials are dispersed in the cholesteric liquid crystal layer 3. In a system where fine particles are dispersed in the liquid crystal layer, dielectric materials such as liquid crystal molecules are aligned in accordance with the interface of the fine particles. Accordingly, in the system where the fine particles are dispersed, the alignment state of the dielectric materials are stabilized according to how the fine particles are dispersed.

Further, a fine pore film such as a membrane filter may be used as the alignment assisting material. It is preferable that the material of the fine pore film is a material that does not react with a dielectric material, i.e., a liquid crystal material to be included in the fine pore film. Examples of the material of the fine pore film include polycarbonate, polyolefin, cellulose mixed ester, cellulose acetate, polyvinylidene fluoride, acetylcellulose, and a mixture of cellulose acetate and cellulose nitrate. The size (diameter) of the fine pore is preferably ¼ of a wavelength of visible light, and further preferably 50 nm or less, in order that the dielectric material is seen as being optically isotropic and that a system for stabilizing the dielectric material is realized. This enables the dielectric material layer to have sufficient transparency with respect to visible light. Further, the thickness of the fine pore film is preferably 50 μm or less, and more preferably 10 μm or less.

Further, in the case of using the fine pore film as the alignment assisting material, a fine pore film having a twist structure such as a helical crystal may be used. Examples of the fine pore film include film of the polyolefin family and film of the polypeptide family. A preferable example of the film of the polypeptide family having a twist structure is synthesized polypeptide having a helical structure, i.e. an ability to form α-helix. In a case where the film having a twist structure is used, when the dielectric medium exhibits chirality and when a twist structure of the dielectric medium is similar to the twist structure of the film, a great distortion is not generated, which increases stability of the dielectric medium. Further, even when the dielectric medium does not exhibit chirality, the dielectric medium is aligned according to the twist structure of the film, and as a result the dielectric medium exhibits a property similar to that of the medium that exhibits chirality.

[Embodiment 3]

The following explains further another embodiment of the present invention. For convenience of explanation, members having the same functions as those explained in Embodiment 1 or 2 are given the same reference numerals and explanations thereof will be omitted here.

Figure 12:
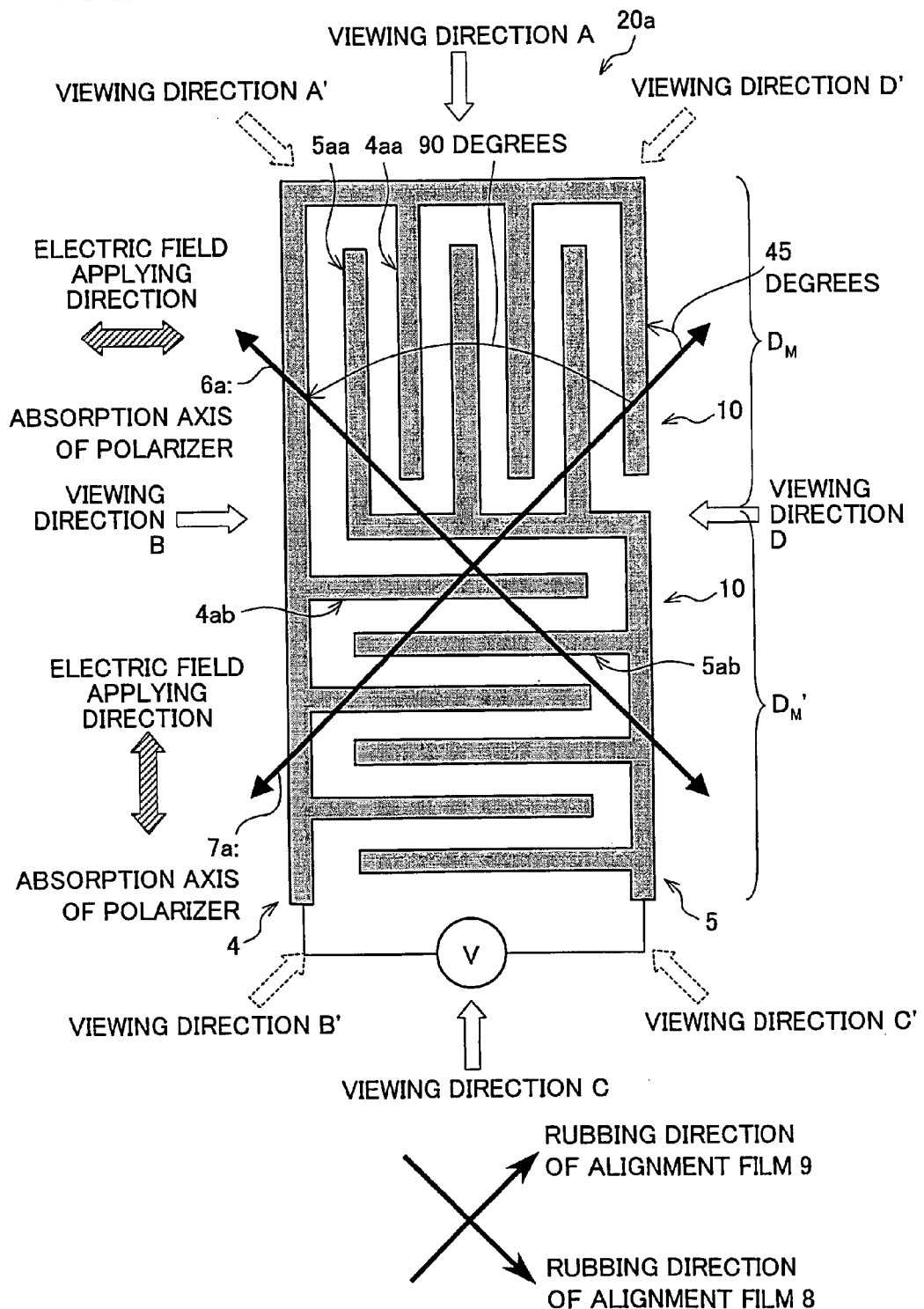
FIG. 12 is a plan schematic illustrating a shape of a pectinate electrode, an electric field applying direction, an aligning direction, and absorption axis direction of the display element of the embodiment.

FIG. 12 is a plan drawing showing pectinate electrodes 4a and 5a included in a display element 20a of the present embodiment, the pectinate electrodes 4a and 5a being seen from a direction normal to a plane of a substrate. As shown in FIG. 12, each pixel of the display element 20a is provided with an electrode couple 10 including the pectinate electrodes 4a and 5a. The electrode couple 10 includes at least two domains having different directions in which electric fields are applied. That is, as shown in FIG. 12, the electrode couple 10 includes a domain where pectinate parts 4aa and 5aa are provided and a domain where pectinate parts 4ab and 5ab are provided. A direction in which the pectinate parts 4aa and 5aa are extended and a direction in which the pectinate parts 4ab and 5ab are extended cross each other at an angle of 90 degrees. Consequently, electric fields in orthogonal directions are applied on the domains, respectively.

Therefore, the display element 20a includes at least two domains $D_M$ and $D_M'$ (fine areas) having orthogonal directions of optical anisotropy generated by application of electric fields.

Further, as shown in FIG. 12, polarizers 6 and 7 are provided on substrates 1 and 2, respectively, so that absorption axis directions 6a and 7a of the polarizers 6 and 7, respectively, cross each other at a right angle. Further, the absorption axis directions 6a and 7a of the polarizers 6 and 7, respectively, and directions in which the pectinate parts 4aa and 5aa and the pectinate parts 4ab and 5ab of the pectinate electrodes 4a and 5a are extended cross each other at an angle of 45 degrees. Therefore, as shown by the absorption axis directions 6a and 7a in FIG. 12, absorption axes of the polarizers 6 and 7 are provided so as to cross electric field applying directions of domains of the pectinate electrodes 4a and 5a at an angle of 45 degrees.

Further, as shown in FIG. 12, alignment films 8 and 9 are provided on facing surfaces of the substrates 1 and 2, respectively. The alignment films 8 and 9 were subjected to a rubbing treatment so that an alignment direction of the alignment film 8 is parallel to the absorption axis direction 6a of the polarizer 6 and an alignment direction of the alignment film 9 is parallel to the absorption axis direction 7a of the polarizer 7.

In the display element 20a, when an electric field is applied on a cholesteric liquid crystal layer 3, liquid crystal molecules are untwisted and aligned in a direction in which the electric field is applied, thereby exhibiting optical anisotropy. As described above, the absorption axis directions 6a and 7a of the polarizers 6 and 7 are orthogonal, and directions in which the electric field is applied cross the absorption axis directions 6a and 7a at an angle of 45 degrees. Accordingly, directions of optical anisotropy cross the absorption axis directions 6a and 7a at an angle of 45 degrees, resulting in the maximum transmittance.

It is assumed that in the two domains $D_M$ and $D_M'$, a direction in which optical anisotropy is exhibited crosses the absorption axis direction 6a of the polarizer 6 at an angle of θ (degree). FIG. 13 is a graph showing a relation between the angle θ and transmittance.

In this case, transmittance (P) is represented by $P(\%)=\sin^2(2\theta)$. As shown in FIG. 13, the transmittance (P) becomes the maximum transmittance (maximum luminance) when the angle θ is 45 degrees. Note that, as long as the transmittance is 90% or more with respect to the transmittance at the time where θ is 45 degrees, human eyes sense that the transmittance has the maximum luminance. That is, when the transmittance is 90% or more with respect to the maximum transmittance, human eyes sense that luminance is similar to the luminance at the maximum transmittance (maximum luminance). Further, as shown in FIG. 13, when the angle θ satisfies 35 degrees<θ<55 degrees, it is possible to obtain transmittance that is 90% or more with respect to the maximum transmittance. Therefore, it is preferable that the angle θ satisfies 35 degrees<θ<55 degrees.

Further, in the display element 20a, directions of optical anisotropy in the domains $D_M$ and $D_M'$ cross the absorption axis directions 6a and 7a at an angle of 45 degrees (+45 degrees or −45 degrees), and directions of optical anisotropy in the domains cross each other at a right angle. Consequently, each of the two domains $D_M$ and $D_M'$ can compensate coloring of the other of the two domains $D_M$ and $D_M'$ that is caused when the display element 20a is seen from a skew direction.

However, as described above, in the case where the angle θ formed by a direction of optical anisotropy and the absorption axis direction 6a satisfies 35 degrees<θ<55 degrees, a large difference in luminance cannot be seen by human eyes. Therefore, in the case of compensation of coloring, when a difference in luminance between domains is approximately 10% with respect to maximum luminance, a difference in color can be hardly seen by human eyes. Accordingly, when the difference in luminance between the domains is 10% or less, coloring is compensated practically sufficiently. Accordingly, the angle formed by two directions of optical anisotropy in respective domains is preferably within the range of 90 degrees±20 degrees, i.e. more than 70 degrees and less than 110 degrees. The angle is more preferably within 90 degrees±10 degrees, i.e. more than 80 degrees and less than 100 degrees. The angle is most preferably 90 degrees.

As described above, in consideration of a range of error that can be sensed by human eyes, it is preferable that the angles formed by directions of optical anisotropy caused by application of electric fields in the domains $D_M$ and $D_M'$ and the absorption axis directions 6a and 7a of the polarizers 6 and 7, respectively, are approximately 45 degrees (preferably within a range of 45 degrees±10 degrees, more preferably within a range of 45 degrees±5 degrees, and most preferably 45 degrees), and it is preferable that the angle formed by directions of optical anisotropy caused by application of electric fields in the domains $D_M$ and $D_M'$ is approximately 90 degrees (preferably within a range of 90 degrees±20 degrees, more preferably within a range of 90 degrees±10 degrees, and most preferably 90 degrees).

For that reason, in the display element 20a, the absorption axis directions 6a and 7a of the polarizers 6 and 7 and electric field applying directions of the pectinate electrodes 4a and 5a form an angle of 45 degrees, and directions in which the pectinate parts 4aa and 5aa provided in partial areas of the pectinate electrodes 4a and 5a are extended and directions in which the pectinate parts 4ab and 5ab provided in adjacent areas in each pixel are extended form an angle of 90 degrees.

In the display element 20a thus formed, a color seen from a direction at a polar angle of 60 degrees was observed. As a result of the observation, coloring was not seen from all viewing directions (viewing directions A', B', C', D', A, B, C, and D) as shown in FIG. 12). Here, viewing directions A' and C' are parallel to the absorption axis direction 6a, viewing directions B' and D' are parallel to the absorption axis direction 7a, viewing directions A and C are parallel to directions in which the pectinate parts 4ab and 5ab apply electric fields, and viewing directions B and D are parallel to directions in which the pectinate parts 4aa and 5aa apply electric fields. Accordingly, in terms of symmetry, the viewing directions A', B', C', and D' have the same viewing angle properties and the viewing directions A, B, C, and D have the same viewing angle properties.

Comparative Example 1

Figure 14:
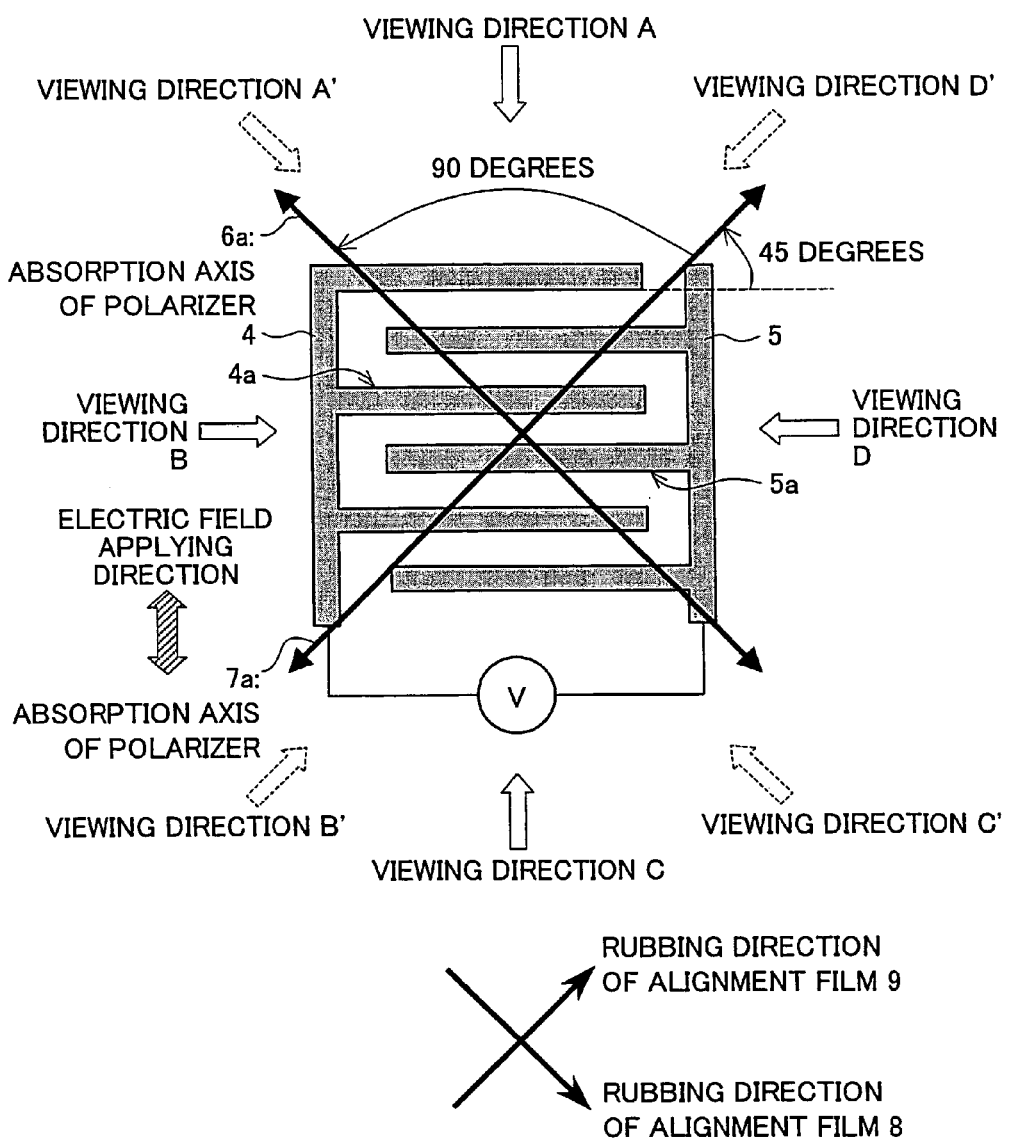
FIG. 14 is a plan schematic illustrating the display element of the embodiment that is seen from a direction normal to a plane of a substrate, each pixel of the display element having an electric field applying direction that is uniform.

In order to verify the effect of providing in each pixel of the display element 20a plural domains that have different directions in which electric fields are applied, a display element in which an electric field applying direction points in a single direction in each pixel was formed as shown in FIG. 14. That is, as shown in FIG. 14, in the display element, directions in which the pectinate, parts 4c and 5c of the pectinate electrodes 4 and 5 are extended point in a certain (parallel) direction in each pixel. Note that, although the display element in FIG. 14 is also included in the present embodiment, the display element in FIG. 14 is used for comparison with the display element 20a of the present embodiment.

In the display element for comparison that was formed as described above, i.e. a display element in which each pixel includes only one domain, a color seen from a direction at a polar angle of 60 degrees was observed at a time of applying an electric field, as with the case of the display element 20a. As a result, coloring was hardly observed from viewing directions A', B', C', and D'. However, blue coloring was seen from viewing directions A and C, and yellow coloring was seen from viewing directions B and D. Such colorings are deterioration in display quality.

Here, the viewing directions A' and C' are parallel to the absorption axis direction 6a, the viewing directions B' and D' are parallel to the absorption axis direction 7a, the viewing directions A and C are parallel to directions in which the pectinate parts 4c and 5c apply electric fields, and the viewing directions B and D are perpendicular to directions in which the pectinate part 4c and 5c apply electric fields.

Although the reason why such coloring was observed is unknown, it is inferred that such coloring is derived from the followings: (i) viewing directions A and C and viewing directions B and D are not the same in terms of symmetry, and (ii) optical anisotropy caused by application of an electric field has wavelength dispersibility (has different retardation values according to wavelengths) which is not compensated in the display element for comparison.

Comparative Example 2

Figure 2:
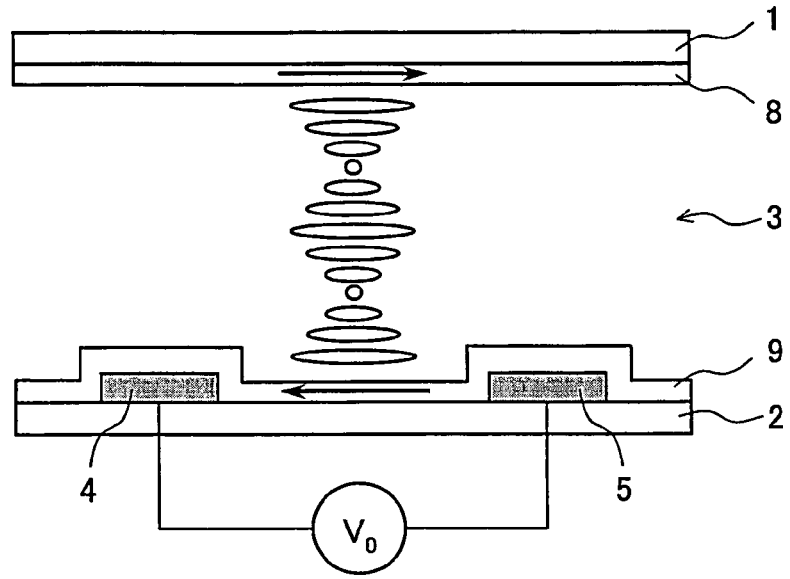
FIG. 2(a) is a cross sectional drawing schematically illustrating an outline structure of the display element of the embodiment at a time of displaying a black gradation.
FIG. 2(b) is a cross sectional drawing schematically illustrating an outline structure of the display element of the embodiment at a time of displaying a white gradation.
Figure 2:
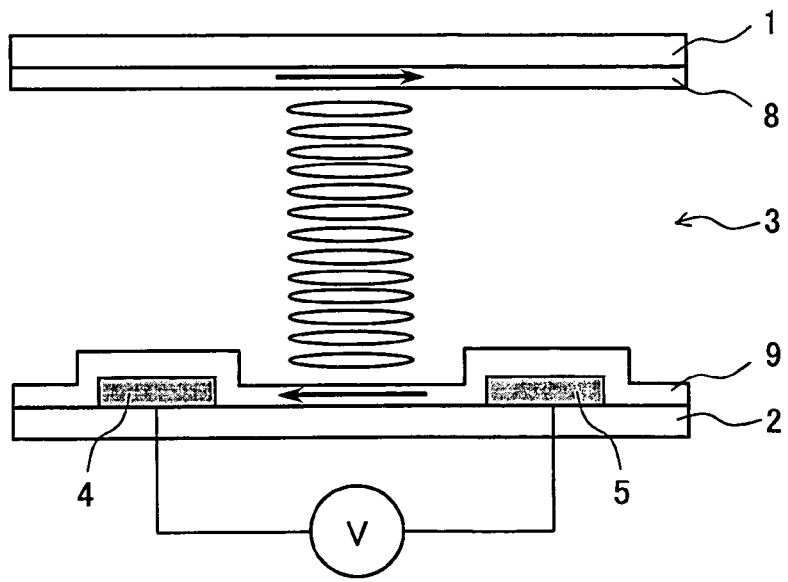

There was formed a display element in which each pixel includes a pectinate electrode including plural crooks in pectinate parts so that each pectinate part seems to have an elbowed shape (a zigzagged shape) on a plane, as shown in FIG. 2 of Patent Document 1. An angle of each crook in the pectinate part (flexing angle (bending angle)) was set to 35 degrees as with the structure shown in FIG. 2 of Patent Document 1. With the structure, plural domains where electric fields are applied in different directions are formed in areas where the pectinate parts are extended in different directions. With the structure, directions in which electric fields are applied in adjacent domains form an angle of 35 degrees.

In the display element having the above electrode structure, a color seen from a direction at a polar angle of 60 degrees was observed at a time when an electric field was applied, as with the case of the display element 20a. The result of the observation showed that transmittance drops by approximately 33% and coloring seen from a particular viewing direction was not improved greatly, compared with the display element of Comparative Example 1.

That is, the display element of the present embodiment has a principle for display different from a conventional liquid crystal display element, and therefore the shape of an electrode that is most suitable for the conventional liquid crystal display element described in Patent Document 1 is not suitable for the display element of the present embodiment. The technique of Patent Document 1 is a mere application of a so-called SIPS (Super In-Plane Switching) mode of a liquid crystal display element. Therefore, the shape of an electrode that is most suitable for the SIPS mode is not suitable for the display element of the present embodiment, and a divisional domain structure of the SIPS mode described in Patent Document 1 does not allow an increase in transmittance and prevention of coloring in the display element of the present embodiment.

Further, as a result of detailed study, the inventors of the present invention found that, in the SIPS mode that is one of display modes of a liquid crystal display element, a preferable angle formed by electric field applying directions of domains is not 90 degrees that is the most suitable angle for the display element of the present embodiment, but near 0 degree. This is because: in the display element of the present invention, an electric field applying direction is the same as a direction in which optical anisotropy is exhibited, while in the SIPS mode that is one of display modes of a conventional liquid crystal display element, an electric field applying direction is not necessarily the same as a direction in which optical anisotropy is exhibited.

That is, in the SIPS mode, optical anisotropy is exhibited also at a time of applying no electric field (voltage), or also at a time of displaying black gradation. Application of an electric field changes the direction of optical anisotropy so as to perform display. In contrast, in the display element of the present embodiment, at a time of applying no electric field (voltage) or at a time of displaying black gradation, substantially no optical anisotropy is exhibited at least in a direction parallel to a plane of a substrate, but liquid crystal molecules are in substantially optical isotropy state (transparent state). The display element of the present embodiment is greatly different from the SIPS mode in this point. Consequently, the display element of the present embodiment is different from the SIPS mode also in terms of an optimal electrode structure etc.

Figure 15A:
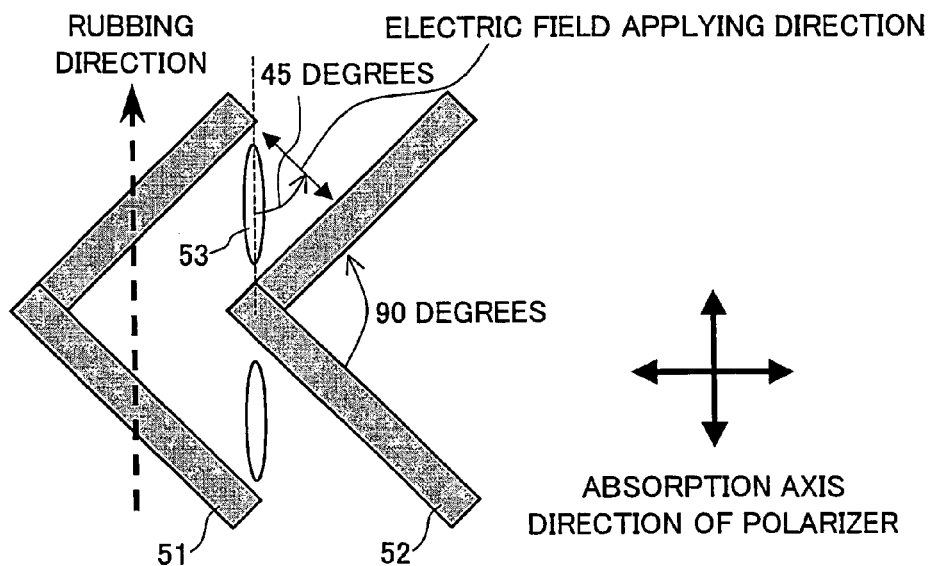
FIG. 15(a) is an explanatory drawing illustrating how a liquid crystal molecule rotates in a liquid crystal display element including a zigzag-shaped electrode with a bending angle of 90 degrees, the liquid crystal display element being in an SIPS mode that is a conventional liquid crystal display mode.
Figure 15B:
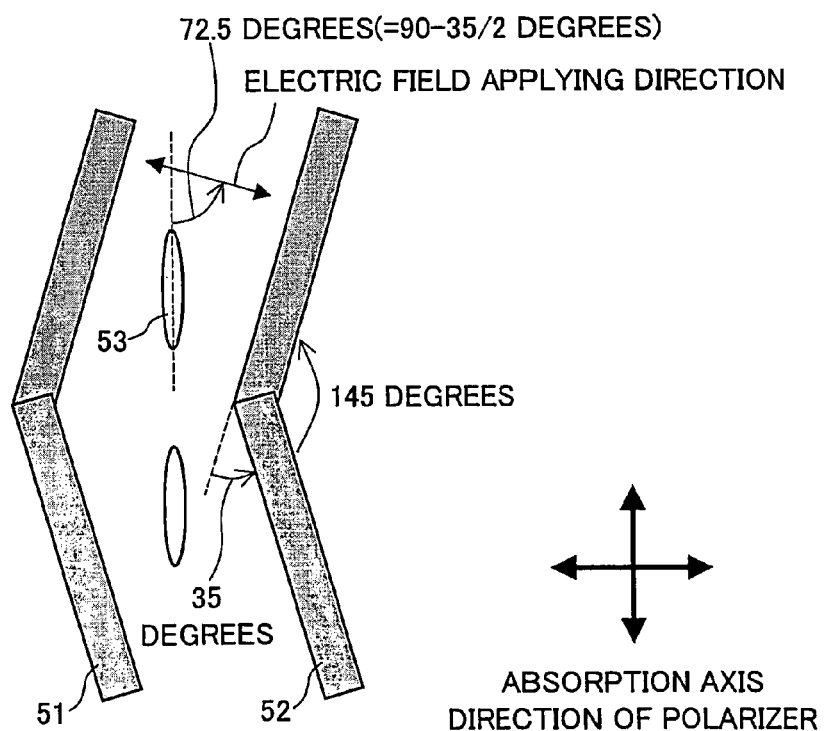
FIG. 15(b) is an explanatory drawing illustrating how a liquid crystal molecule rotates in a liquid crystal display element including a zigzag-shaped electrode with a bending angle of 35 degrees, the liquid crystal display element being in an SIPS mode that is a conventional liquid crystal display mode.

With reference to FIGS. 15(a) and 15(b), the following details why the optimal angle formed by pectinate electrodes of the SIPS mode is not 90 degrees that is the optimal angle in the display element of the present embodiment, but near 0 degree.

FIG. 15(a) is an explanatory drawing showing how a liquid crystal molecule 53 turns in a case where an angle of a crook (bending angle) in each of zigzag electrodes 51 and 52 is 90 degrees in the SIPS mode, that is, in a case where the electrodes 51 and 52 are provided so that directions in which electric fields are applied in adjacent domains form an angle of 90 degrees. In the structure shown in FIG. 15(a), a rubbing treatment is performed in a direction that crosses the electric field applying direction at an angle of 45 degrees.

Further, FIG. 15(b) is an explanatory drawing showing how a liquid crystal molecule 53 turns in a case where an angle of a crook (bending angle) in each of zigzag electrodes 51 and 52 is 35 degrees in the SIPS mode, that is, in a case where the electrodes 51 and 52 are provided so that directions in which electric fields are applied in adjacent domains form an angle of 35 degrees. In the structure shown in FIG. 15(a), a rubbing treatment is performed in a direction that crosses the electric field applying direction at an angle of 72.5 degrees.

As described above, in order that transmittance has the maximum value, the liquid crystal molecule 53 in each domain must be aligned so that a long axis direction of the liquid crystal molecule 53 and absorption axis directions of polarizers provided in crossed Nicols manner form an angle of 45 degrees. Therefore, in the structure shown in FIG. 15(a), in order that transmittance has the maximum value, it is required that application of an electric field causes the long axis direction of the liquid crystal molecule 53 to turn by 45 degrees and causes an electric field applying direction to be completely the same as the direction of the liquid crystal molecule 53. For that reason, the structure shown in FIG. 15(a) requires a great driving voltage.

In contrast, in the structure shown in FIG. 15(b), an aligning direction of the liquid crystal molecule 53 at a time of applying no electric field and a direction in which an electric field is applied form an angle of 72.5 degrees. Therefore, in order that the long axis direction of the liquid crystal molecule 53 turns so that the long axis direction crosses the absorption axis direction of each polarizer by 45 degrees, it is required to cause the liquid crystal molecule 53 to turn by 45 degrees, but the turn by 45 degrees is merely a part of turn toward an electric field applying direction (a part of turn by 72.5 degrees). Accordingly, not so much electric field is required in order to cause the long axis direction of the liquid crystal molecule 53 to turn by 45 degrees. That is, in divisional domains in the SIPS mode, it is only required that the individual domains have different electric field applying directions, and it is advantageous that the electric field applying directions form an angle close to zero degree. The reason why the SIPS mode is arranged so that the alignment direction and the electrodes 51 and 52 form an angle slightly tilted from zero degree is to allow the liquid crystal molecule 53 to rotate in either two ways (clockwise and counterclockwise) depending on the applied electric field. Typical arrangement is such that the alignment direction and the electrodes 51 and 52 form an angle in a range from several degrees to 20 degrees.

As described above, the display element 20a includes the cholesteric liquid crystal layer 3 made of a liquid crystal material exhibiting a cholesteric phase where spontaneous twist pitch is shorter than a wavelength of visible light. The display element 20a applies an electric field on the cholesteric liquid crystal layer 3 and thus causes the cholesteric liquid crystal layer 3 to exhibit optical anisotropy in a direction parallel to a plane of a substrate, thereby changing transmittance. As shown in FIG. 12, the display element 20a includes the pectinate electrodes 4 and 5 including, in each pixel, two domains (domains $D_M$ and $D_M'$) whose electric field applying directions are orthogonal to each other.

Consequently, it is possible to realize a display element that has a wide viewing angle and that is capable of preventing the coloring in all directions (viewing directions) without deteriorating transmittance.

It is preferable that electric field applying directions of the two domains $D_M$ and $D_M'$ form an angle of 90 degrees. However, the present invention is not limited to this. Human eyes hardly sense a difference in colors between the domains as long as a difference in luminance between the domains is approximately 10% with respect to the maximum luminance. Accordingly, human eyes hardly sense a difference in colors between the domains as long as an angle formed by electric field applying directions (directions in which optical anisotropy is exhibited) of the domains is within 90 degrees±20 degrees. Further, when an angle formed by the electric field applying directions of the domains is within 90 degrees±10 degrees, it is possible to more surely prevent human eyes from sensing the difference in colors between the domains.

Further, an electrode structure for forming two domains $D_M$ and $D_M'$ having different electric field applying directions is not limited to the example shown in FIG. 12. For example, two domains $D_M$ and $D_M'$ having different electric field applying directions may be formed by pectinate electrodes 4 and 5 having a zigzag shape.

The following explains a case where the pectinate electrodes 4 and 5 having a zigzag shape are applied to a TFT panel in an actual display element (the display element 20a of the present embodiment). FIG. 16 is an explanatory drawing showing a structure of one pixel in the display element 20a of the present embodiment in a case where the pectinate electrodes 4 and 5 have a zigzag shape.

The display element 20a is provided in each pixel 101 of the display device 100 in FIG. 4 so as to serve as a substitute for the display element 20 (see FIG. 5). That is, the display element 20a is provided in each of matrix-aligned pixels each having a switching element, a signal line, a scanning line, a counter electrode line etc.

In the display element 20a shown in FIG. 16, pectinate electrodes 4 and 5 are made of ITO (indium tin oxide), electrode width L=5 μm, electrode distance S=5 μm, the thickness of a cholesteric liquid crystal layer 3 (cell thickness d)=4.5 μm.

Further, alignment films 8 and 9 having been subjected to a rubbing treatment in a direction shown in FIG. 16 are formed on substrates 1 and 2, respectively, so as to be provided on surfaces closer to the cholesteric liquid crystal layer 3. The alignment films 8 and 9 are obtained by applying commercially available polyimide "AL3046" as a horizontal alignment film material to form an alignment film layer and then subjecting the alignment film layer to a rubbing treatment in the direction shown in FIG. 16. Accordingly, in the display element 20*a* shown in FIG. 16, directions in which the pectinate electrodes 4 and 5 apply electric fields and rubbing directions form an angle of 45 degrees. Further, rubbing directions of the substrates 1 and 2 are orthogonal to each other.

The cholesteric liquid crystal layer 3 is obtained by adding the aforementioned monomer and the aforementioned polymerization initiator to the chiral-added liquid crystal material (4) so that the added monomer or polymerization initiator has the aforementioned density, pouring the chiral-added liquid crystal material (4) between the two substrates, and then forming a polymer network (alignment assisting material) by irradiating UV ray to stabilize a short pitch cholesteric alignment state.

A color filter layer 11 (not shown in FIG. 16) having three colors of R (red), G (green), and B (blue) is provided on one of the substrates 1 and 2. The color filter layer 11 may be a multi primary color filter layer including at least one color layer of C (cyan), M (magenta), and Y (yellow) in addition to R, G, and B, or may be a color filter layer including W (white) in addition to R, G, and B. Alternatively, instead of using the color filter layer 11, color display may be performed using a field sequential method that is so-called time divisional driving in which the color of a back light source is changed at high speed in one field to be in synchronization with driving of a liquid crystal layer. Alternatively, the display element 20*a* may be arranged so that the display element 20*a* does not perform color display but perform monochrome gradation display by changing transmittance of the cholesteric liquid crystal layer 3 to modulate luminance of gray scales.

As described above, the display element 20*a* is provided in each pixel 101 of the display device 100 in FIG. 4 so as to serve as a substitute for the display element 20 (see FIG. 5). That is, the display element 20*a* shown in FIG. 16 is provided in each area surrounded by two adjacent data signal lines SLi and SLi+1 and two adjacent scanning signal lines GLi and GLi+1.

The display element 20*a* shown in FIG. 16 includes, in each pixel, a pixel electrode made of the pectinate electrode 4 and a counter electrode made of the pectinate electrode 5. To be more specific, the display element 20*a* includes: at least one TFT (Thin Film Transistor) 29 (switching element) that is provided so as to correspond to each crossing point of a plurality of data signal lines parallel to one another and a plurality of scanning signal lines 32 orthogonal to the data signal lines; the pectinate electrode (pixel electrode) 4, connected with the TFT 29, including a plurality of pectinate parts 4*p*; and the pectinate electrode (counter electrode) 5 including pectinate parts 5*p* each provided between two pectinate parts 4*p* of the pectinate electrode 4 so as to face a pectinate part p. The pectinate parts 4*p* and 5*p* are formed to have a zigzag shape with the angles of their crooks (bending angles) being 90 degrees. Straight lines of the pectinate parts 4*p* and 5*p* are parallel to each other. Consequently, domains $D_M$ and $D_M'$ whose electric field applying directions are orthogonal to each other are formed.

That is, in the display element 20*a* shown in FIG. 12, an area where the pectinate parts 4*aa* and the pectinate parts 5*aa* are provided so as to face one another forms one domain, and an adjacent area where the pectinate parts 4*ab* and 5*ab* are provided so as to extend in a direction orthogonal to a direction in which the pectinate parts 4*aa* and 5*aa* are extended forms the other domain, the two domains having electric field applying directions orthogonal to each other. In contrast, in the display element 20*a* shown in FIG. 16, the pectinate parts 4*p* and 5*p* each having a plurality of crooks whose bending angle is 90 degrees are provided so that straight parts of the pectinate parts 4*p* and 5*p* face each other. An electric field in a direction orthogonal to a direction in which the straight parts of the pectinate parts 4*p* and 5*p* are extended is applied on an area between the straight parts of the pectinate parts 4*p* and 5*p*, respectively. Accordingly, two domains $D_M$ and $D_M'$ (fine areas) whose electric field applying directions are orthogonal to each other are formed with respect to each direction in which the straight parts of the pectinate parts 4*p* and 5*p* are extended.

To be specific, in the display element 20*a* shown in FIG. 16, each pectinate part 4*p* includes straight parts $4a_1, 4a_2, \ldots, 4a_r$. The straight parts $4a_1, 4a_2, \ldots, 4a_r$ cross adjacent straight parts $4a_2, 4a_3, \ldots, 4a_{r+1}$, respectively, at an angle (bending angle) of 90 degrees. Similarly, each pectinate part 5*p* includes straight parts $5a_1, 5a_2, \ldots, 5a_r$. The straight parts $5a_1, 5a_2, \ldots, 5a_r$ cross adjacent straight parts $5a_2, 5a_3, \ldots, 5a_{r+1}$, respectively, at an angle (bending angle) of 90 degrees. Further, the straight parts $4a_1, 4a_2, 4a_r$ of each pectinate part 4*p* are provided so as to face (be parallel to) the straight parts $5a_1, 5a_2, \ldots, 5a_r$ of adjacent pectinate part 5*p*. Accordingly, between the straight parts $4a_1, 4a_2, \ldots, 4a_r$ and the straight parts $5a_1, 5a_2, \ldots, 5a_r$, there are formed domains whose electric field applying directions are orthogonal to those of adjacent domains.

In the display element 20*a* shown in FIG. 16, as with the structure shown in FIG. 12, polarizers 6 and 7 are provided on outer planes of the substrates 1 and 2. The polarizers 6 and 7 are provided so that absorption axis directions 6*a* and 7*a* of the polarizers 6 and 7, respectively, cross each other at a right angle, and the absorption axis directions 6*a* and 7*a* and directions in which the straight parts $4a_1, 4a_2, \ldots, 4a_r$ of the pectinate electrode 4 and the straight parts $5a_1, 5a_2, \ldots, 5a_r$ of the pectinate electrode 5 are extended form an angle of 45 degrees.

In the display element 20*a* having the above structure, a color seen from a direction at a polar angle of 60 degrees was observed with respect to each viewing direction at a time of applying an electric field. The result of the observation shows that there is no reduction in transmittance and coloring in all viewing directions can be prevented. This verified that the display element 20*a* having the structure shown in FIG. 16 is a display element which has high transmittance, which reduces coloring in all directions, and which has wide viewing angle property as with the structure shown in FIG. 12, and that the display element 20*a* having the structure shown in FIG. 16 is applicable to an actual TFT panel.

[Embodiment 4]

The following explains further another embodiment. For convenience of explanation, members having the same functions as those explained in Embodiments 1 to 3 are given the same reference numerals and explanations thereof will be omitted here.

In Embodiments 1 to 3, an explanation was made as to a case where a glass substrate was used for the two facing substrates 1 and 2 in each of the display elements 20 and 20*a*. In the present embodiment, an explanation will be made as to a case of using a plastic substrate for two facing substrates 1 and 2 in a display element 20.

As with Embodiment 1, as illustrated in FIG. 1, the display element 20 of the present embodiment includes (i) two substrates (counter substrate 1A and pixel substrate 2A) that face each other, serving as medium holding means (optical modulation layer holding means) and (ii) a cholesteric layer 3 provided between the two substrates, serving as a display layer for performing display.

The counter substrate 1A and the pixel substrate 2A include, as base substrates, i.e. as transparent substrates (substrates 1 and 2), plastic substrates that face each other. That is, the display element 20 includes the cholesteric liquid crystal layer 3 between the two facing transparent substrates (substrates 1 and 2). The display element 20 of the present embodiment has the same structure as the display element 20 of Embodiment 1 except that the substrates 1 and 2 are made of plastic substrates. In the present embodiment, too, each of the two substrates 1 and 2 that face each other is a transparent substrate. However, the present invention is not limited to this case.

For example, the display element 20 may be a reflective display element that performs display by causing light from the substrate at the observer's side to be reflected by the other substrate. In that case, only the substrate at the observer's side is required to be transparent. That is, only one of the two substrates that face each other is required to be transparent.

In a case where the display element 20 is a reflective display element, a substrate on which a reflective layer is provided is not required to be transparent. However, the substrate on which a reflective layer is provided may be of the same kind as a substrate that faces the substrate on which the reflective layer is provided. In consideration of reliability etc., it is advantageous to use, as a pair of substrates, substrates having the same mechanical properties (such as coefficient of linear expansion) as each other.

That is, in the present embodiment, both of the substrates 1 and 2 that face each other are made of plastic substrates. However, the present invention is not limited to this. Only one of the substrates 1 and 2 may be made of a plastic substrate. In that case, the other of the substrates 1 and 2 is not particularly limited in terms of its material. Further, the substrates 1 and 2 may be made of the same plastic material, or may be made of different plastic materials.

Using a plastic substrate for the substrates 1 and 2 allows the substrates 1 and 2 to be more flexible compared with a case of using a glass substrate for the substrates 1 and 2. Accordingly, the display element 20 having the above structure can be used as a flexible display.

Further, as with Embodiment 1, the inner plane of the substrate 1 (plane that faces the substrate 2) is provided with a color filter layer 11 in which three primary color layers of R (red), G (green), and B (blue) are aligned in parallel.

Further, as with Embodiment 1, as illustrated in FIGS. 2(a) and 2(b), the inner plane of the substrate 2 (plane that faces the substrate 1) is provided with pectinate electrodes 4 and 5, facing each other, that serve as electric field applying means for applying, on the cholesteric liquid crystal layer 3, an electric field in a direction parallel to the substrate, that is, an electric field parallel to the substrate 1 (lateral electric field).

In the present embodiment, the pectinate electrodes 4 and 5 are made of Cr (chrome). The pectinate electrodes 4 and 5 are designed such that, for example, a line width is 7 μm, a distance between electrodes (interval between electrodes) is 7 μm, and a thickness is 0.6 μm. However, the material for the electrode, the line width, the distance between electrodes, and the thickness are merely examples, and the present invention is not limited to them. For example, the pectinate electrodes 4 and 5 may be made of an electrode material such as a transparent electrode material (e.g. ITO (indium tin oxide)) or a transparent organic conductive material such as resin of the polythiophene family.

Further, the inner planes of the substrates 1 and 2 are provided with alignment films 8 and 9 that face the cholesteric liquid crystal layer 3. The surfaces of the alignment films 8 and 9 have been subjected to a rubbing treatment in a reverse-parallel manner (in parallel and in a reverse direction).

Further, the planes (outer planes) of the substrates 1 and 2 that are opposite to the facing planes of the substrates 1 and 2 are provided with polarizers 6 and 7, respectively. An optical retardation film may be provided between the polarizer 6 and the substrate 1 and between the polarizer 7 and the substrate 2 in order to further improve viewing angle property.

Further, at least one of the substrates 1 and 2 are made of a plastic substrate including a plurality of fibers arrayed in at least one direction. As the plastic substrate includes a plurality of fibers arrayed in at least one direction, the plastic substrate has lower coefficient of linear expansion, higher dimensional stability, and allows reduction in size variation caused by a change in temperature.

In the present embodiment, each of the substrates 1 and 2 is made of a plastic material including the plurality of fibers arrayed in at least one direction. However, the present invention is not limited to this. In the following explanation, a direction in which a long axis of a fiber 61A points is referred to as an "array direction."

In the present embodiment, as shown in FIGS. 25(a) and 25(b), the plastic substrate is made of a complex substrate 60 that includes the fibers 61A (fiber bundles 61) and a resin matrix 62.

In the complex substrate 60 including the fibers 61A, it is preferable that the fiber bundles 61 made of the fibers 61A are arrayed in two directions that cross each other at substantially a right angle (at an angle of 90 degrees±20 degrees, preferably at an angle of 90 degrees±10 degrees, and most preferably at an angle of 90 degrees (at a right angle)) as shown in FIGS. 25(a) and 25(b), because such array directions cause properties (e.g. mechanical properties and thermal properties) including coefficient of linear expansion to be isotropic.

In that case, it is preferable that one of two array directions of the fibers 61A, crossing each other, is substantially parallel to or substantially perpendicular to the absorption axis directions of the polarizers 6 and 7 (in particular, substantially parallel to or substantially perpendicular to the absorption axis direction of the polarizer provided at the observer's side (the polarizer 6 for example).

One of two array directions of the fibers 61A, crossing each other, being substantially parallel to or substantially perpendicular to the absorption axis directions of the polarizers 6 and 7 means that one of the array directions of the fibers 61A and one of the absorption axis directions of the polarizers 6 and 7 form an angle within ±20 degrees, preferably an angle within ±10 degrees, and most preferably one of the array directions is parallel to one of the absorption axis directions.

As described above, when the array directions of the fibers 61A, arrayed in one direction, of each plastic substrate are substantially parallel to (preferably parallel to) or substantially perpendicular to (preferably perpendicular to) the absorption axis of the polarizer at the observer's side (the polarizer 6 for example), it is possible to prevent generation of color irregularity due to birefringence of the plastic substrate and to prevent light leakage in a case where the fiber bundles 61 of the plastic substrate includes refractive index anisotropy. Consequently, it is possible to form the display element 20 having high contrast ratio.

As shown by a virtual line (chain double-dashed line), a protective film 63 (hard coat) may be provided on the surface (main surface) of the complex substrate 60. The protective film 63 may be made of an organic material or may be made of an inorganic material. The protective film 63 is typically made of an inorganic material (such as a silicon dioxide film) that is excellent in heat-resistance, barrier property (property that shields water and oxygen gas), and mechanical strength. As the plastic substrate is preferably used for transmitting visible light, the protective film 63 is required to transmit visible light. Further, in order to reduce reflection at the interface between the complex substrate 60 and the protective film 63, it is preferable that the material of the protective film 63 has substantially the same (preferably the same) refractive index as the resin matrix 62 of the complex substrate 60. In the present embodiment, a plastic substrate without the protective film 63 was used.

As shown in FIGS. 25(a) and 25(b), the fibers 61A (fiber bundles 61) are arrayed in two directions (in this case, an x-axis direction and a y-axis direction) that cross each other at substantially a right angle (preferably, a right angle) in a plane of the substrate.

It is preferable that the fibers 61A thus arrayed in two directions crossing each other (at substantially a right angle) form a fiber cloth (a woven cloth). That is, it is preferable that the plastic substrate includes the fibers 61A as a woven cloth.

Usage of a woven cloth in the complex substrate 60 increases mechanical strength higher than usage of an unwoven cloth does.

As schematically shown in FIG. 25(c), it is particularly preferable that texture of a fiber cloth is plain weave. However, the texture may be a general one such as satin weave and twill weave, or an unwoven cloth may be used. Plain weave is preferable because unevenness formed by overlapping fibers is small and therefore plain weave allows reducing variation in thickness (alternatively, surface unevenness) of the complex substrate compared with satin weave and twill weave.

Further, the complex substrate 60 used as the transparent substrates (substrates 1 and 2) in the display element 20 that is a liquid crystal display element is required to have high transmittance for visible light (this may be merely referred to as "transparent" hereinafter) and to be without birefringence, as with a conventional glass substrate. Therefore, it is preferable that the materials for the fibers 61A (fiber bundles 61) and the resin matrix 62 that form the complex substrate 60 are transparent to visible light, have substantially the same refractive index, and do not have birefringence. Retardation in a plane of the complex substrate 60 (i.e. in-plane retardation) is preferably 15 nm or less, and more preferably 1 nm or less. Further, retardation of the complex substrate 60 in a thickness direction is preferably 40 nm or less and more preferably 25 nm or less.

Transparent resin used as a material for the resin matrix 62 in the complex substrate 60 may be general transparent resin. Specific examples of the general transparent resin include: thermosetting resin such as epoxy resin, phenol resin, phenol-epoxy resin mixture, and bismaleimide-triazine resin mixture; and thermoplastic resin such as polycarbonate, polyethylene terephthalate, polysulfone, polyethersulfone, polyarylate, polyetherimide, cellulose acetate, polystyrene, polyethylene, and modified ones thereof.

Examples of a transparent fiber used for the fibers 61A (fiber bundles 61) include inorganic fibers such as E glass, D glass, and S glass; and organic fibers made of resin etc. such as aromatic polyamide. These transparent fibers are preferably used as the fiber bundles 61 as described above, and are more preferably used as a woven cloth as schematically shown in FIG. 25(c).

For example, the complex substrate 60 (with a thickness of 0.17 mm for example) is formed by using epoxy resin as the resin matrix 62 and by using a woven cloth that is plain-woven with approximately 500 μm pitch so that fiber bundles 61 (with a width of approximately 200 μm) having approximately 50 numbers of E glass fiber with a diameter of 10 μm cross each other at a right angle. Such complex substrate 60 includes in-plane retardation less than 1 nm and retardation of approximately 20 nm in a thickness direction, and is preferably used for plastic substrates (substrates 1 and 2) of the display device 100. The in-plane retardation was measured using "Spectroscopic Ellipsometer" manufactured by JASCO Corporation.

Further, coefficient of linear expansion of a resin material, for example, coefficient of linear expansion of epoxy resin (70 ppm or more) is larger than coefficient of linear expansion of a glass fiber (10 ppm or less), and coefficient of linear expansion of a fiber cloth is smaller than coefficient of linear expansion of a resin material.

As described above, usage of a woven cloth (fiber cloth) in the complex substrate 60 increases mechanical strength higher than usage of an unwoven cloth does, and coefficient of linear expansion of a woven cloth is smaller than coefficient of linear expansion of a resin material. Accordingly, using both the resin material and the fiber cloth to form a plastic substrate allows reduction of coefficient of linear expansion of a plastic substrate compared with a case of using only the resin material to form a plastic substrate. Therefore, with the above arrangement, it is possible to prevent dimensional variation due to a change in temperature.

Further, it is preferable that the complex substrate 60 is highly transparent. For that reason, in order to prevent diffuse reflection at the interface between the fibers 61A and the resin matrix 62 and to prevent diffusion by the fibers 61A, it is preferable to select materials for the fibers 61A and the resin matrix 62 so that refractive index of the fibers 61A is as close to refractive index of the resin matrix 62 as possible. In general, options for the material of the fibers 61A are broader than options for the material of the resin matrix 62. Further, refractive index of the resin matrix 62 is easily adjusted by introducing a substituent to a main chain structure of resin (transparent resin) used as the material of the resin matrix 62 and thus improving the resin. For example, introduction of fluoric atoms to the main chain structure of the resin (transparent resin) used as the material of the resin matrix 62 allows the refractive index of the resin matrix 62 to be lowered. Introduction of bromic atoms to the resin structure of the resin (transparent resin) used as the material of the resin matrix 62 allows the refractive index of the resin matrix 62 to be heightened.

Further, in order to improve mechanical strength of the complex substrate 60 and to heighten uniformity in mechanical property and optical property of the complex substrate 60, it is preferable to evenly provide the fibers 61A in the plane of the complex substrate 60. It is preferable that the diameter of each fiber 61A and the diameter of the fiber bundle 61 are small, and that the pitch of the fiber bundle 61 is small. Specifically, the diameter of each fiber 61A is preferably approximately 20 μm or less, and more preferably approximately 10 μm or less. Further, the width of the fiber bundle 61 is preferably 200 μm or less, and the pitch of the fiber bundle 61 is preferably 500 μm or less.

In the present embodiment, the complex substrate 60 includes a plain-woven cloth as schematically shown in FIG.

25(*c*). In the woven cloth, each fiber 61A included in the fiber bundle 61 is the same and density of each fiber 61A is the same. For example, the width of each fiber bundle 61 is approximately 200 μm, and the pitch between the fiber bundles 61 is approximately 500 μm both in x and y directions. The diameter of each fiber 61A included in the fiber bundle 61 is approximately 10 μm.

The complex substrate 60 is produced through various known methods by using the materials of the fibers 61A (fiber bundle 61 or woven cloth) and the resin matrix 62. In a case of using thermosetting resin as the material of the resin matrix 62, the complex substrate 60 can be produced through compression molding, calender molding, casting, transfer molding etc. In a case of using thermoplastic resin as the material of the resin matrix 62, the complex substrate 60 can be produced through compression process, injection molding, extrusion process etc.

Further, the plastic substrate may include an inorganic filler as a filler. That is, the resin material used in the plastic substrate may include an inorganic filler as a filler. The inorganic filler is included to increase elastic modulus, to lower coefficient of linear expansion, and to lower absorbency.

The inorganic filler is not particularly limited. Examples of the inorganic filler include talc, alumina, glass, silica, and mica.

For example, the plastic substrate may be a plastic substrate in which glass beads are immersed as fillers in epoxy resin.

In terms of filling property, a glass bead is preferably has a diameter of 2 μm or less for example. It is particularly preferable to use a glass bead whose diameter is 1 μm or less. However, it is preferable that the glass bead has an average grain size of 0.2 μm or more because the grain size makes it easy to control viscosity.

Here, coefficient of linear expansion of the resin material, for example, coefficient of linear expansion of epoxy resin (70 ppm or more) is larger than coefficient of linear expansion of a glass bead (10 ppm or less), and coefficient of linear expansion of the filler is smaller than coefficient of linear expansion of the resin material. By forming a plastic substrate using the resin material and the filler, it is possible to lower coefficient of linear expansion of the plastic substrate compared with a case of forming a plastic substrate only using the resin material.

Further, as described above, the plastic substrate may include inorganic oxide (such as talc, alumina, glass, silica, and mica). When the plastic substrate includes the inorganic oxide, the plastic substrate has lower coefficient of linear expansion. At that time, the plastic substrate has higher elastic modulus and lower absorbency. When the coefficient of linear expansion is high, dimensional variation due to temperature change becomes large, which requires patterning with high accuracy. For example, production of a driving element (switching element) such as a TFT requires patterning with higher accuracy. In general, coefficient of linear expansion of a plastic substrate is several dozen ppm/° C. at the lowest, whereas coefficient of linear expansion of a glass is several ppm/° C. When the plastic substrate includes inorganic oxide, the plastic substrate has lower coefficient of linear expansion and allows prevention of dimensional variation due to temperature change.

Further, the thickness of the plastic substrate is preferably 0.05 mm or more and 1.1 mm or less. When the thickness is less than 0.05 mm, the plastic substrate does not have enough stiffness. When the thickness is more than 1.1 mm, the plastic substrate is heavier, which impairs such advantage that the plastic substrate is lighter than a glass substrate.

Figure 26:
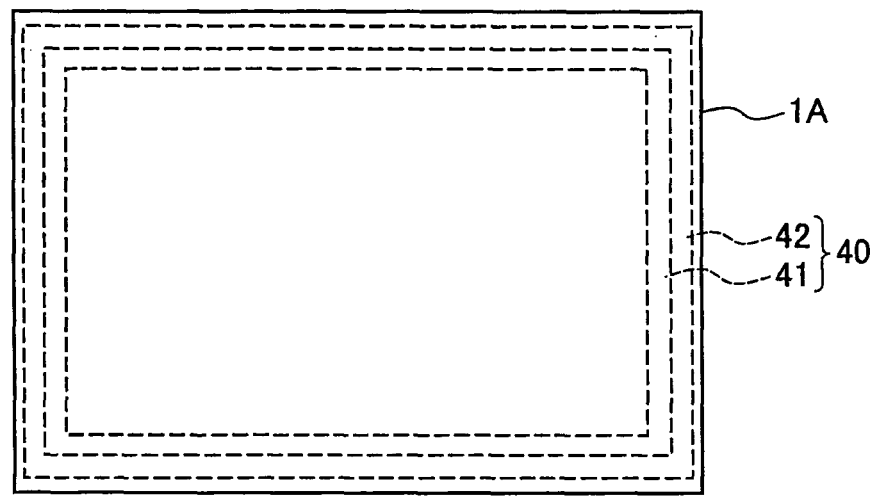
FIG. 26(a) is a plan drawing schematically illustrating a structure of a sealing material used in the display element of the embodiment.
FIG. 26(b) is a cross sectional drawing schematically illustrating a structure of a sealing material used in the display element of the embodiment.
Figure 26:
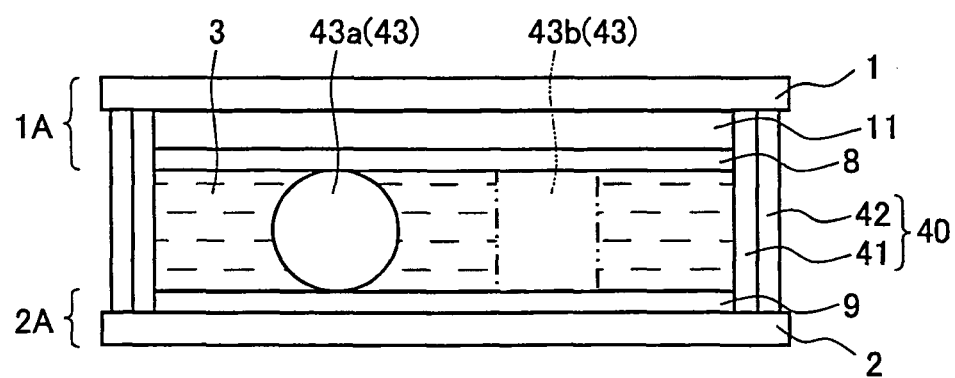

As shown in FIGS. 26(*a*) and 26(*b*), the display element 20 is formed in such a manner that the counter substrate 1A and the pixel substrate 2A are attached to each other via a sealing material 40 including resin layers 41 and 42 with a spacer 43 such as a rib-shaped spacer, a plastic bead, and a glass fiber spacer being provided according to necessity, and a medium used for the cholesteric liquid crystal layer 3, e.g. a dielectric material such as a liquid crystal material, is included in a space between the counter substrate 1A and the pixel substrate 2A.

In the present embodiment, as shown by a full line in FIG. 26(*b*), a plastic bead 43*a* is used as the spacer 43. However, in a case where the substrates 1 and 2 used for the counter substrate 1A and the pixel substrate 2A, respectively, have different coefficients of linear expansion, it is preferable that, as shown by a virtual line (two-dotted chain line) in FIG. 26(*b*), a rib-shaped spacer 43*b* is used as the spacer 43.

For example, in the case where a glass substrate and a plastic substrate having different coefficients of linear expansion are used as the substrates 1 and 2, respectively, when the substrates 1 and 2 are heated and expanded, a space (substrate distance) between the counter substrate 1A and the pixel substrate 2A is enlarged.

As a result, in a case where the spacer 43 is the plastic bead 43*a* for example, there is a possibility that the plastic bead 43*a* moves when the substrate distance is enlarged. Movement of the plastic bead 43*a* makes it difficult to evenly maintain the substrate distance.

In contrast, in a case where the rib-shaped spacer 43*b* for example is formed as the spacer 43 on a glass substrate, the rib-shaped spacer 43*b* is fixed on the glass substrate. Consequently, even when the substrate distance is enlarged, the position of the rib-shaped spacer 43*b* does not change. Therefore, in the case where the substrates 1 and 2 have different coefficients of linear expansion, it is preferable that the spacer 43 is the rib-shaped spacer 43*b*.

Further, as shown in FIGS. 26(*a*) and 26(*b*), the display element 20 includes the sealing material 40 that is provided between the substrates 1 and 2, i.e. between the counter substrate 1A and the pixel substrate 2A and that seals the periphery of the cholesteric liquid crystal layer 3 (display layer). The sealing material 40 is a surrounding-shaped (frame-shaped) sealing material made of laminated resin layers. The sealing material 40 shown in FIGS. 26(*a*) and 26(*b*) includes the resin layers 41 and 42 that seem surrounding-shaped (frame-shaped) on a plane and that are superimposed (laminated) in this order from the inner side to the outer side of the sealing material 40.

Examples of the resin materials for the resin layers 41 and 42 include thermosetting resin and ultraviolet curing resin. In the present embodiment, the resin layer 41 is made of thermosetting resin, and the resin layer 42 is made of ultraviolet curing resin.

A sealing material made of the ultraviolet curing resin has lower viscosity and lower adhesiveness with a substrate than a sealing material made of the thermosetting resin. Therefore, attachment of the counter substrate 1A and the pixel substrate 2A is performed such that the counter substrate 1A and the pixel substrate 2A are temporarily attached to each other via the sealing material made of the ultraviolet curing resin and then they are finally attached to each other via the sealing material made of the thermosetting resin, so that the counter substrate 1A and the pixel substrate 2A are attached to each other more surely.

Attachment of the counter substrate 1A and the pixel substrate 2A is made through the following process for example.

First, the sealing material made of the thermosetting resin is applied in a surrounding-shaped manner on the periphery of an optical modulation area of the substrate 2 through a dispenser process to form the resin layer 41. Then, the sealing material made of the ultraviolet curing resin is applied in a surrounding-shaped manner through the dispenser process so as to overlap (surround) the periphery of the resin layer 41 to form the resin layer 42. In the present embodiment, the thermosetting resin and the ultraviolet curing resin are applied on the substrate 2 so that each of the thermosetting resin and the ultraviolet curing resin has a width of approximately 0.3 mm and a thickness of approximately 20 μm. The substrates 1 and 2 are plastic substrates.

Further, the thermosetting resin and the ultraviolet curing resin include approximately 2 weight % of rod-shaped spacers as the spacer 43. The rod-shaped spacer included in the thermosetting resin and the rod-shaped spacer included in the ultraviolet curing resin have the same rod size. The rod-shaped spacer is not particularly limited. An example of the rod-spacer is micro rod manufactured by Nippon Electric Glass Co., Ltd. Here, the spacer 43 is a rod-shaped spacer, but the spacer 43 may be a round spacer for example.

The thermosetting resin may be conventional thermosetting resin that has been used as a sealing material for a display device, and is not particularly limited. An example of the thermosetting resin is thermosetting epoxy resin.

The ultraviolet curing resin may be a so-called ultraviolet curing adhesive, and is not particularly limited. Examples of the ultraviolet resin include "Rapid Curing LX1347" (product name) manufactured by Loctite Japan, "NOA-61" (product name) manufactured by NORLAND PRODUCTS, and "AVR-100" (product name) manufactured by Three Bond Co., Ltd.

Subsequently, the counter substrate 1A and the pixel substrate 2A are positioned so as to face each other at a predetermined position, and they are caused to face each other (attached to each other). Here, the resin layers 41 and 42 provided on the substrate 2 are positioned between the counter substrate 1A and the pixel substrate 2A.

Ultraviolet ray is irradiated by a UP press device to the resin layer 42 made of the ultraviolet curing resin so as to cure the resin layer 42, thereby temporarily attaching the counter substrate 1A and the pixel substrate 2A to each other. A light source for irradiating ultraviolet ray is not particularly limited. An example of the light source is a metal halide lamp.

Subsequently, the attached substrates 1 and 2 are heated to cure the resin layer 41 made of the thermosetting resin, and then the substrates 1 and 2 are gradually cooled down.

Thus, the counter substrate 1A and the pixel substrate 2A are attached to each other with a desired positional relationship therebetween and with a predetermined distance therebetween. As a result, a display element having high display quality can be obtained.

That is, in a case where the sealing material 40 is made of plural layers, e.g. the resin layers 41 and 42, the resin layer 41 at the internal wall side is made of the ultraviolet curing resin, and the resin layer 42 at the external wall side is made of the ultraviolet curing resin, the substrates 1 and 2 are temporarily attached to each other via the resin layer 42 at the external wall side so that the substrates 1 and 2 do not slide in a horizontal direction, and then the substrates 1 and 2 are finally attached to each other via the resin layer 41 at the internal wall side.

Here, in a case where the substrates 1 and 2 have greatly different thermal expansion coefficients, the substrate having larger thermal expansion coefficient deforms to be convex due to expansion when the substrates 1 and 2 are heated to cure the resin layer 41 at the internal wall side. However, portions of the substrates 1 and 2 that are temporarily attached to each other via the resin layer 42 at the external wall side maintain a predetermined substrate distance therebetween. As described above, the sealing material 40 includes the plurality of resin layers (resin layers 41 and 42), and therefore the resin layer 41 at the internal wall side fixes the substrates 1 and 2 at substantially the same position as the resin layer 42 at the external wall side does. Consequently, after the resin layer 41 at the internal wall side has been cured and the expanded substrates contract to their original sizes, the substrates 1 and 2 are attached to each other with high accuracy while maintaining a desired positional relationship therebetween and a predetermined distance therebetween.

As described above, in the present embodiment, both the thermosetting resin and the ultraviolet curing resin are applied on the substrate 2. However, the thermosetting resin and the ultraviolet curing resin may be applied on the substrate 1. Further, the present invention may be arranged so that the thermosetting resin is applied on one of the substrates 1 and 2, the ultraviolet resin is applied on the other of the substrates 1 and 2, and when the substrates 1 and 2 are attached to each other, the resin layer 41 made of the thermosetting resin and the resin layer 42 made of the ultraviolet curing resin are superimposed from the internal wall side (optical modulation area side) to the external wall side of the sealing material 40.

That is, application patterns of the thermosetting resin and the ultraviolet curing resin are not particularly limited as long as the resin layer 41 made of the thermosetting resin and the resin layer 42 made of the ultraviolet curing resin are superimposed from the internal wall side to the external wall side of the sealing material 40 while the substrates 1 and 2 are attached to each other. Further, the application process is not limited to the dispenser process and may be a printing process such as an offset process.

Further, in the present embodiment, the sealing material 40 (resin layers 41 and 42) is a combination of the resin layer 41 made of the thermosetting resin and the resin layer 42 made of the ultraviolet curing resin. However, the substrates 1 and 2 may be fixed to each other via one of the resin layers.

In the present embodiment, the substrates 1 and 2 are plastic substrates made of plastic resin films because the plastic substrates are elastic.

Further, in the present embodiment, TFTs (thin film transistors) and electrodes are formed on a plastic substrate including a plurality of fibers, e.g. an E glass. Consequently, it is possible to prevent dimensional variation due to temperature change, caused by large coefficient of linear expansion of the plastic substrate.

Further, in the present embodiment, in a cell (liquid crystal cell) including the alignment films 8 and 9 that are horizontal alignment films having been subjected to aligning treatments, a chiral-added liquid crystal material in which chiral pitch is relatively shorter than a wavelength of visible light is used and the polarizers 6 and 7 are provided in a crossed Nicols manner. Consequently, it is possible to realize an optical isotropy state (transparent state) at a time of applying no voltage, or at a time of applying a low voltage that is not more than a voltage (threshold voltage) at which a change in alignment of liquid crystal molecules causes optical change.

With the arrangement, spontaneous twist pitch is shorter than a wavelength of visible light, and therefore optical isotropy is exhibited (alternatively, the degree of optical anisotropy is small) in a direction parallel to a plane of a substrate at a time of applying no voltage. When an electric field is applied on the cholesteric liquid crystal layer 3, liquid crystal molecules are aligned in an electric field applying direction in accordance with electric field strength. That is, application of an electric field causes the liquid crystal molecules to be aligned so that the liquid crystal molecules are untwisted and are aligned in the electric field applying direction. Thus, application of an electric field changes transmittance of the cholesteric liquid crystal layer to perform display.

As described above, in the above embodiments, an explanation was made as to a case where the cholesteric liquid crystal layer 3 that exhibits optical isotropy in a direction parallel to a plane of a substrate (substrate-plane-parallel direction) at a time of applying no voltage or at a time of applying a low voltage that is not more than a voltage (threshold voltage) at which a change in alignment of liquid crystal molecules causes optical change is used as an optical modulation layer, and an electric field in the substrate-plane-parallel direction is applied on the cholesteric liquid crystal layer 3, thereby exhibiting optical anisotropy in the substrate-plane-parallel direction to perform display.

However, the present embodiment is not limited to this case, as long as the present embodiment allows switching between optical isotropy and optical anisotropy in a direction substantially parallel to a plane of a substrate in accordance with application of no electric field and application of an electric field. That is, the present embodiment may be arranged so that application of an electric field allows exhibition of optical anisotropy in a direction substantially parallel to planes of the substrates 1 and 2, and an electric field applied on the cholesteric liquid crystal layer 3 is in a direction substantially parallel to the planes of the substrates 1 and 2. Here, a direction substantially parallel to a plane of a substrate specifically means a direction that forms an angle within ±10 degrees with a plane parallel to a plane of a substrate. The direction preferably means a direction parallel to a plane of a substrate.

Further, the alignment films 8 and 9 are provided on facing planes of the substrates 1 and 2, respectively, to cause liquid crystal molecules near interfaces with the substrates to be aligned in a specific direction (i.e. aligning treatment direction).

In the above embodiments, an explanation was made as to a case where the alignment films 8 and 9 are subjected to aligning treatments so as to exert aligning force on liquid crystal molecules constituting the cholesteric liquid crystal layer 3 so that the liquid crystal molecules are aligned in a direction parallel to the planes of the substrates 1 and 2.

However, as described above, the present embodiment is only required to allow switching between optical isotropy and optical anisotropy in a direction substantially parallel to a plane of a substrate in accordance with application of no electric field and application of an electric field. Accordingly, the alignment films 8 and 9 are only required to exert aligning force on liquid crystal molecules constituting the cholesteric liquid crystal layer 3 so that the liquid crystal molecules are aligned in a direction substantially parallel to the planes of the substrates 1 and 2.

Alignment directions of liquid crystal molecules touching the interfaces of the substrates 1 and 2 (upper and lower substrate interfaces) are fixed so as to point in aligning treatment directions of the interfaces, and liquid crystal molecules near the interfaces are aligned in aligning treatment directions of the alignment films 8 and 9.

Further, liquid crystal molecules between the substrates 1 and 2 are aligned so as to be twisted with each other in an internal direction of the cell by an angle corresponding to twist force of the chiral agent, and are continuously connected with the liquid crystal molecules fixed to the interface of the other substrate. As described above, the liquid crystal molecules at the substrate interfaces are fixed in single directions, respectively, and therefore liquid crystal molecules of the cholesteric liquid crystal layer 3 exhibit a uniform helical alignment state (uniform twist alignment) at a time of applying no voltage. Accordingly, helices do not point in a random direction and alignment defect does not occur between the helices. Therefore, by providing the alignment films 8 and 9, it is possible to prevent alignment defect between the helices and to more surely realize optical isotropy in a substrate-plane-parallel direction.

Therefore, even when external force is applied on the display element 20, alignment disorder is less likely to occur and as a result display is not greatly affected. Therefore, the display element 20 is most applicable to a flexible display.

In the above embodiments, an explanation was made as to a case where optical anisotropy of the cholesteric liquid crystal layer 3 is changed by applying an electric field. However, the present embodiment is not limited to this case. Application of an external field other than the electric field may change the optical anisotropy of the cholesteric liquid crystal layer 3 between at a time of applying the external field and at a time of applying no external field. At that time, the liquid crystal material to be included in the cholesteric liquid crystal layer 3 is a liquid crystal material in which spontaneous twist pitch is less than a wavelength of visible light and optical anisotropy occurs in a substrate-plane-parallel direction when the external force is applied. This provides a display element and a display device, each of which requires small strength of an external field for driving, which has high response property, wide viewing angle property, and high contrast property, which has wide range of driving temperature, and which has high durability and reliability.

For example, the present embodiment may be arranged so that a magnetic field may be applied instead of an electric field. In that case, by using magnetic anisotropy of the liquid crystal material to be included in the cholesteric liquid crystal layer 3, optical anisotropy of the liquid crystal material is changed between at a time of applying a magnetic field and at a time of applying no magnetic field. Therefore, the liquid crystal material to be included in the liquid crystal layer 3 preferably has spontaneous twist pitch of less than a wavelength of visible light and has large anisotropy of magnetic susceptibility.

In a case of organic molecules, the magnetic susceptibility is mainly due to diamagnetism. Thus, in a case where π electrons can move along a ring in molecules according to a change in the magnetic field, an absolute value of the magnetic susceptibility becomes largest. Therefore, for example, in a case where the molecule has an aromatic ring, the absolute value of the magnetic susceptibility becomes largest when the aromatic ring is directed perpendicular to a direction in which the magnetic field is applied. In this case, an absolute value of the magnetic susceptibility observed in a horizontal direction of the aromatic ring is relatively smaller than an absolute value of the magnetic susceptibility observed along a perpendicular direction of the aromatic ring. Thus, the anisotropy of the magnetic susceptibility is larger. Therefore, a material having a ring structure such as a six-membered ring is preferable as the liquid crystal material to be included in the cholesteric liquid crystal layer 3.

Moreover, in order to increase the anisotropy of the magnetic susceptibility, it is also preferable to orient electron spin in the liquid crystal material. By introducing an electron spin in a radical of N, O, or NO, it is possible to give the molecules a stable spin. In this case, it is possible to orient the spin parallel by, for example, piling conjugate molecules on the plane. In this case, for example, a discotic liquid crystal is preferable because core portions located at a center of the molecules are piled into columns in the discotic liquid crystal.

Further, light may be used as an external field for changing optical anisotropy of the cholesteric liquid crystal layer 3. A wavelength of the light is not particularly limited. For example, light of 532 nm is oscillated and irradiated by Nd:YAG laser to a liquid crystal material to change optical anisotropy of the liquid crystal material.

The liquid crystal material used in this case is a liquid crystal material that has spontaneous twist pitch less than a wavelength of visible light, that exhibits a cholesteric phase, and that changes its optical anisotropy by light irradiation.

Further, in a case of using light as the external field, it is preferable that the medium includes a little amount of pigment. Addition of a little amount of pigment allows greater change in optical anisotropy than a case of adding no pigment. It is preferable that the amount of pigment included in the medium is not less than 0.01 wt % and less than 5%. When the amount is less than 0.01%, the amount of the pigment is too small and as a result the pigment hardly contributes to change in optical anisotropy. When the amount is not less than 5%, excitation light is absorbed by the pigment.

Further, in the display element, as described above, examples of means for realizing optical anisotropy include an electric field, a magnetic field, and light. Among them, an electric field is preferable because designing of the display element and driving control of the display element is easy in a case of using an electric field. That is, examples of external field applying means of the display element include: electric field applying means such as an electrode; magnetic field applying means such as an electromagnet; and light irradiation means (excitation light generating means) such as a laser device (e.g. the Nd:YAG laser). Among them, the electric field applying means is preferable as the external field applying means in terms of designing of the display element and driving control of the display element.

Further, the external field applying means may be included in the display element itself or may be provided separately from the display element.

That is, the display device of the above embodiments may include a display element including the external field applying means, or may include the external field applying means provided separately from the display element. In other words, the display device of the present invention may include: the display element of the above embodiments; and the external field applying means for applying an external field on the cholesteric liquid crystal layer of the display element.

As described above, the display element includes the liquid crystal material that is made of a medium exhibiting a cholesteric phase where spontaneous twist pitch is less than a wavelength of visible light, and that exhibits optical anisotropy in a direction substantially parallel to planes of the substrates (preferably in a direction parallel to the planes, i.e. in a substrate-plane-parallel direction) in response to application of the external field. Further, the display device includes the display element.

Consequently, unlike a conventional liquid crystal display element, viscosity of a liquid crystal does not greatly affect response speed in the liquid crystal display element of the present embodiment, and the liquid crystal display element of the present embodiment realizes higher response than a conventional liquid crystal display element. Further, the liquid crystal display element of the present embodiment has wide viewing angle property compared with a conventional liquid crystal display element in which liquid crystal molecules are aligned in a uniform direction at a time of applying no voltage and application of a voltage changes the alignment direction of the liquid crystal molecules to perform display.

Further, in the above arrangement, spontaneous twist pitch is less than a wavelength of visible light, and therefore transmittance at a time of applying no external field is very high, which realizes high contrast.

Further, with the above arrangement, it is possible to maintain a stable phase structure within a wide temperature range, and therefore it is possible to realize a display element having a wide temperature range for driving and has high durability and reliability.

Further, in addition to the above arrangement, the present embodiment may be arranged so as to include: a first polarizer provided on one of the substrates; and a second polarizer provided on the other of the substrates so as to have an absorption axis direction perpendicular to that of the first polarizer.

With the above arrangement, at a time of applying no external field, linearly polarized light that transmits one polarizer (first polarizer) and is incident to a liquid crystal layer reaches the other polarizer (second polarizer) without changing its polarization direction. Consequently, the linearly polarized light incident to the liquid crystal layer is completely absorbed by an absorption axis of the other polarizer (second polarizer) and the light is not emitted to outside. Therefore, sufficient black gradation can be displayed at a time of applying no voltage.

Further, when an external field is applied on the liquid crystal layer, the liquid crystal layer exhibits optical anisotropy in a direction substantially parallel to planes of the substrates (preferably in a substrate-plane-parallel direction). Consequently, linearly polarized light that transmits one polarizer (first polarizer) and is incident to a liquid crystal layer has a component other than a component absorbed by an absorption axis of the other polarizer (second polarizer). As a result, the linearly polarized light transmits the other polarizer (second polarizer) and is emitted. Therefore, it is possible to change transmittance of a display element in response to application of an external field and application of no external field, thereby performing gradation display.

Further, the present embodiment may be arranged so that the substrates have individual planes that face each other, and each of the planes is provided with aligning means for exerting an aligning force on molecules constituting the medium so that the molecules are aligned in a direction substantially parallel (preferably parallel) to planes of the substrates. Here, directions substantially parallel to planes of the substrates may be any directions as long as the directions are parallel to the planes of the substrates. Further, the aligning means provided on individual planes of the substrates may exert aligning forces in different directions.

With the arrangement, the molecules near the interface of the substrate are aligned in a predetermined direction according to an aligning force exerted by the aligning means at a time of applying no external field. Consequently, the molecules are uniformly aligned in a helical manner (in a uniform twist alignment). Consequently, helices do not point in a random direction and alignment defect does not occur between the helices. Therefore, it is possible to prevent alignment defect between the helices and to more surely realize optical isotropy in a direction substantially parallel to a plane of a substrate, preferably in a substrate-plane-parallel direction.

In the display element, examples of means for realizing optical anisotropy in a direction substantially parallel to planes of the substrates (preferably in a substrate-plane-parallel direction) include an electric field, a magnetic field, and light. Therefore, the display element may include external field applying means such as electric field applying means and magnetic field applying means, or may be combined with electric field applying means, magnetic field applying means, light irradiation means etc. Among them, an electric field is preferable because designing of the display element and driving control of the display element is easy in a case of using an electric field. Therefore, it is preferable that the display element includes electric field applying means for applying an electric field as an external field to the liquid crystal layer.

Accordingly, it is preferable that the display element includes electric field applying means. With respect to the liquid crystal layer, with respect to the medium at the pixels of the substrates, the electric field applying means applies an electric field substantially parallel to planes of the substrates (an electric field substantially parallel to the substrates), preferably an electric field parallel to planes of the substrates.

Further, the present embodiment may be arranged so that: when strength of transmitted light at a time of the absorption axis direction of the first polarizer being parallel to the absorption axis direction of the second polarizer is regarded as reference strength of transmitted light, strength of transmitted light in displaying black gradation (e.g. at a time of applying no external field or applying an external field with low strength) is 20% or less of the reference strength of transmitted light, and maximum strength of transmitted light in displaying white gradation (e.g. at a time of applying an external field with maximum strength or nearly maximum strength) is 50% or more of the reference strength of transmitted light.

With the arrangement, a ratio of the maximum value of strength of transmitted light to the minimum value of strength of transmitted light, that is, a contrast is 2.5 or more, which is in a range at which human eyes can sense display. Further, as the maximum transmittance being 50% or more, it is possible to realize brightness that is equal to or more than that of a liquid crystal display mode in practical use, such as VA mode, IPS mode, ECB mode, and OCB mode.

Further, with the arrangement, black gradation display can be performed using optical isotropy at a time of applying no external field or at a time of applying an external field with low strength, and white gradation display can be performed using optical anisotropy with respect to a substrate-plane-parallel direction of the liquid crystal layer (a direction substantially parallel to a substrate plane, preferably a substrate-plane-parallel direction) that is exhibited to near-maximum degree in response to application of an external field. This allows all gradation display having a wide dynamic range. Further, by controlling strength of an external field to be applied, it is possible to perform gray scale (halftone) display.

Further, at least one of the facing substrates may include a color filter layer. In this case, gradation display is performed by applying an external field on the liquid crystal layer to change optical anisotropy in a substrate-plane-parallel direction (in a direction substantially parallel to a plane of a substrate) of the liquid crystal layer, and color display can be performed using the color filter layer.

Further, the present embodiment may be arranged so that the absorption axis direction of the first polarizer and a direction in which an electric field is applied form an angle within 45 degrees±10 degrees, and the absorption axis direction of the second polarizer and a direction in which an electric field is applied form an angle within 45 degrees±10 degrees.

With the arrangement, optical anisotropy in a substrate-plane-parallel direction (in a direction substantially parallel to a plane of a substrate) exhibited in response to application of an electric field can be used exhaustively and effectively. This allows realizing a display element that is excellent in usage efficiency of light and that has high transmittance.

Further, the electric field applying means may be made of a pair of pectinate electrodes.

With the arrangement, it is possible to effectively apply an electric field on the liquid crystal layer. Further, as the structure of the pectinate electrode is used in a liquid crystal display element in a conventional IPS (In Plane Switching) mode, the designing, an array structure, and a layout structure of the pectinate electrode can be applied to the present embodiment.

Further, the electric field applying means may include, in one pixel, domains having different electric field applying directions.

With the arrangement, it is possible to realize a display element having wide viewing angle, in which transmittance does not drop and coloring does not occur in all directions (in all viewing directions). In this case, it is preferable that the electric field applying means includes, in one pixel, two domains having electric field applying directions orthogonal to each other.

With the arrangement, coloring can be performed with more sureness in all directions (all viewing directions).

Further, each of the pectinate electrodes has a zigzag-shape with a bending angle of 90 degrees±20 degrees. Here, the bending angle is an angle formed by a linear part and its adjacent linear part in the zigzag shape.

With the arrangement, there are provided, in one pixel, two domains having electric field applying directions that are orthogonal to each other (alternatively, substantially orthogonal to each other). Coloring seen from a skewed viewing direction is alternately compensated by the domains. This allows greatly increasing viewing angle properties without decreasing transmittance.

Further, the aligning means may be a horizontal alignment film having been subjected to a rubbing treatment or may be a horizontal alignment film having been subjected to an light irradiation treatment.

With the arrangement, by using the horizontal alignment film having been subjected to a rubbing treatment or the horizontal alignment film having been subjected to an light irradiation treatment, liquid crystal molecules bordering on interfaces of the substrates at a time of applying no external field are surely aligned in a predetermined direction being one of substrate-plane-parallel directions (directions substantially parallel to a plane of a substrate). This allows optical isotropy in the substrate-plane-parallel direction (direction substantially parallel to a plane of a substrate) to be more surely realized at a time of applying no external field. This prevents light leakage at a time of applying no external field, and accordingly realizes a display element having higher contrast. An example of the horizontal alignment film is an organic thin film such as polyimide that is used in TFT-LCD (Thin Film Transistor-Liquid Crystal Display; Thin Film Transistor Color Liquid Crystal Display). Alternatively, a so-called optical alignment layer material including an optical functional group may be used.

The display element of the present embodiment may be arranged so that the substrates have individual planes that face each other, and each of the planes is provided with aligning means for exerting an aligning force on molecules constituting the medium so that the molecules are aligned in a predetermined direction, and an aligning direction of the aligning means and an electric field applying direction of the electric field applying means form an angle of 0 degree or 90 degrees. Here, the aligning direction indicates a direction in which a long axis direction of the liquid crystal molecule is aligned.

An angle formed by the aligning direction and the electric field applying direction is not necessarily exactly 0 degree or 90 degrees, and may be substantially 0 degree or 90 degrees.

With the arrangement, a direction of optical anisotropy in the substrate-plane-parallel direction (direction substantially parallel to a substrate plane) caused by application of an electric field forms an angle of approximately 45 degrees with absorption axis directions of the first and second polarizers. This realizes a display element having high usage efficiency of light and having high transmittance.

Further, the display element of the present embodiment may be arranged so that the substrates have individual planes that face each other, and each of the planes is provided with aligning means for exerting an aligning force on molecules constituting the medium so that the molecules are aligned in a predetermined direction, and an aligning direction of the aligning means and an electric field applying direction of the electric field applying means form an angle of 45 degrees. An angle formed by the aligning direction and the electric field applying direction is not necessarily exactly 45 degrees, and may be substantially 45 degrees.

With the arrangement, the aligning direction of a liquid crystal molecule on planes of the substrates is parallel to the absorption axis directions of the first and second polarizers, or the aligning direction cross the absorption axis directions. Consequently, a phase difference by a liquid crystal molecule attached to the interface of the substrate and a phase difference of the aligning means itself cancel each other. This more surely provides optical isotropy with respect to a substrate-plane-parallel direction (direction substantially parallel to a substrate plane) at a time of applying no electric field.

The display element of the present embodiment may be arranged so that at least one of the substrates is a plastic substrate. A plastic substrate has more flexibility than a glass substrate. Accordingly, with the arrangement, the display element can be used as a flexible display.

The display element of the present embodiment may be arranged so that the plastic substrate includes inorganic oxide. The arrangement allows reduction of a coefficient of linear expansion, increase in elastic modulus, and decrease in absorbency. When coefficient of linear expansion is high, dimensional variation due to temperature change becomes large, which requires patterning with high accuracy. For example, production of a driving element (switching element) such as a TFT requires patterning with higher accuracy. In general, coefficient of linear expansion of a plastic substrate is several dozen ppm/° C. at the lowest, whereas coefficient of linear expansion of a glass is several ppm/° C. Accordingly, when the plastic substrate includes inorganic oxide, the plastic substrate has lower coefficient of linear expansion and allows prevention of dimensional variation due to temperature change.

Further, the display element of the present embodiment may be arranged so that the plastic substrate includes fibers arrayed in at least one direction.

The plastic substrate including fibers arrayed in at least one direction has lower coefficient of linear expansion and higher dimensional stability. This prevents dimensional variation due to temperature change.

Further, it is preferable that the fibers are aligned in a direction substantially parallel to or substantially perpendicular to the absorption axis of the polarizer. That is, it is preferable that the plastic substrate includes: a first polarizer provided on one of the substrates; and a second polarizer provided on the other of the substrates, having an absorption axis direction that crosses an absorption axis direction of the first polarizer at a right angle, and the fibers are aligned in a direction substantially parallel to or substantially perpendicular to the absorption axis of the polarizer provided at an observer's side.

When the aligning direction of the fibers is substantially parallel to or substantially perpendicular to the absorption axis of the polarizer laminated on the plastic substrate, in other words, when the fibers arrayed in one direction are substantially parallel to or substantially perpendicular to the absorption axis of the polarizer, it is possible to prevent coloring due to birefringence of the plastic substrate.

In the present embodiment, being substantially parallel to or substantially perpendicular to an absorption axis of a polarizer specifically indicates being inclined with respect to an absorption axis of one of the first and second polarizers by an angle within a range of ±20 degrees, preferably ±10 degrees. Being parallel to an absorption axis of one of the first and second polarizers is most preferable.

Further, the present embodiment may be arranged so that at least one of the substrates is a plastic substrate, and when one of the substrates is a plastic substrate, the plastic substrate includes laminated layers including a fiber cloth and a resin layer, and when both of the substrates are plastic substrates, at least one of the plastic substrates includes laminated layers including a fiber cloth and a resin layer, and the resin layer includes a resin material whose coefficient of linear expansion is larger than that of the fiber cloth. That is, the display element of the present embodiment may be arranged so that at least one of the substrates is a plastic substrate that has a complex layer including a fiber cloth and a resin layer, and the resin layer includes a resin material whose coefficient of linear expansion is larger than that of the fiber cloth.

With the arrangement, the fiber cloth has smaller coefficient of linear expansion than that of the resin material. Accordingly, the plastic substrate with the arrangement has lower coefficient of linear expansion than the case of a plastic substrate made of only a resin material. Accordingly, the arrangement prevents dimensional variation due to temperature change.

Further, the display element of the present embodiment may be arranged so as to further include a surrounding-shaped sealing material, provided between the substrates, for sealing a periphery of the liquid crystal layer, the surrounding-shaped sealing material being made of ultraviolet curing resin.

With the arrangement, the substrates are attached to each other only via irradiation of an ultraviolet ray, which is advantageous in that heating of the substrates is unnecessary.

The display element of the present embodiment may be arranged so as to further include a surrounding-shaped sealing material, provided between the substrates, for sealing a periphery of the liquid crystal layer, the surrounding-shaped sealing material being made of thermosetting resin and ultraviolet curing resin.

That is, the surrounding-shaped sealing material may be a combination of thermosetting resin and ultraviolet curing resin or may include a compound including a thermosetting reactive group and an ultraviolet curing reactive group.

Further, the surrounding-shaped sealing material may be made by laminating a resin layer containing thermosetting resin and a resin layer containing ultraviolet curing resin. Specifically, the surrounding-shaped sealing material may be made of resin layers that are laminated from the internal wall side to external wall side of the surrounding-shaped sealing material, and at least one of the resin layers is made of thermosetting resin and a remain or remains of the resin layers are made of ultraviolet curing resin.

A sealing material made of the ultraviolet curing resin has lower viscosity and lower adhesiveness with a substrate than a sealing material made of the thermosetting resin. Therefore, attachment of the substrates is performed such that the substrates are temporarily attached to each other via the sealing material made of the ultraviolet curing resin and then they are finally attached to each other via the sealing material made of the thermosetting resin, so that the The display element of the present embodiment may be arranged so that the liquid crystal layer is made of a medium to which a chiral agent has been added.

With the arrangement, addition of the chiral agent realizes a liquid crystal layer in which spontaneous twist pitch is less than a wavelength of visible light, that is, a liquid crystal layer exhibiting optical isotropy in a substrate-plane-parallel direction (direction substantially parallel to a substrate plane) at a time of applying no external field.

Further, in the case of adding the chiral agent, it is preferable that density of the added chiral agent is 11 weight % or more and 80 weight % or less with respect to a whole weight of the medium to which the chiral agent is added.

With the arrangement, when density of the added chiral agent is 11 weight % or more, spontaneous twist pitch is less than a wavelength of visible light, which realizes a liquid crystal layer exhibiting optical isotropy in a substrate-plane-parallel direction (direction substantially parallel to a substrate plane) at a time of applying no external field.

On the other hand, when density of the added chiral agent is too high, $T_{ni}$ drops and effective temperature range for driving gets narrower and a twist force due to the chiral agent gets too large, which increases a driving voltage. Further, when the density of the added chiral agent increases and the ratio of a liquid crystal material to a mixture material drops too much, liquid crystallinity of the whole liquid crystal layer drops. This makes it difficult to detect an electro-optical effect. In order to avoid the aforementioned inconveniences, it is preferable that the density of the added chiral agent is set to 80 weight % or less.

The display element of the present embodiment may be arranged so that the liquid crystal layer is made of a liquid crystal material having chirality.

With the arrangement, the liquid crystal material itself has chirality, and accordingly it is unnecessary to add the chiral agent.

Further, it is preferable that the liquid crystal layer has a selective reflection wavelength that is less than a wavelength of visible light.

With the arrangement, it is possible to more surely realize optical isotropy with respect to a substrate-plane-parallel direction (direction substantially parallel to a substrate plane) at a time of applying no external field. Further, it is possible to prevent coloring caused by selective reflection at a time of applying no external field and at a time of applying an external field.

In Patent Document 3, an electric field in a substrate plate parallel direction (direction substantially parallel to a substrate plane) is applied on a cholesteric liquid crystal layer to change pitch of a cholesteric phase, and thus a wavelength of selective reflection is changed from an ultraviolet area to a visible light area to realize color display. In contrast, the display element of the present invention display gradations by changing transmittance of a liquid crystal layer. In a case of color display, the display element of the present invention performs color display, for example, by use of a color filter layer or by time sharing driving in which colors of a light source such as a backlight are switched at a high speed within one unit field.

Further, the display element of the present embodiment may be arranged so that the liquid crystal layer includes an alignment assisting material for stabilizing alignment of molecules that constitute the medium at a time of applying no external field. Examples of the alignment assisting material include a polymer network and a hydrogen-bonded complex. The polymer network is made by polymerization of a polymerizable compound added to the liquid crystal layer, the polymerization being performed by light irradiation in a state where the liquid crystal layer exhibits optical isotropy in a direction substantially parallel to a plane of each substrate (preferably in a substrate-plane-parallel direction).

With the arrangement, alignment of molecules constituting a medium at a time of applying no external field can be stabilized by the alignment assisting material. Consequently, at a time of applying an external field with high strength, it is possible to make use of electro-optical properties while maintaining alignment of molecules at a time of applying no external field, that is, alignment of molecules having spontaneous twist pitch less than a wavelength of visible light. This allows the molecules to promptly go back to alignment having spontaneous twist pitch less than a wavelength of visible light at a time when application of an external field is made off. Therefore, sufficient display can be performed right after application of the external field is made off.

Further, as the alignment assisting material stabilizes alignment of molecules at a time of applying no external field, there is provided a more practical display element in which alignment of molecules having spontaneous twist pitch less than a wavelength of visible light is not impaired and which has high durability and reliability.

In Patent Document 2, a blue phase is stabilized by a polymer network in order to broaden a temperature range in which the blue phase is exhibited. In contrast, in the present invention, the alignment assisting material is formed not for broadening a temperature range for driving, but for causing molecules to promptly go back to alignment having spontaneous twist pitch less than a wavelength of visible light at a time when application of an external field is made off.

Further, the display device of the present embodiment includes the display element of the present invention having one of the aforementioned arrangements.

Accordingly, with the arrangement, it is possible to realize a display device having high-speed response property, wide viewing angle property, and high contrast property, has a wide temperature range for driving, and is excellent in durability and reliability. The display element of the present embodiment has high-speed response property as described above. Accordingly, by use of this property, the display element is applicable to a display device of field sequential color mode of performing time sharing driving in which colors of a light source such as a backlight are switched at high speed in one unit field so as to perform display.

The embodiments and concrete examples of implementation discussed in the foregoing detailed explanation serve solely to illustrate the technical details of the present embodiments, which should not be narrowly interpreted within the limits of such embodiments and concrete examples, but rather may be applied in many variations within the spirit of the present embodiments, provided such variations do not exceed the scope of the patent claims set forth below.

INDUSTRIAL APPLICABILITY

The display element and the display device of the present embodiments have a wide temperature range for driving, is excellent in high-speed response property and wide viewing angle property, does not impair transmittance, and is capable of performing high contrast display without coloring in all viewing directions. Further, a material having been fully used in conventional liquid crystal display elements is used as a liquid crystal layer in the display element and the display device of the present embodiments, the display element and the display device are excellent in durability and reliability. Accordingly, in terms of practical application, the display element and the display device are one of the most promising display techniques for next-generation FPD-TV. Further, in addition to TV applications, the display element and the display device are applicable to monitors, on-board displays, OA apparatuses such as laptop computers and word processors, camcorders, digital cameras, and displays provided in mobile phones.

The invention claimed is:

1. A display element, comprising:
a pair of substrates that face each other, at least one of the substrates being transparent; and
a liquid crystal layer provided between the substrates, the liquid crystal layer
(i), when an external field is not applied to the liquid crystal layer,
(a) being made of a medium
(1) having pitch that is less than a wavelength of visible light and
(2) having a spontaneous twist structure with an axis perpendicular to a plane of each substrate, and
b) exhibiting a cholesteric phase, and
(ii) exhibiting optical anisotropy in a direction substantially parallel to the plane of each substrate as a result of the medium being untwisted and liquid crystal molecules being aligned in an electric field applying direction in response to application of the external field on the liquid crystal layer, wherein
the liquid crystal layer exhibits optical anisotropy in a direction parallel to a plane of each substrate in response to application of the external field on the liquid crystal layer, the display element, further comprising:
a first polarizer provided on one of the substrates; and
a second polarizer provided on the other of the substrates, having an absorption axis direction that crosses an absorption axis direction of the first polarizer at a right angle.

2. The display element as set forth in claim 1, wherein the substrates have individual planes that face each other, and each of the planes is provided with aligning means for exerting an aligning force on molecules constituting the medium so that the molecules are aligned in a direction parallel to a plane of each substrate.

3. The display element as set forth in claim 2, wherein at least one of the substrates includes a color filter layer.

4. The display element as set forth in claim 2, wherein the aligning means is a horizontal alignment film having been subjected to a rubbing treatment or a horizontal alignment film having been subjected to a light irradiation treatment.

5. The display element as set forth in claim 1, wherein the absorption axis direction of the first polarizer and a direction in which an electric field is applied form an angle within 45 degrees±10 degrees, and the absorption axis direction of the second polarizer and a direction in which an electric field is applied form an angle within 45 degrees±10 degrees.

6. A display element comprising:
a pair of substrates that face each other, at least one of the substrates being transparent; and
a liquid crystal layer provided between the substrates,
the liquid crystal layer being made of a medium having pitch that is less than a wavelength of visible light, and the liquid crystal layer exhibiting optical anisotropy in a direction substantially parallel to a plane of each substrate in response to application of an external field on the liquid crystal layer, wherein
the liquid crystal layer exhibits optical anisotropy in a direction parallel to a plane of each substrate in response to application of the external field on the liquid crystal layer, the display element further comprising:
a first polarizer provided on one of the substrates; and
a second polarizer provided on the other of the substrates, having an absorption axis direction that crosses an absorption axis direction of the first polarizer at a right angle, wherein
the substrates have individual planes that face each other, and each of the planes is provided with aligning means for exerting an aligning force on molecules constituting the medium so that the molecules are aligned in a direction parallel to a plane of each substrate, and wherein,
when strength of transmitted light at a time of the absorption axis direction of the first polarizer being parallel to the absorption axis direction of the second polarizer is regarded as reference strength of transmitted light, strength of transmitted light in displaying black gradation is 20% or less of the reference strength of transmitted light, and maximum strength of transmitted light in displaying white gradation is 50% or more of the reference strength of transmitted light.

7. A display element comprising:
a pair of substrates that face each other, at least one of the substrates being transparent; and
a liquid crystal layer provided between the substrates,
the liquid crystal layer being made of a medium having pitch that is less than a wavelength of visible light, and the liquid crystal layer exhibiting optical anisotropy in a direction substantially parallel to a plane of each substrate in response to application of an external field on the liquid crystal layer, wherein
the liquid crystal layer exhibits optical anisotropy in a direction parallel to a plane of each substrate in response to application of the external field on the liquid crystal layer, the display element further comprising
electric field applying means for applying an electric field as the external field on the liquid crystal layer, wherein
the electric field applying means applies, on the liquid crystal layer, an electric field in a direction parallel to a plane of each substrate, and wherein
the substrates have individual planes that face each other, and each of the planes is provided with aligning means for exerting an aligning force on molecules constituting the medium so that the molecules are aligned in a predetermined direction, and
an aligning direction of the aligning means and a direction in which the electric field applying means applies an electric field form an angle of 45 degrees.

8. A display element comprising:
a pair of substrates that face each other, at least one of the substrates being transparent; and
a liquid crystal layer provided between the substrates,
the liquid crystal layer being made of a medium having pitch that is less than a wavelength of visible light, and the liquid crystal layer exhibiting optical anisotropy in a direction substantially parallel to a plane of each substrate in response to application of an external field on the liquid crystal layer, wherein the liquid crystal layer exhibits optical anisotropy in a direction parallel to a plane of each substrate in response to application of the external field on the liquid crystal layer, wherein at least one of the substrates is a plastic substrate, wherein the plastic substrate includes fibers arrayed in at least one direction, the display element further comprising:

a first polarizer provided on one of the substrates; and a second polarizer provided on the other of the substrates, having an absorption axis direction that crosses an absorption axis direction of the first polarizer at a right angle, the fibers being arrayed in a direction substantially parallel to or substantially perpendicular to an absorption axis of one of the first and second polarizers that is provided at an observer's side.

9. A display element comprising:

a pair of substrates that face each other, at least one of the substrates being transparent; and a liquid crystal layer provided between the substrates, the liquid crystal layer being made of a medium having pitch that is less than a wavelength of visible light, and the liquid crystal layer exhibiting optical anisotropy in a direction substantially parallel to a plane of each substrate in response to application of an external field on the liquid crystal layer, wherein the liquid crystal layer exhibits optical anisotropy in a direction parallel to a plane of each substrate in response to application of the external field on the liquid crystal layer, wherein at least one of the substrates is a plastic substrate, and wherein at least one of the substrates is a plastic substrate that has a complex layer including a fiber cloth and a resin layer, and the resin layer includes a resin material whose coefficient of linear expansion is larger than that of the fiber cloth.

10. A display element, comprising:

a pair of substrates that face each other, at least one of the substrates being transparent; and a liquid crystal layer provided between the substrates, the liquid crystal layer (i), when an external field is not applied to the liquid crystal layer,
(a) being made of a medium
(1) having pitch that is less than a wavelength of visible light and
(2) having a spontaneous twist structure with an axis perpendicular to a plane of each substrate, and
(b) exhibiting a cholesteric phase, and (ii) exhibiting optical anisotropy in a direction substantially parallel to the plane of each substrate as a result of the medium being untwisted and liquid crystal molecules being aligned in an electric field applying direction in response to application of the external field on the liquid crystal layer, wherein the liquid crystal layer exhibits optical anisotropy in a direction parallel to a plane of each substrate in response to application of the external field on the liquid crystal layer, wherein the liquid crystal layer is made of a medium to which a chiral agent has been added, and wherein density of the added chiral agent is 11 weight % or more and 80 weight % or less with respect to a whole weight of the medium to which the chiral agent has been added.

11. A display element, comprising:

a pair of substrates that face each other, at least one of the substrates being transparent; and a liquid crystal layer provided between the substrates, the liquid crystal layer (i), when an external field is not applied to the liquid crystal layer,
(a) being made of a medium
(1) having pitch that is less than a wavelength of visible light and
(2) having a spontaneous twist structure with an axis perpendicular to a plane of each substrate, and
(b) exhibiting a cholesteric phase, and (ii) exhibiting optical anisotropy in a direction substantially parallel to the plane of each substrate as a result of the medium being untwisted and liquid crystal molecules being aligned in an electric field applying direction in response to application of the external field on the liquid crystal layer, wherein the liquid crystal layer exhibits optical anisotropy in a direction parallel to a plane of each substrate in response to application of the external field on the liquid crystal layer, wherein the liquid crystal layer includes an alignment assisting material for stabilizing alignment of molecules that constitute the medium at a time of applying no external field.

12. The display element as set forth in claim 11, wherein the alignment assisting material is a polymer network.

13. The display element as set forth in claim 12, wherein the polymer network is made by irradiating light to a polymerizable compound added to the liquid crystal layer so as to cause polymerization of the polymerizable compound, the polymerization being performed in a state where the liquid crystal layer exhibits optical isotropy in a direction parallel to a plane of each substrate.

14. The display element as set forth in claim 11, wherein the alignment assisting material is a hydrogen-bonded complex.

15. A display element, comprising:

a pair of substrates that face each other, at least one of the substrates being transparent; and a liquid crystal layer provided between the substrates, the liquid crystal layer (i), when an external field is not applied to the liquid crystal layer,
(a) being made of a medium
(1) having pitch that is less than a wavelength of visible light and
(2) having a spontaneous twist structure with an axis perpendicular to a plane of each substrate, and
(b) exhibiting a cholesteric phase, and (ii) exhibiting optical anisotropy in a direction substantially parallel to the plane of each substrate as a result of the medium being untwisted and liquid crystal molecules being aligned in an electric field applying direction in response to application of the external field on the liquid crystal layer, wherein the liquid crystal layer includes an alignment assisting material for stabilizing alignment of molecules that constitutes the medium at a time of applying no external field, the alignment assisting material is a polymer network, and the polymer network is made by polymerization of a polymerizable compound added to the liquid crystal layer, the polymerization being performed by light irradiation in a state where the liquid crystal layer exhibits optical isotropy in a direction substantially parallel to a plane of each substrate.

16. A display element, comprising:
a pair of substrates that face each other, at least one of the substrates being transparent; and
a liquid crystal layer provided between the substrates, the liquid crystal layer
(i), when an external field is not applied to the liquid crystal layer,
  (a) being made of a medium
    (1) having pitch that is less than a wavelength of visible light and
    (2) having a spontaneous twist structure with an axis perpendicular to a plane of each substrate, and
  (b) exhibiting a cholesteric phase, and
(ii) exhibiting optical anisotropy in a direction substantially parallel to the plane of each substrate as a result of the medium being untwisted and liquid crystal molecules being aligned in an electric field applying direction in response to application of the external field on the liquid crystal layer, wherein
the liquid crystal layer exhibits optical isotropy when an external field is not applied.

17. A display device, comprising a display element that includes:
a pair of substrates that face each other, at least one of the substrates being transparent; and
a liquid crystal layer provided between the substrates, the liquid crystal layer
(i), when an external field is not applied to the liquid crystal layer,
  (a) being made of a medium
    (1) having pitch that is less than a wavelength of visible light and
    (2) having a spontaneous twist structure with an axis perpendicular to a plane of each substrate, and
  (b) exhibiting a cholesteric phase, and
(ii) exhibiting optical anisotropy in a direction substantially parallel to the plane of each substrate as a result of the medium being untwisted and liquid crystal molecules being aligned in an electric field applying direction in response to application of the external field on the liquid crystal layer, wherein
the liquid crystal layer exhibits optical isotropy when an external field is not applied.

* * * * *